US012541051B2

(12) United States Patent
Cooksey et al.

(10) Patent No.: US 12,541,051 B2
(45) Date of Patent: Feb. 3, 2026

(54) SPATIO-TEMPORAL PROFILOMETER AND PERFORMING TIME-RESOLVED SPATIAL PROFILOMETRY FOR PRODUCING A UNIFORM LIGHT PROFILE

(71) Applicant: Government of the United States of America, as represented by the Secretary of Commerce, Gaithersburg, MD (US)

(72) Inventors: Gregory Alan Cooksey, Gaithersburg, MD (US); Paul Nathan Patrone, Washington Grove, MD (US); Matthew DiSalvo, Gaithersburg, MD (US); Jalal Sadeghi, Gaithersburg, MD (US)

(73) Assignee: Government of the United States of America, as represented by the Secretary of Commerce, Gaithersburg, MD (US)

( * ) Notice: Subject to any disclaimer, the term of this patent is extended or adjusted under 35 U.S.C. 154(b) by 172 days.

(21) Appl. No.: 18/225,002

(22) Filed: Jul. 21, 2023

(65) Prior Publication Data
US 2024/0027680 A1    Jan. 25, 2024

Related U.S. Application Data

(60) Provisional application No. 63/369,019, filed on Jul. 21, 2022.

(51) Int. Cl.
*G02B 6/10* (2006.01)
*G02B 6/42* (2006.01)
*G02B 27/28* (2006.01)

(52) U.S. Cl.
CPC ........... *G02B 6/105* (2013.01); *G02B 6/4206* (2013.01); *G02B 27/283* (2013.01)

(58) Field of Classification Search
CPC ..... G01F 1/661; G01N 21/77; G01N 15/0211; G02B 27/283; G02B 6/105
See application file for complete search history.

(56) References Cited

U.S. PATENT DOCUMENTS 9,523,857 B2   12/2016   Heanue et al.
10,151,681 B2   12/2018   Ahmed et al.
(Continued)

OTHER PUBLICATIONS

Cizmar, T., et al., "Shaping the light transmission through a multimode optical fibre: complex transformation analysis and applications in biophotonics", Optics Express, 2011, p. 18871-18884, vol. 19 No. 20.
(Continued)

*Primary Examiner* — Eric Wong
(74) *Attorney, Agent, or Firm* — Office of Chief Counsel for National Institute of Standards and Technology

(57) ABSTRACT

A spatio-temporal profilometer performs time-resolved spatial profilometry and includes a substrate, a tapered optical collimator waveguide, a fluid channel, and a light-fluid interaction volume. The tapered optical collimator waveguide receives diverging light, internally reflects it, and collimates it. The fluid channel receives a fluid comprising microparticles and communicates the microparticles into the fluid channel. The light-fluid interaction volume is disposed in the fluid channel and provided by an overlap within the fluid channel of the collimated light from the tapered optical collimator waveguide and the fluid. The spatio-temporal profilometer produces product light from the collimated light in response to the microparticles interacting with the collimated light in the light-fluid interaction volume from which is determined a spatial and temporal profile of microparticles in the fluid channel.

12 Claims, 35 Drawing Sheets

(56) References Cited

U.S. PATENT DOCUMENTS

| | | | |
|---|---|---|---|
| 10,746,935 B2 | 8/2020 | Lipson et al. | |
| 11,619,587 B2* | 4/2023 | Jacobs | G01N 21/05 250/458.1 |
| 2002/0114568 A1 | 8/2002 | Judkins | |
| 2004/0252957 A1* | 12/2004 | Schmidt | G01N 21/645 385/131 |
| 2020/0033244 A1* | 1/2020 | Boutami | G01N 21/53 |
| 2021/0109096 A1* | 4/2021 | Lee | G01N 21/553 |
| 2023/0304937 A1* | 9/2023 | Venkatarayalu | G01N 21/77 |
| 2024/0027680 A1* | 1/2024 | Cooksey | G01F 1/661 |

OTHER PUBLICATIONS

Camou, S., et al., "PDMS 2D optical lens integrated with microfluidic channels: principle and characterization", Lab on a Chip, 2003, p. 40-45, vol. 3.

Zhao, J., et al., "Using binary optical elements (BOEs) to generate rectangular spots for illumination in micro flow cytometer", Biomicrofluidics, 2016, p. 054111, vol. 10.

Cooksey, G.A., et al., "Dynamic Measurement of Nanoflows: Realization of an Optofluidic Flow Meter to the Nanoliter-per-Minute Scale", Analytical Chemistry, 2019, p. 10713-10722, vol. 91.

Patrone, P.N., et al., "Dynamic Measurement of Nanoflows: Analysis and Theory of an Optofluidic Flowmeter", Physical Review Applied, 2019, p. 034025, vol. 11.

Sadeghi, J., et al., "Optofluidic flow meter for sub-nanoliter per minute flow measurements", Journal of Biomedical Optics, 2022, p. 017001, vol. 27 No.1.

* cited by examiner

SPATIO-TEMPORAL PROFILOMETER AND PERFORMING TIME-RESOLVED SPATIAL PROFILOMETRY FOR PRODUCING A UNIFORM LIGHT PROFILE

CROSS REFERENCE TO RELATED APPLICATIONS

This application claims the benefit of U.S. Provisional Patent Application Ser. No. 63/369,019 (filed Jul. 21, 2022), which is herein incorporated by reference in its entirety.

STATEMENT REGARDING FEDERALLY SPONSORED RESEARCH

This invention was made with United States Government support from the National Institute of Standards and Technology (NIST), an agency of the United States Department of Commerce. The Government has certain rights in this invention.

BRIEF DESCRIPTION

Disclosed is a spatio-temporal profilometer for performing time-resolved spatial profilometry, the spatio-temporal profilometer comprising: a substrate; a tapered optical collimator waveguide disposed on the substrate and that receives diverging light, internally reflects the diverging light by internal reflections on collimating sidewalls of tapered optical collimator waveguide, collimates the diverging light in response to the internal reflections on collimating sidewall, produces intermediate light from the diverging light due to the internal reflections, produces collimated light from the intermediate light that is communicated from the tapered optical collimator waveguide, such that the tapered optical collimator waveguide comprises: an optical collimator entry wall that receives diverging light and communicates diverging light into an interior of the tapered optical collimator waveguide; the collimating sidewalls disposed obliquely to the optical collimator entry wall and comprising a first collimating sidewall and a second collimating sidewall that obliquely opposes the first collimating sidewall, such that the first collimating sidewall and the second collimating sidewall internally reflect the diverging light inside of the tapered optical collimator waveguide and convert the diverging light to the intermediate light; and an optical collimator exit wall obliquely disposed to the collimating sidewall and opposing the optical collimator entry wall and that receives the intermediate light from the interior of the tapered optical collimator waveguide, and communicates the intermediate light as collimated light, such that the collimated light is collimated; a fluid channel in optical communication with the tapered optical collimator waveguide and comprising: a fluid channel entry that receives a fluid comprising microparticles and communicates the microparticles into an interior of the fluid channel; fluid channel sidewalls disposed along a length of the fluid channel and that constrain flow of the fluid to the interior of the fluid channel; and a fluid channel exit that communicates the fluid out of the fluid channel; and a light-fluid interaction volume disposed in the fluid channel and provided by an overlap within the fluid channel of the collimated light from the tapered optical collimator waveguide and the fluid; and a light-fluid interaction volume boundary that bounds the light-fluid interaction volume at a periphery of the collimated light that propagates in the fluid channel, such that the fluid channel receives the fluid with the microparticles and the collimated light in the light-fluid interaction volume, produces product light from the collimated light in response to the microparticles interacting with the collimated light in the light-fluid interaction volume, and communicates the product light out of the fluid channel.

Disclosed is a process for performing time-resolved spatial profilometry, the process comprising: receiving diverging light by an optical collimator entry wall of a tapered optical collimator waveguide of a spatio-temporal profilometer, the spatio-temporal profilometer comprising: a substrate; the tapered optical collimator waveguide disposed on the substrate and comprising: the optical collimator entry wall; collimating sidewalls disposed obliquely to the optical collimator entry wall and comprising a first collimating sidewall and a second collimating sidewall that obliquely opposes the first collimating sidewall; and an optical collimator exit wall obliquely disposed to the collimating sidewall and opposing the optical collimator entry wall; a fluid channel in optical communication with the tapered optical collimator waveguide and comprising: a fluid channel entry; fluid channel sidewalls in fluid communication with the fluid channel entry and disposed along a length of the fluid channel; and a fluid channel exit that communicates the fluid out of the fluid channel; and a light-fluid interaction volume disposed in the fluid channel and provided by an overlap within the fluid channel of the collimated light from the tapered optical collimator waveguide and the fluid; and a light-fluid interaction volume boundary that bounds the light-fluid interaction volume at a periphery of the collimated light that propagates in the fluid channel; communicating the diverging light from the optical collimator entry wall, into an interior of the tapered optical collimator waveguide; internally reflecting the diverging light between the first collimating sidewall and the second collimating sidewall inside of the tapered optical collimator waveguide and collimating the diverging light in response to the internal reflections on the collimating sidewalls; producing intermediate light from the diverging light due to the internal reflections; receiving, by the optical collimator exit wall, the intermediate light from the interior of the tapered optical collimator waveguide; communicating the intermediate light as collimated light from the optical collimator exit wall, such that the collimated light is collimated; receiving, by the fluid channel entry of the fluid channel, a fluid comprising microparticles and communicating the microparticles into an interior of the fluid channel; receiving, by the fluid channel entry, the collimated light from the tapered optical collimator waveguide; subjecting the microparticles to the collimated light in the light-fluid interaction volume; producing product light from the collimated light in response to the microparticles interacting with the collimated light in the light-fluid interaction volume; communicating the product light out of the fluid channel; detecting the product light from the fluid channel; and determining a spatial profile and a temporal profile of the microparticles flowing in the light-fluid interaction volume from the product light.

BRIEF DESCRIPTION OF THE DRAWINGS

The following description cannot be considered limiting in any way. Various objectives, features, and advantages of the disclosed subject matter can be more fully appreciated with reference to the following detailed description of the disclosed subject matter when considered in connection with the following drawings, in which like reference numerals identify like elements.

DETAILED DESCRIPTION

Figure 1:
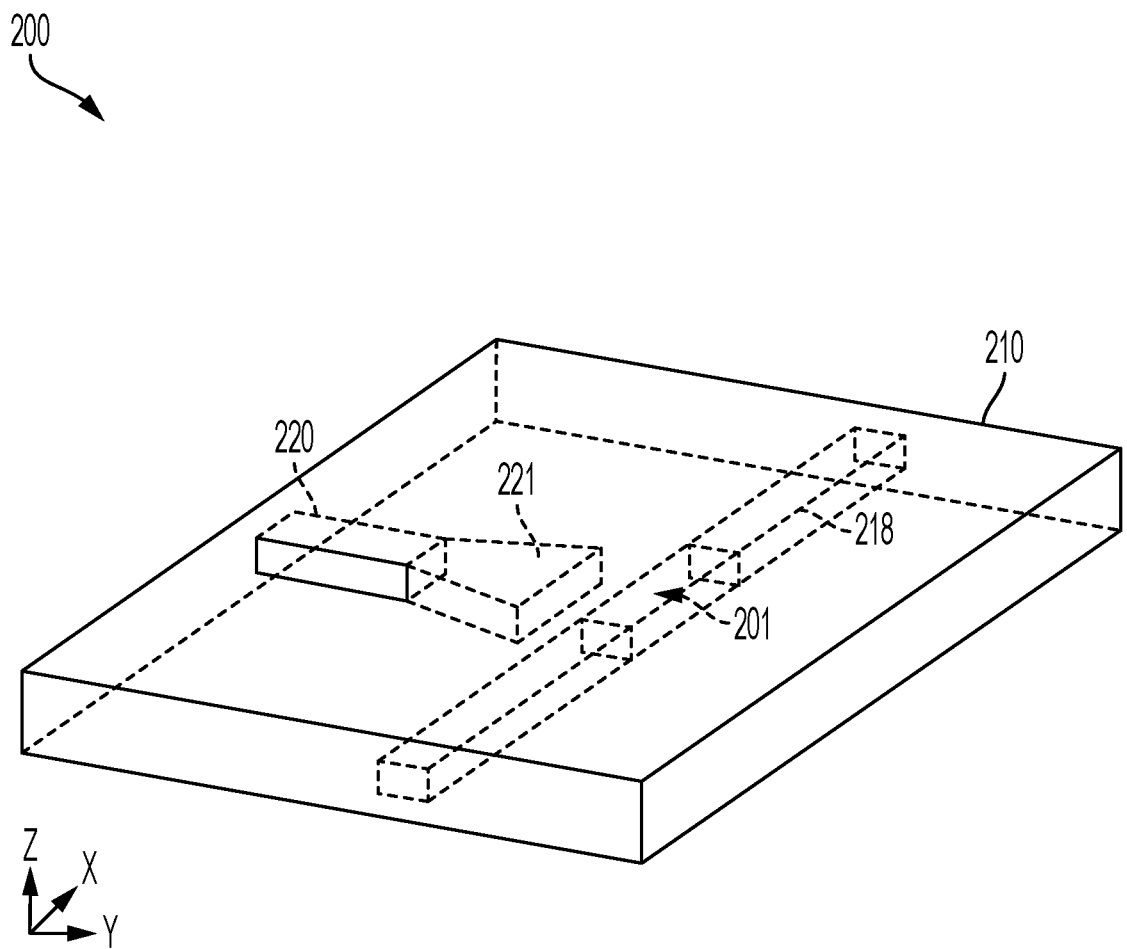
FIG. 1 shows, according to some embodiments, a perspective view of a spatio-temporal profilometer.
Figure 2:
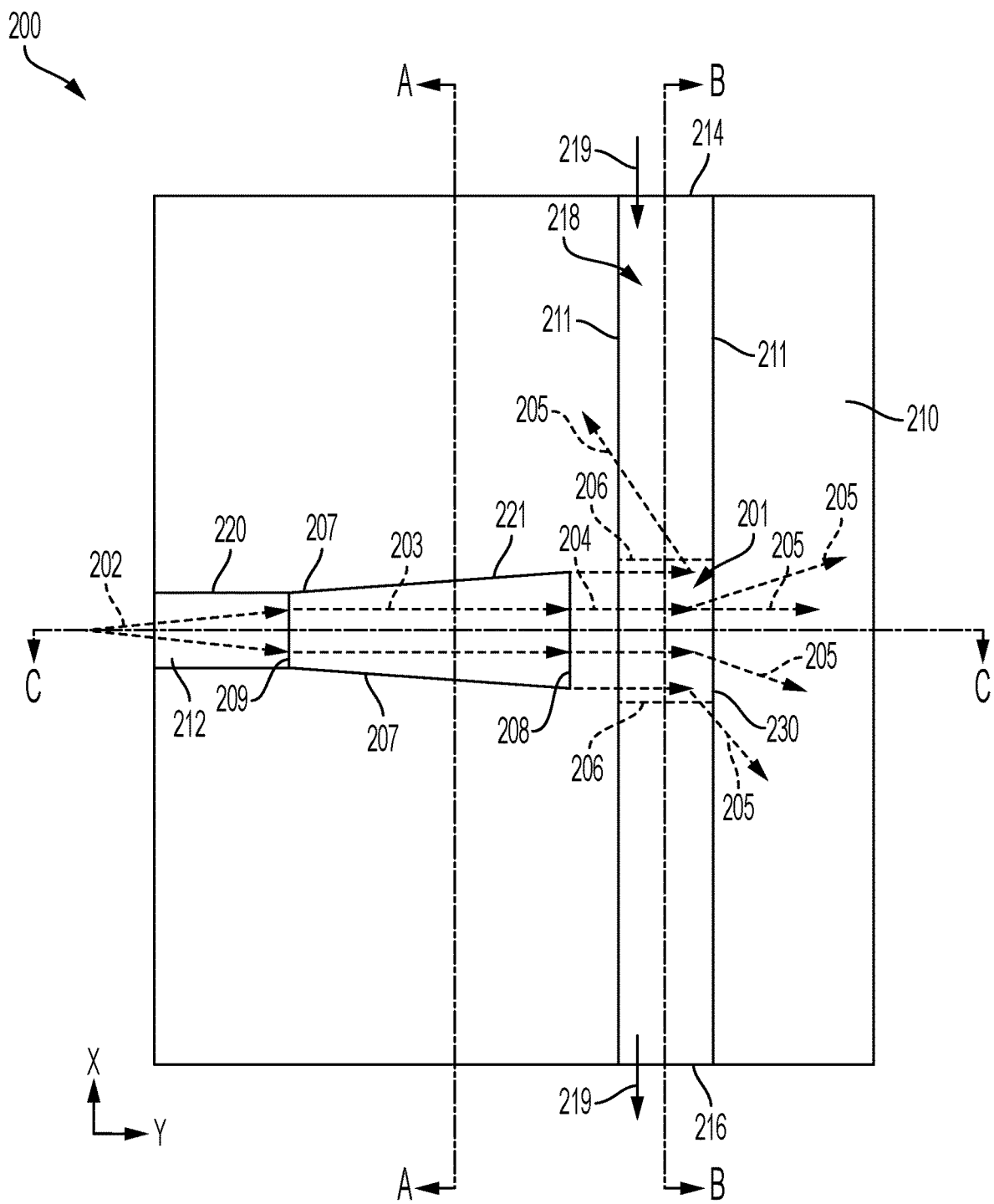
FIG. 2 shows, according to some embodiments, a plan view of the spatio-temporal profilometer shown in FIG. 1.
Figure 3A:
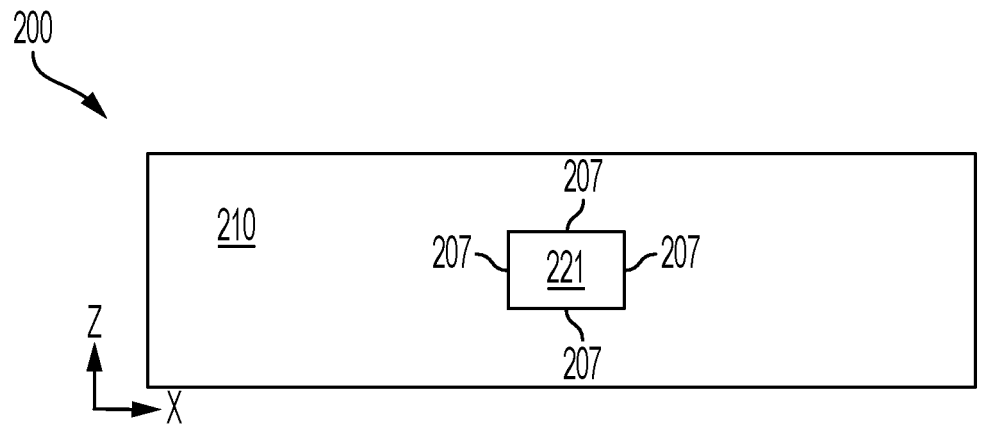
FIG. 3 shows, according to some embodiments: (A) a cross-section along line A-A of the spatio-temporal profilometer shown in FIG. 2, (B) a cross-section along line B-B of the spatio-temporal profilometer shown in FIG. 2, and (C) a cross-section along line C-C of the spatio-temporal profilometer shown in FIG. 2.
Figure 3B:
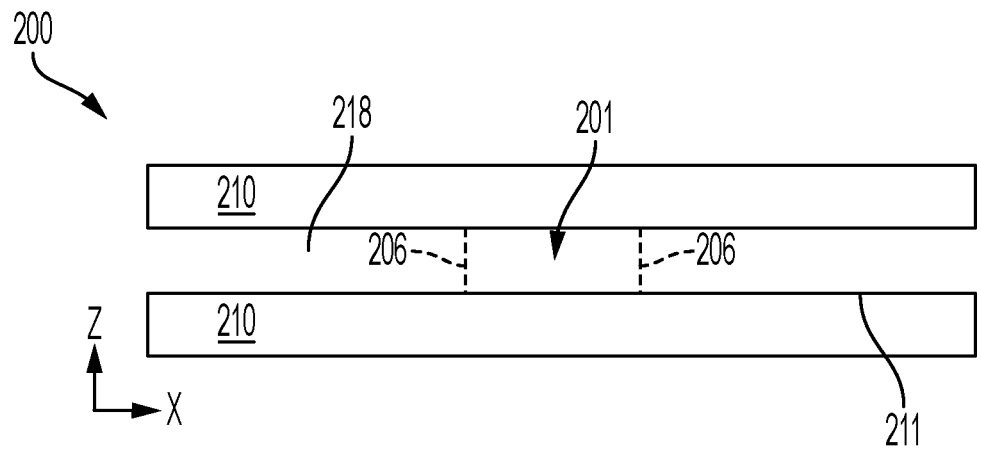
Figure 3C:
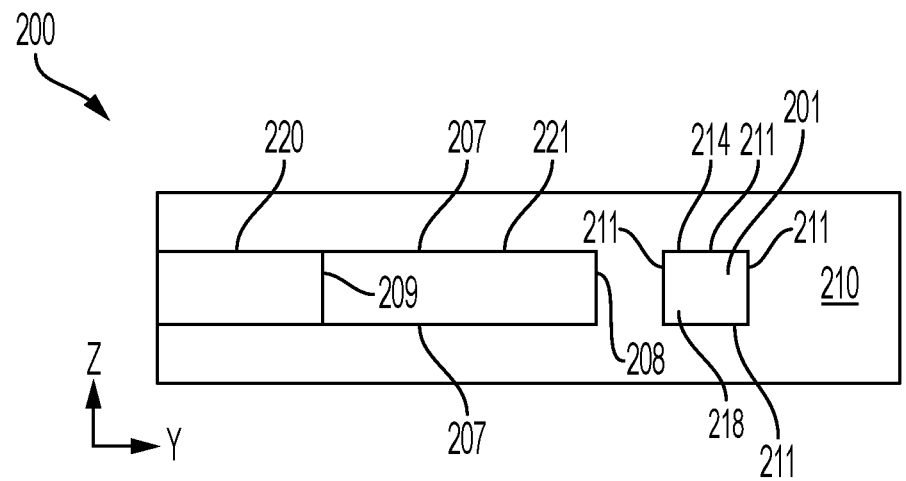
Figure 4:
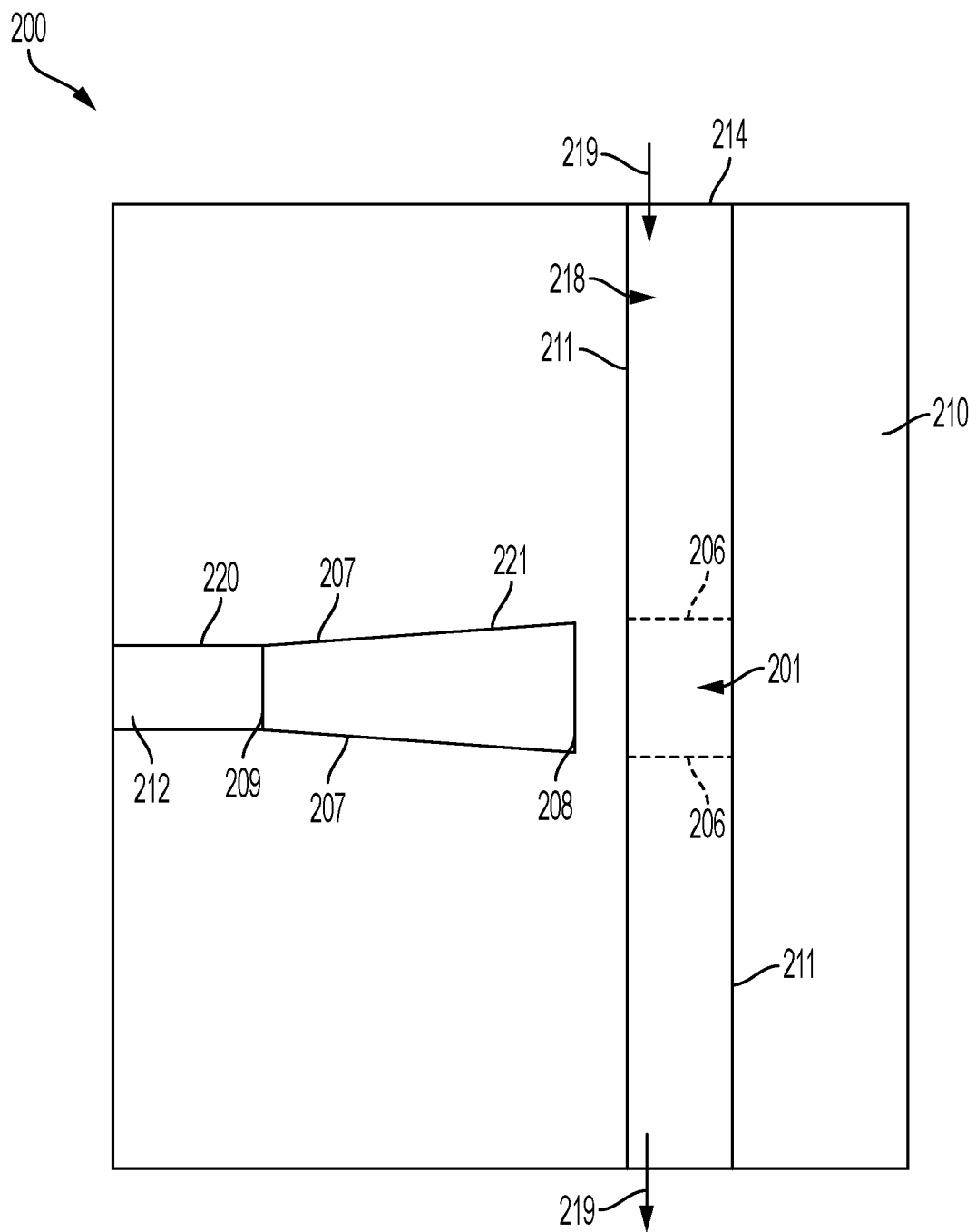
FIG. 4 shows, according to some embodiments, a spatio-temporal profilometer.
Figure 5:
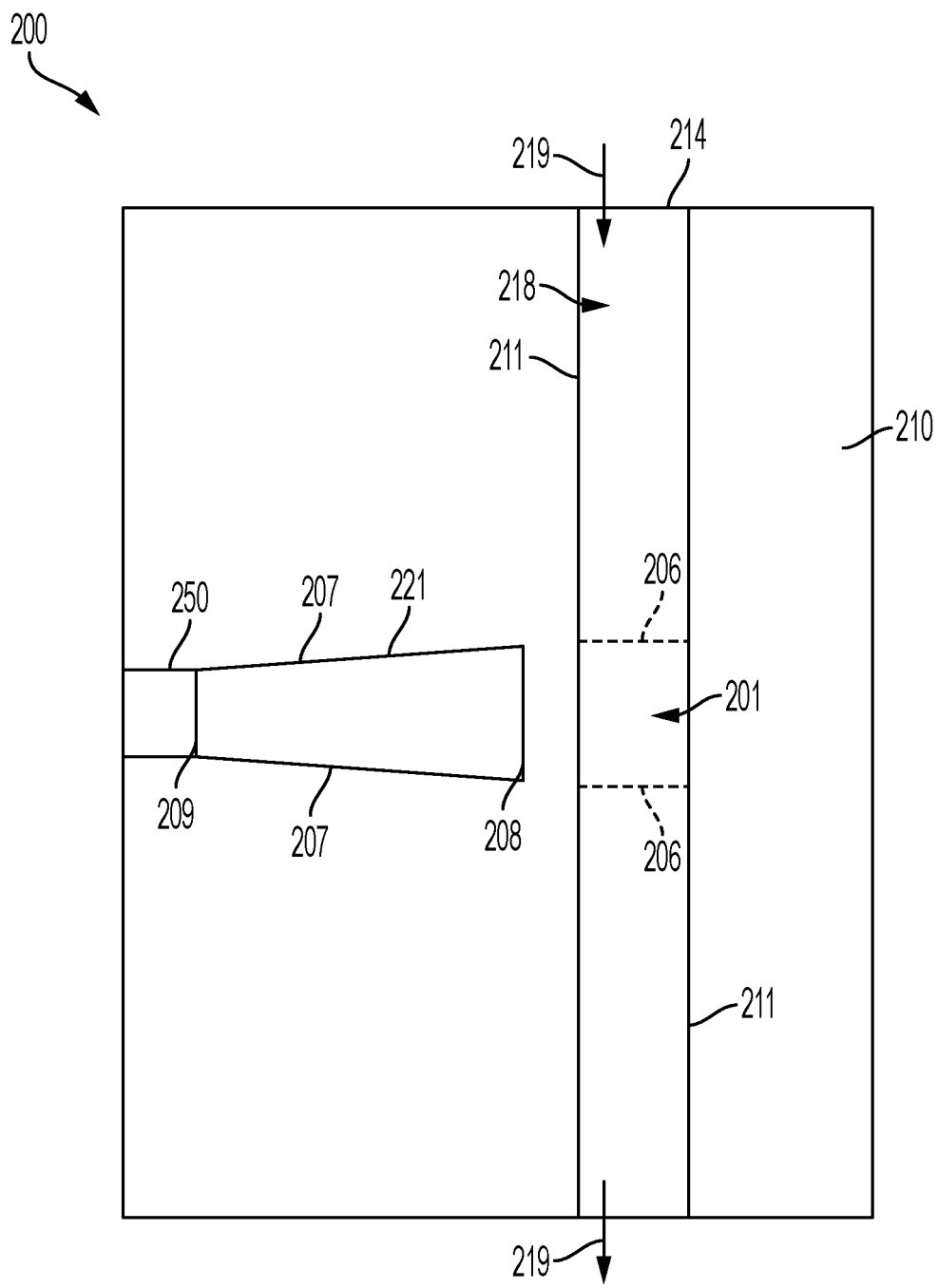
FIG. 5 shows, according to some embodiments, a spatio-temporal profilometer.
Figure 6:
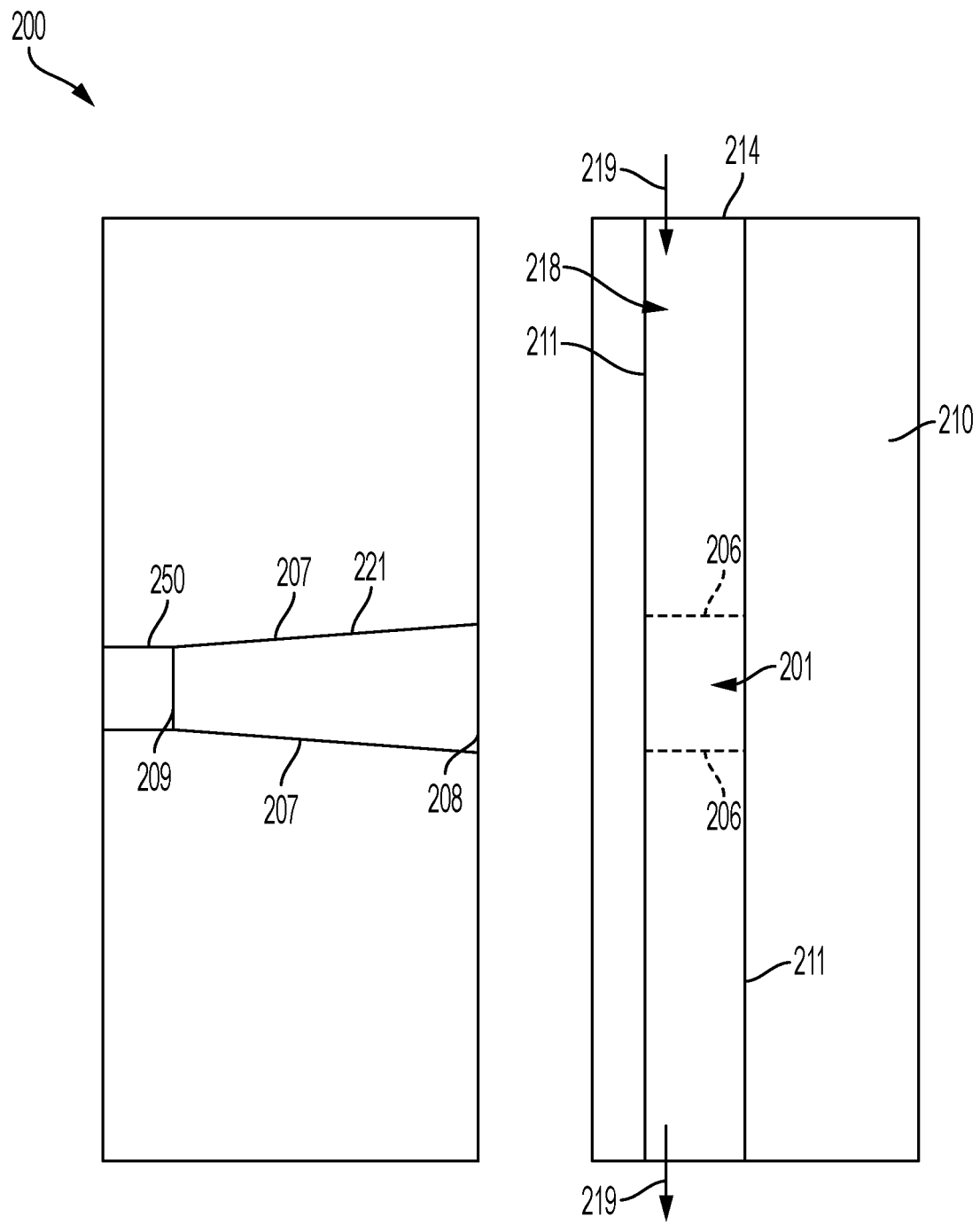
FIG. 6 shows, according to some embodiments, a spatio-temporal profilometer.

A detailed description of one or more embodiments is presented herein by way of exemplification and not limitation.

The collimation of light is an important concept in optics. It is used in a wide variety of applications, such as laser alignment, microscopy, spectroscopy, and cytometry. Collimated light is light that propagates in parallel rays, while divergent light spreads out during propagation. Conventional ways to make collimated light from divergent light include using a lens, a mirror, or combination of lenses and mirrors. A lens is a curved optic that bends light rays. When a divergent light beam passes through a lens, the lens bends the rays to attempt to produce rays that travel in parallel. The focal length of the lens determines how well the light is collimated. The longer the focal length, the higher the degree of collimation. A mirror includes a surface that reflects light rays. When a divergent light beam is incident on a mirror, the mirror reflects the rays to attempt to produce lights rays that propagate in parallel. The type of mirror that is used affects how well the light is collimated. A parabolic mirror has been found to one of the most effective type of mirror for collimating light. In some cases, a combination of lenses and mirrors are used to attempt to collimate light, e.g., when the light source is large or for increased collimation. Some of the factors that affect the collimation of light include: the size of the light source, wherein the smaller the light source, the better the collimation; distance between the light source and the collimating device, wherein the closer the light source is to the collimating device, the better the collimation; or focal length of the collimating device, wherein the longer the focal length, the better the collimation. However, conventional technology including just mirrors or lenses, alone or in combination, fail to provide high degree of collimation suitable for acquiring highly resolved temporal and spatial data from flowing microparticles. Spatio-temporal profilometer 200 overcomes the technical limitations of such conventional technology and provides highly-resolved temporal and spatial data for flowing microparticles.

It is technically challenging to make uniform light profiles inside microfluidic devices. Controlling the uniformity and spatial extent of light within microsystems permits robust fabrication and improves measurement capabilities. Conventional optical interfaces to microscopes involve cumbersome optics or spatial light modulators that can have limited adaptability and high fabrication or computational complexity. There is a long-standing an unmet need to improve the measurement of materials in optofluidic devices used in flow cytometry and imaging with uniform light profiles that have sharp boundaries. Spatio-temporal profilometer 200 fills this need, is easy and inexpensive to make, is adaptable to many systems, is durable, and is small in size and does not require additional optical components.

It has been discovered that spatio-temporal profilometer 200 receives and modifies light from an input source with efficient output and projects a uniform light beam across a microfluidic interrogation region. Spatio-temporal profilometer 200 has an integrated structure that can include an optical waveguide of a particular shape that creates a collimated and uniform light beam in an absence of certain optical elements such as lenses to produce collimated light that is free from common sources of aberration. Spatio-temporal profilometer 200 solves the problem of creating wide, optical beams that have uniform intensity through their cross section. Spatio-temporal profilometer 200 and such light profiles are useful in optical measurement systems, including optofluidic applications such as cytometry and imaging. Advantageously, spatio-temporal profilometer 200 provides optical output that is a uniform top-hat or flat-top illumination profile emanating in 3 dimensions.

Spatio-temporal profilometer 200 performs time-resolved spatial profilometry. In an embodiment, with reference to FIG. 1, FIG. 2, FIG. 3, FIG. 4, FIG. 5, FIG. 6, FIG. 7, FIG. 8, FIG. 9, FIG. 10, FIG. 11, and FIG. 12, spatio-temporal profilometer 200 includes: substrate 210; tapered optical collimator waveguide 221 disposed on substrate 210 and that receives diverging light 202, internally reflects diverging light 202 by internal reflections on collimating sidewalls 207 of tapered optical collimator waveguide 221, collimates diverging light 202 in response to the internal reflections on collimating sidewall 207, produces intermediate light 203 from the diverging light 202 due to the internal reflections, produces collimated light 204 from intermediate light 203 that is communicated from tapered optical collimator waveguide 221, such that tapered optical collimator waveguide 221 includes: optical collimator entry wall 209 that receives diverging light 202 and communicates diverging light 202 into an interior of tapered optical collimator waveguide 221; collimating sidewalls 207 disposed obliquely to optical collimator entry wall 209 and including a first collimating sidewall 207 and a second collimating sidewall 207 that obliquely opposes the first collimating sidewall 207, such that the first collimating sidewall 207 and the second collimating sidewall 207 internally reflect the diverging light 202 inside of tapered optical collimator waveguide 221 and convert diverging light 202 to intermediate light 203; and an optical collimator exit wall 208 obliquely disposed to collimating sidewall 207 and opposing optical collimator entry wall 209 and that receives intermediate light 203 from the interior of tapered optical collimator waveguide 221, and communicates intermediate light 203 as collimated light 204, such that collimated light 204 is collimated; fluid channel 218 in optical communication with tapered optical collimator waveguide 221 and including: fluid channel entry 214 that receives fluid 219 including microparticles 225 and communicates microparticles 225 into an interior of fluid channel 218; fluid channel sidewalls 211 disposed along a length of fluid channel 218 and that constrain flow of fluid 219 to the interior of fluid channel 218; and fluid channel exit 216 that communicates fluid 219 out of fluid channel 218; and light-fluid interaction volume 201 disposed in fluid channel 218 and provided by an overlap within fluid channel 218 of collimated light 204 from tapered optical collimator waveguide 221 and fluid 219; and light-fluid interaction volume boundary 206 that bounds light-fluid interaction volume 201 at a periphery of collimated light 204 that propagates in fluid channel 218, such that fluid channel 218 receives fluid 219 with microparticles 225 and collimated light 204 in light-fluid interaction volume 201, produces product light 205 from collimated light 204 in response to microparticles 225 interacting with collimated light 204 in light-fluid interaction volume 201, and communicates product light 205 out of fluid channel 218.

In an embodiment, spatio-temporal profilometer 200 includes optical fiber channel 220 disposed on substrate 210 in optical communication with tapered optical collimator waveguide 221 and that receives diverging light 202 and communicates diverging light 202 to tapered optical collimator waveguide 221. In an embodiment, spatio-temporal profilometer 200 includes optical fiber 212 disposed in optical fiber channel 220 in optical communication with tapered optical collimator waveguide 221 and that receives diverging light 202 and communicates diverging light 202 to tapered optical collimator waveguide 221.

In an embodiment, spatio-temporal profilometer 200 includes forward light detection waveguide 230 disposed on substrate 210 in optical communication with fluid channel 218 and that receives product light 205 that propagates in a forward direction from fluid channel 218 with respect to collimated light 204. In an embodiment, forward light detection waveguide 230 is a straight waveguide or tapered waveguide. In an embodiment, optical fiber 212 is disposed in forward light detection waveguide 230, receives product light 205, and communicates product light 205 to optical detector 251.

In an embodiment, spatio-temporal profilometer 200 includes back light detection waveguide 234 disposed on substrate 210 in optical communication with fluid channel 218 and that receives product light 205 that propagates in a forward direction from fluid channel 218 with respect to collimated light 204. In an embodiment, light blocking member 270 is disposed on substrate 210 in optical communication with tapered optical collimator waveguide 221, is optically interposed between back light detection waveguide 234 and tapered optical collimator waveguide 221, and blocks the light from being communicated between tapered optical collimator waveguide 221 and back light detection waveguide 234. In an embodiment, optical fiber 212 is disposed in back light detection waveguide 234, receives product light 205, and communicates product light 205 to optical detector 251.

In an embodiment, spatio-temporal profilometer 200 includes light source 250 disposed on substrate 210 in optical communication with tapered optical collimator waveguide 221 and that produces diverging light 202 and communicates diverging light 202 to tapered optical collimator waveguide 221.

In an embodiment, spatio-temporal profilometer 200 includes flow controller 260 in fluid communication with fluid channel 218 and that provides the fluid 219 to fluid channel 218.

In an embodiment, spatio-temporal profilometer 200 includes optical detector 251 in optical communication with forward light detection waveguide 230 and that receives product light 205 from forward light detection waveguide 230.

In an embodiment, spatio-temporal profilometer 200 includes out-of-plane light collector 237 in optical communication with forward light detection waveguide 230 and that receives product light 205 from fluid channel 218.

In an embodiment, spatio-temporal profilometer 200 includes a lens disposed between optical collimator exit wall 208 of tapered optical collimator waveguide 221 and fluid channel 218 and that receives collimated light 204 from tapered optical collimator waveguide 221 and communicates collimated light 204 to fluid channel 218.

In an embodiment, flow controller 260 is in fluid communication with fluid channel 218 and provides fluid 219 to fluid channel 218.

In an embodiment, spatio-temporal profilometer 200 includes: a substrate; a microchannel that accepts an optical fiber and contains a tapered waveguide structure; a microchannel that accepts flow of a fluid; and a fluid in a microchannel that can include molecules such as fluorescein or particles such as cells. In an embodiment, spatio-temporal profilometer 200 includes: a light source that communicates input light to a tapered waveguide structure or to an optical fiber that is inserted into optical fiber insertion channel in tapered waveguide structure; an aperture at the end of the tapered waveguide structure that communicates light to the flow channel; an optical interrogation region where light communicated from the light source and modified by the tapered waveguide channel to form patterned light that interacts with chemical or particles within a fluid; a transmission light collecting structure that receives light from the optical interrogation region and communicates light to an optical detector for transmitted light, such that communication of transmission light also can occur through an optical fiber intermediate; and a fluorescence or scatter collecting waveguide that receives fluorescence or scattered light from the optical interrogation region and communicates that light to an optical detector for said light. It is contemplated that additional fluorescence or scatter collecting waveguides can be arranged in other orientations that can be different than or the same as the first such waveguide.

It should be appreciated that spatio-temporal refers to both space and time. Spatio-temporal profilometer 200 is a device that acquires data for microparticle 225 that is localized at a discrete set of locations in both space and time within light-fluid interaction volume 201. Each data point represents the time and location of an interaction event between microparticle 225 and collimated light 204 maintained in product light 205, collected across time as well as space, and has at least one spatial and one temporal property. For example, an event in a spatio-temporal dataset describes a spatial and temporal phenomenon that exists at a certain time and location. Here, data acquired by spatio-temporal profilometer 200 is collected for both physical space dimensions and time of microparticle 225 in light-fluid interaction volume 201.

Spatio-temporal profilometer 200 can be made of various elements and components that are microfabricated, Elements of spatio-temporal profilometer 200 can be various sizes and can be made of a material that is physically or chemically resilient in an environment in which spatio-temporal profilometer 200 is disposed. Exemplary materials include a metal, ceramic, thermoplastic, glass, semiconductor, and the like. The elements of spatio-temporal profilometer 200 can be made of the same or different material and can be monolithic in a single physical body or can be separate members that are physically joined. In an embodiment, elements are made of the same material. In an embodiment, some elements include a different material than other elements.

In an embodiment, substrate 210 includes a cured polymer. In an embodiment, flow of fluid 219 in fluid channel 218 is parallel or orthogonal to propagation of collimated light 204.

Substrate 210 can include a material that provides flow in fluid channel 218. In an embodiment, substrate 210 is disposed in or included in a microfluidic device. Exemplary materials for substrate 210 include polymeric materials such as elastomers (e.g., PDMS), epoxies and adhesives (including tapes and photocurable adhesives), acrylics (e.g., PMMA), polycarbonates, polystyrenes, polyesters, polypropylenes, cyclic olefin copolymers and hard materials, such as glasses, semiconductor materials (e.g., pure and doped silicon), and metals (e.g., aluminum). The region between optical collimator exit wall 208 and fluid channel 218 is transparent to collimated light 204. Substrate 210 can include a combination of transparent, opaque, and reflective boundaries to control light propagation in or through an interior of spatio-temporal profilometer 200. In an embodiment, substrate 210 includes light blocking member 270 that absorbs, scatters, or reflects light out of the optical paths or to prevent cross-talk between light paths.

It is contemplated that substrate 210 includes fluid channel 218. In an embodiment, fluid channel 218 is made in a curable polymer such as PDMS cast from a photoresist pattern provided in a photolithographic process. In an embodiment, fluid channel 218 is formed by laser oblation or chemical etching of a material such as glass. Fluid channel 218 can be made by milling, cutting, embossing, and the like. Printing, e.g., 3D printing of substrate 210 can form fluid channel 218 or other structural element of spatio-temporal profilometer 200.

Figure 7:
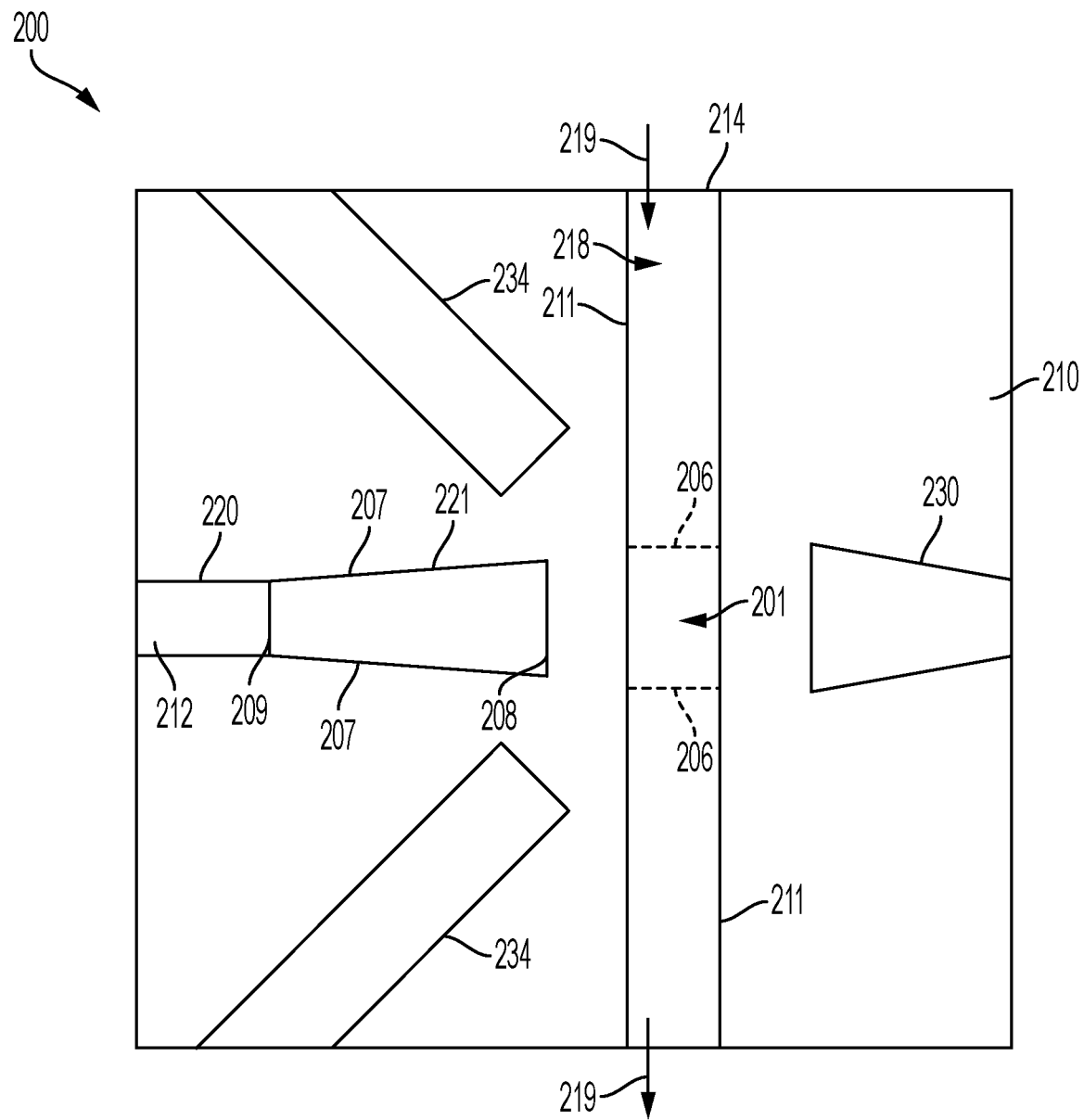
FIG. 7 shows, according to some embodiments, a spatio-temporal profilometer.
Figure 8:
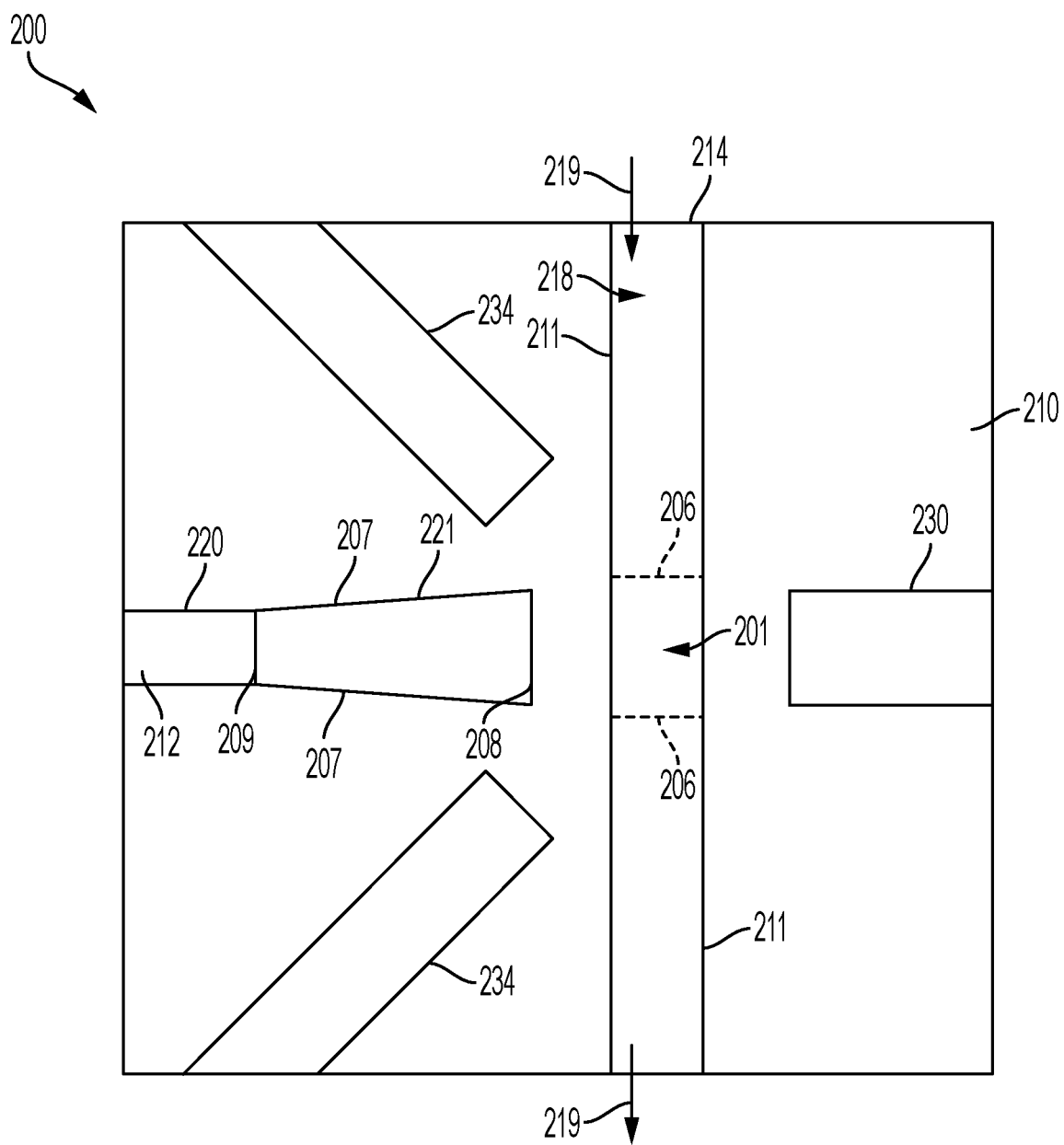
FIG. 8 shows, according to some embodiments, a spatio-temporal profilometer.
Figure 9:
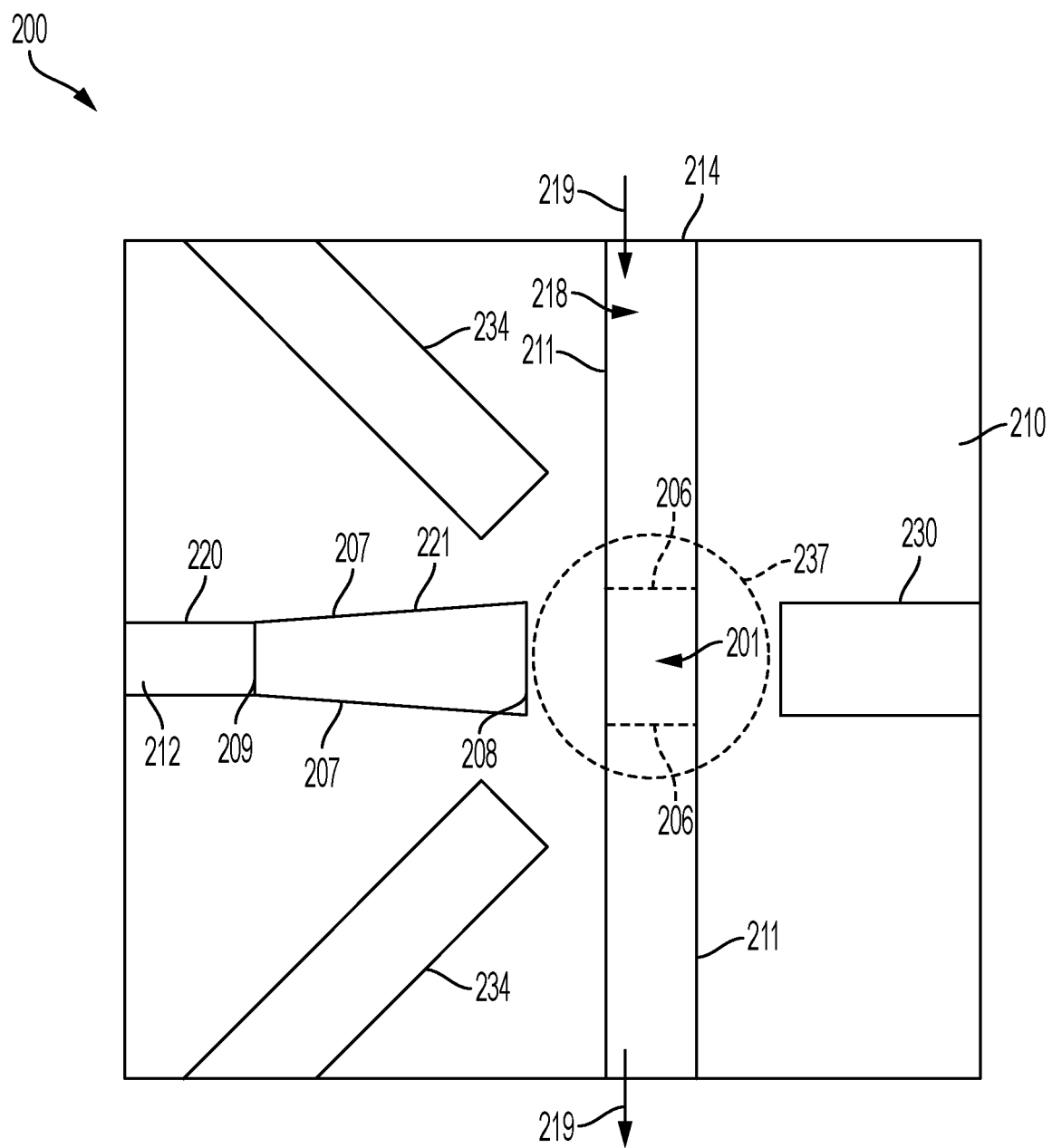
FIG. 9 shows, according to some embodiments, a spatio-temporal profilometer.
Figure 10:
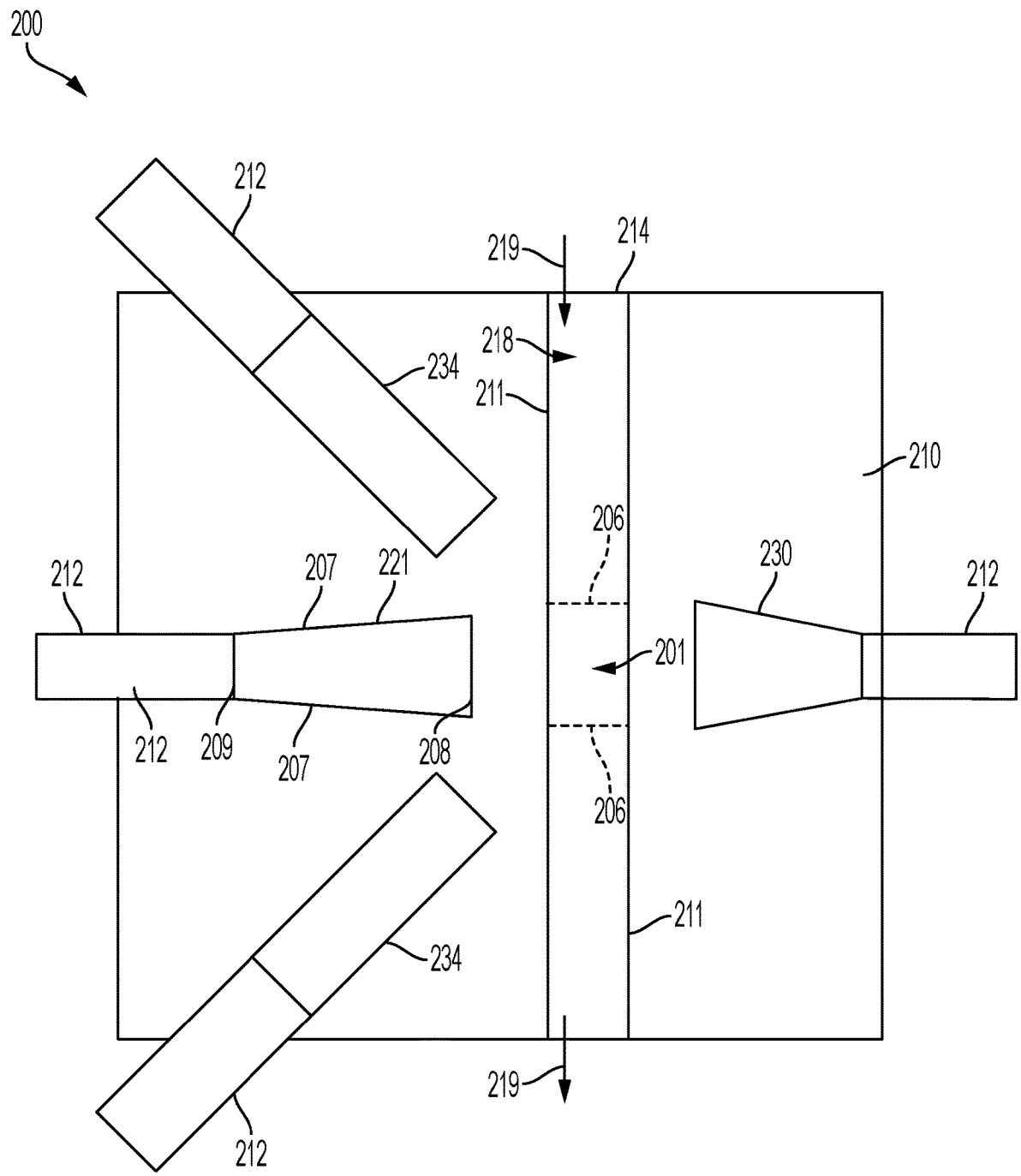
FIG. 10 shows a spatio-temporal profilometer.
Figure 11:
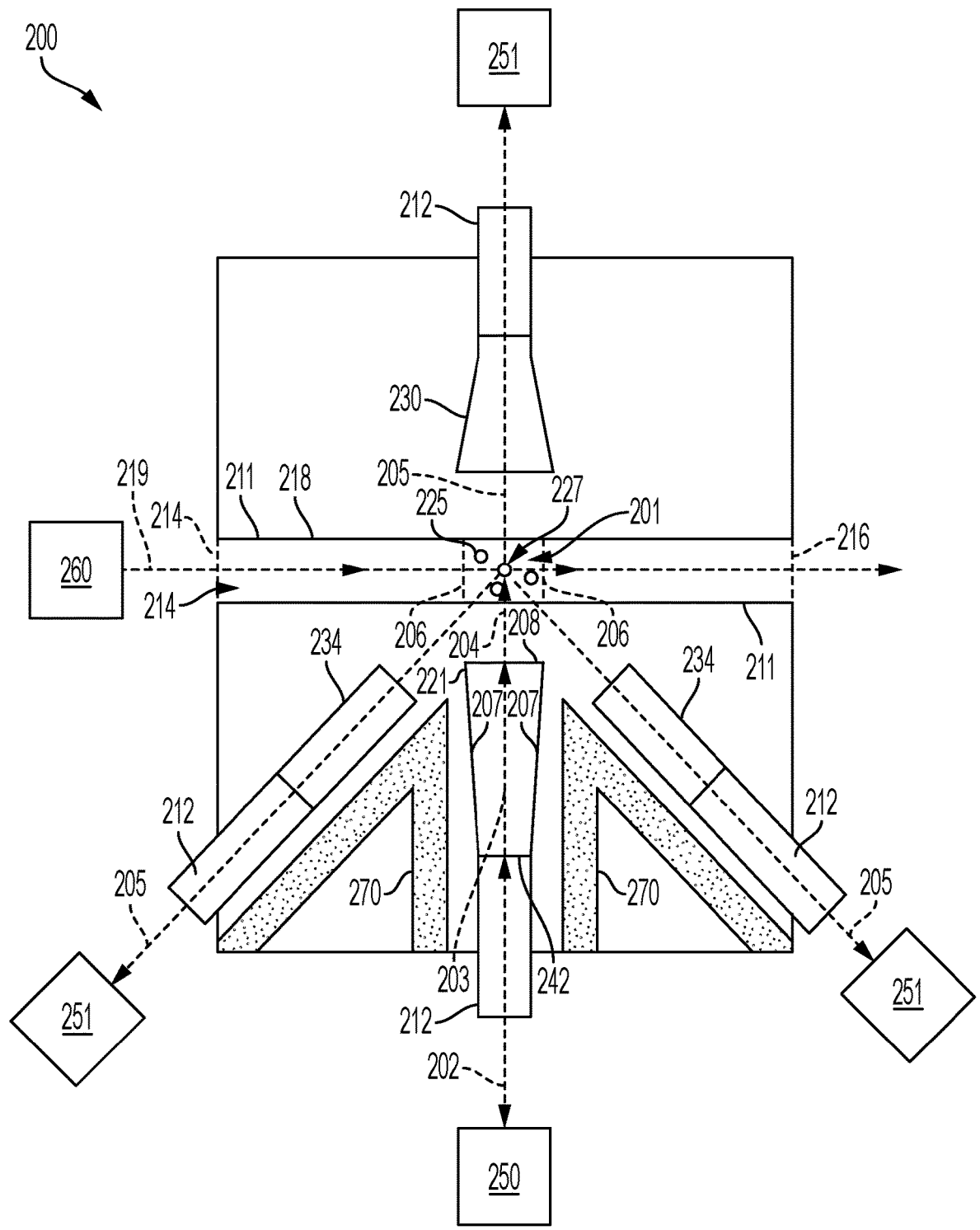
FIG. 11 shows, according to some embodiments, a spatio-temporal profilometer.
Figure 12:
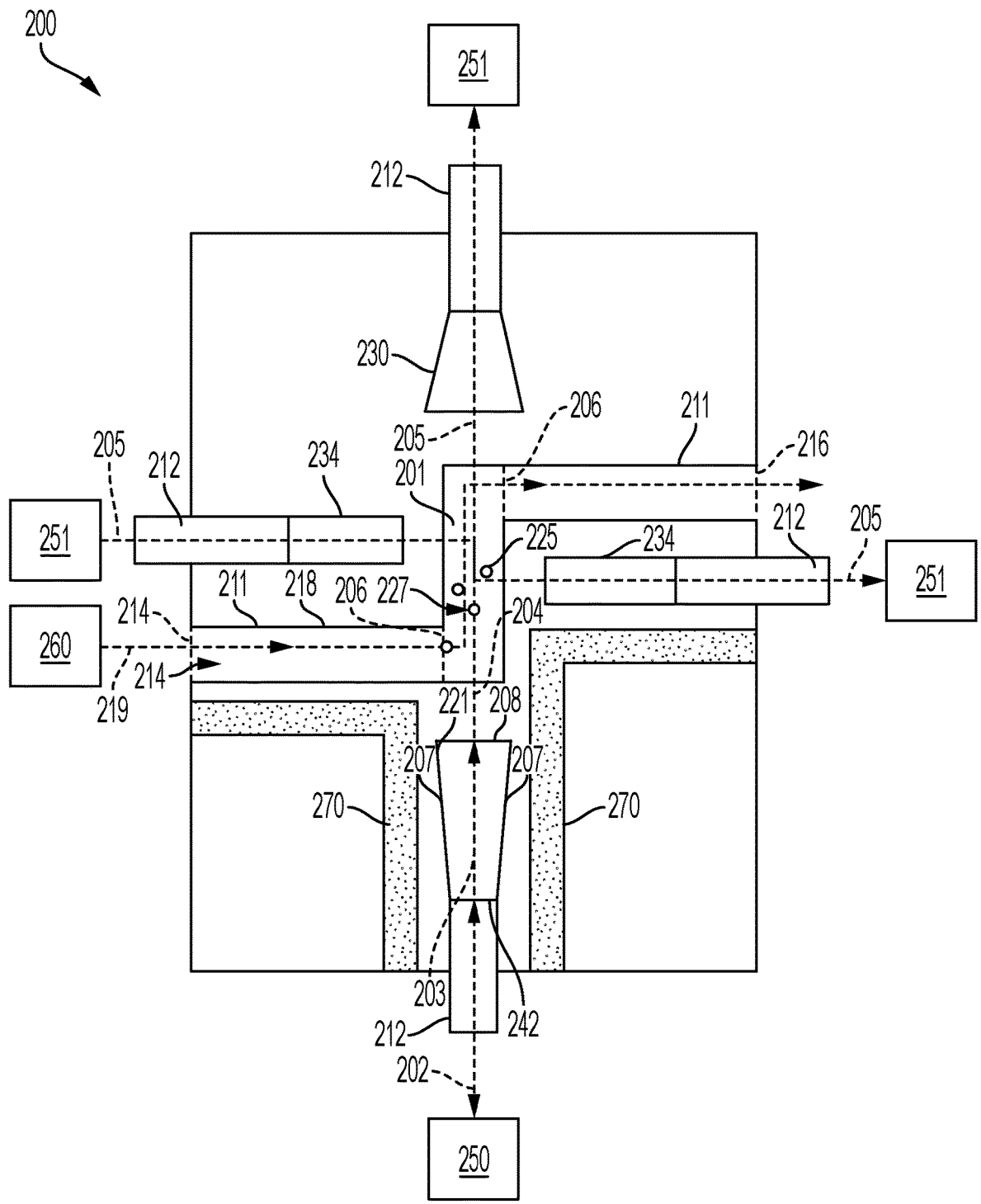
FIG. 12 shows, according to some embodiments, a spatio-temporal profilometer.

Dimensions of fluid channel 218 can be selected based, e.g., on a type of flow through spatio-temporal profilometer 200. Dimensions such as width (W) or height (H) of fluid channel 218 (in direction X or Z) can be from 10 nm to 1 mm, specifically from 1 micrometer to 500 micrometers for fluid 219 such as liquid water. Dimensions can depend on a speed of fluid 219 through flow controller 260 (e.g., a flow meter) or pressure on fluid 219. A shape of fluid channel 218 can be, e.g., rectangular, circular, or a combination thereof and can have a uniform or non-uniform cross section or can be confined to a straight line or fixed within a single plane along its length. Fluid channel 218 can include fluid channel sidewall 211 that bounds fluid channel 218 and that can curve, bend, split or include or a junction that routes liquid in the flow system. It should be appreciated that although FIG. 1 and other figures such as FIG. 7 show straight fluid channel 218, such can be bent as indicated in FIG. 12. A length (L) of fluid channel 218 can be selected based on a size (e.g., a longest linear dimension or volume) of light-fluid interaction volume 201 and that provides selected convective or diffusion of fluid 219 between optical interrogation zones. A length of fluid channel 218 can be from 1 micrometer to 1 meter, specifically from 10 micrometers to 10 centimeters. In an embodiment, fluid channel 218 has a cross-section that is rectilinear, e.g., rectangular, wherein a width and height are independently selected and can be, e.g., 125 micrometers in one of the dimensions. In an embodiment, fluid channel 218 is a glass capillary that has an internal diameter of 150 micrometers.

Fluid channel entry 214 fluidically interconnects fluid channel 218 to flow controller 260 that can be an external source of fluid 219. Fluid channel exit 216 can fluidically interconnect fluid channel 218 to a fluid sink. Fluid channel entry 214 and fluid channel exit 216 can transition in form and function to fluid channel 218 and can have similar cross-sectional dimensions. Additionally, valves or bifurcations can control liquid flow to or in fluid channel 218.

Fluid 219 flows through fluid channel 218 and can be any suitable fluid that is compatible with fluid channel 218 such as a gas, liquid, or a combination thereof. It is contemplated that fluid 219 includes microparticle 225 that can include solid particles, compounds, or small molecules disposed in a liquid or gas. Exemplary fluids 219 include water, bodily fluids, and organic solvents such as alcohols and fuels. The solid particles, compounds, and small molecules can include chemical compounds that absorb, scatter or emit light such as fluorescent dyes, inorganic or organic micro- or nano-particles, biological materials such as proteins and protein aggregates, lipid vesicles, exosomes, organelles and cells. Moreover, fluid 219 can include a combination of a solution of different materials. In an embodiment, fluid 219 includes microparticles 225. It should be appreciated that microparticle 225 can be any size, shape, or chemical compound including any of the previous mentioned components, single molecules, conjugated molecules, polymers and the like, wherein microparticle 225 is disposed in fluid 219, flows without obstructing fluid channel 218, and interacts in light-fluid interaction volume 201 with collimated light 204 to convert collimated light 204 to product light 205 that exits light-fluid interaction volume 201 and is received by a detection waveguide (e.g., 230, 234).

Depending on substrate 210, fluid 219, or dimensions of fluid channel 218, a pressure of fluid 219 in fluid channel 218 can be from 0 Pa·scals (Pa) to 700 kPa, specifically from 0 Pa to 130 kPa, and more specifically from 0 Pa to 70 kPa. A viscosity of fluid 219 can be from $1\times10^{-6}$ to 1 Pa·s, specifically from $10\times10^{-6}$ to 0.1 Pa·s, and more specifically from $1\times10^{-4}$ to 0.01 Pa·s. Flow can be unidirectional, and pressure can be positive or negative.

Fluid 219 can independently include reflective, absorptive, fluorescent, reactive, or optically active molecules or particles that permit contrast in the presence of collimated light 204. Fluid 219 can include fluorescein or derivatives thereof. Specifically, a derivative can be fluorescein-conjugated dextran or a CMNB-caged carboxyfluorescein, or its derivatives. Fluid components can be selected based on the wavelength of light to activate, deactivate, or excite components of fluid 219. Components of fluid 219 can be selected on a diffusion coefficient, absorbance, or emission spectra. Excitation, bleaching, and emission wavelengths independently can be from 240 nm and 1000 nm, and specifically from 350 nm and 750 nm.

Waveguides (e.g., 220, 221, 230, 240) can be disposed in substrate 210 as a microchannel, e.g., a void in substrate 210. Optical fiber channel 220 and tapered optical collimator waveguide 221 are in optical communication with light source 250. back light detection waveguide 234 and forward light detection waveguide 230 can be in optical communication with optical detector 251. Optical fiber 240 can be disposed along light paths. The light path can include a bifurcation or optical element that changes a direction, intensity, or spectrum of light along the light path.

Light source 250 can include a light-emitting diode or laser that emits light at a desired wavelength. Properties of diverging light 202 can be selected based on the desired power density and spectral features or level of interaction with microparticle 225 or other component of fluid 219.

Collimated light 204 can be used to induce fluorescence, scatter, or absorption in fluid 219 in light-fluid interaction volume 201. In an embodiment, fluid 219 includes fluorescein. Diverging light 202 that is used to make collimated light 204 can be selected based on interaction with microparticle 225 and can have a wavelength from 240 nm to 1000 nm, more specifically from 350 nm to 750 nm. In an embodiment, the wavelength of collimated light 204 is from 450 nm to 500 nm, specifically from 470 nm to 490 nm. An intensity of collimated light 204 is selected based on interaction with microparticle 225, nature of flow of fluid 219, or desired characteristics of product light 205. The intensity of collimated light 204 can be from 1 nanowatt (nW) to 1 W. In an embodiment, the intensity of collimated light 204 is from 1 mW to 200 mW.

Tapered optical collimator waveguide 221 communicates collimated light 204 to light-fluid interaction volume 201 and is made from diverging light 202 via internal reflection on collimating sidewall 207 that coverts diverging light 202 to intermediate light 203 that ultimately is collimated and leaves tapered optical collimator waveguide 221 from optical collimator exit wall 208 as collimated light 204. Moreover, the light path can include a filter or bifurcation to reduce intensity of collimated light 204 or direct part of collimated light 204 to a light intensity meter. In an embodiment, tapered optical collimator waveguide 221 is filled with optical material that permits total internal reflection of diverging light 202 and intermediate light 203. In an embodiment, the optical material is a photocurable adhesive that has a higher index of refraction than substrate 210. In an embodiment, the optical material filling tapered optical collimator waveguide 221 is dyed by a fluorescent compound. In an embodiment, optical collimator exit wall 208. In an embodiment, optical collimator exit wall 208 is curved to shape collimated light 204 in light-fluid interaction volume 201. In an embodiment, tapered optical collimator waveguide 221 has tapered collimating sidewalls 207 that progressively increase a width of tapered optical collimator waveguide 221 along the propagation direction of diverging light 202 in tapered optical collimator waveguide 221 to the width of optical collimator exit wall 208. In an embodiment, tapered optical collimator waveguide 221 has parabolic collimating sidewalls 207. In an embodiment, collimated light 204 has approximately uniform intensity across light-fluid interaction volume 201. In an embodiment, an optical element can be interposed between optical collimator exit wall 208 and fluid channel 218 to modify a shape of collimated light 204. The optical elements can be lenses that narrow and focus collimated light 204 into a light sheet through light-fluid interaction volume 201. In an embodiment, optical fiber 240 is disposed in optical fiber channel 220 up to optical collimator entry wall 209. In an embodiment, optical fiber 212 is inserted in tapered optical collimator waveguide 221, e.g., to optical collimator exit wall 208. In an embodiment, optical fiber 212 is a 125-micrometer diameter multimode fiber that communicates visible light.

Light-fluid interaction volume 201 is where collimated light 204 interacts with microparticle 225 or other components of fluid 219 to produce product light 205 that can include fluorescence, bleaching, scattering, or absorption. In an embodiment, collimated light 204 induces microparticle 225 to emit fluorescence. In an embodiment, collimated light 204 causes microparticle 225 to emit fluorescent light and microparticle 225 to bleach (e.g., be optically changed by collimated light 204 to stop emitting fluorescence). The intensity of collimated light 204 with the amount of time microparticle 225 spends in light-fluid interaction volume 201 (e.g., the speed of fluid 219) can determine an amount of bleaching versus emitted fluorescence. In an embodiment, optical detector 251 is in optical communication with, e.g., forward light detection waveguide 230, by optical fiber 240. In an embodiment, optical fiber 240 is a 125-micrometer diameter multimode fiber that carries a visible wavelength of light.

In spatio-temporal profilometer 200, microparticle 225 can be a deactivated state of microparticle 225, an excited state of microparticle 225, or a modified variant of microparticle 225. The type of microparticle 225 can be selected based on an interaction time with input light, color of emitted or scattered light, or an increase in signal to noise ratio in photodetector 248.

Forward light detection waveguide 230 or other detection waveguide, e.g., back light detection waveguide 234 or out-of-plane light collector 237, receives product light 205 from light-fluid interaction volume 201 in fluid channel 218 and can communicate product light 205 to optical detector 251 or to some other member for analysis or use either on substrate 210 or external to substrate 210. Optical modification members such as a filter or bifurcation can be included with, in, or after these waveguides and can reduce the intensity of product light 205 or direct part of product light 205 to optical detector 251 that can include, e.g., a light intensity meter, spectrometer, and the like. In an embodiment, forward light detection waveguide 230, back light detection waveguide 234, or out-of-plane light collector 237 can be filled with optical material that permits total internal refection of light. In an embodiment, the optical material is a photocurable adhesive that has a higher index of refraction than substrate 210. In an embodiment, forward light detection waveguide 230 includes a lens to focus product light 205 into forward light detection waveguide 230 or optical fiber 240 and can be wider than tapered optical collimator waveguide 221 to capture more light from light-fluid interaction volume 201.

Product light 205 can be fluorescence, scattered light, or a change in transmission of collimated light 204 resulting from interaction of collimated light 204 with microparticle 225 in light-fluid interaction volume 201. In an embodiment product light 205 is emitted light from a fluorescent microparticle 225. In an embodiment, product light 205 can include loss of fluorescence due to photobleaching of microparticle 225. Transmission of product light 205 to forward light detection waveguide 230 or back light detection waveguide 234 can be modified by optical components. Product light 205 can have a wavelength from 240 nm to 1000 nm, specifically from 350 nm to 750 nm.

Optical detector 251 receives product light 205 and can record properties of product light 205. In an embodiment, product light 205 is in optical communication with forward light detection waveguide 230 other optical detector 251 can be connected back light detection waveguide 234 or out-of-plane light collector 237 when present. Optical fiber 240 can be interposed between forward light detection waveguide 230, back light detection waveguide 234, or out-of-plane light collector 237 and its optical detector 251. In an embodiment, optical fiber 240 is a 125-micrometer diameter multimode fiber that carries a visible wavelength of light. In an embodiment, optical detector 251 is a broadband photodiode connected to a power meter. In an embodiment, the photodiode has a spectral range from 200 nm to 1100 nm. In an embodiment, the photodiode is preceded by an optical filter that reduces the effective power of the light transmitted to optical detector 251. In an embodiment, the photodiode is preceded by a spectral filter to reduce the spectral bandwidth of the transmitted light reaching optical detector 251. In an embodiment, the combined photodiode and power meter has a sensitivity in a power range from 10 pW to 200 mW. In an embodiment, optical detector 251 is a spectrometer that measures a spectrum of product light 205. The photodetector can be a photodiode, photomultiplier tube, avalanche photodiode or the like. In an embodiment, optical detector 251 can be an optical component disposed on substrate 210. In an embodiment, measurements provided by optical detector 251 provide an estimated power of collimated light 204 incident on microparticle 225 and measures time-dependent changes in the interaction between collimated light 204 and microparticle 225 through processing of product light 205. In an embodiment, power and spatial uniformity of collimated light 204 or product light 205 in light-fluid interaction volume 201 is measured by a wide-field fluorescence microscope that can be in optical communication with light-fluid interaction volume 201, e.g., via out-of-plane light collector 237. In an embodiment, a light propagation path can be visualized with fluorescein as a component of fluid 219, wherein collimated light 204 has a wavelength of 488 nm, and the microscope is viewing fluid channel 218 (particularly light-fluid interaction volume 201) from above the plane of substrate 210 as indicated by out-of-plane light collector 237 shown in FIG. 9. In an embodiment, the spatial uniformity of collimated light 204 observed from optical collimator exit wall 208 on the optical axis of tapered optical collimator waveguide 221 is visualized by acquiring collimated light 204 in a microscope in the position of optical detector 251. In an embodiment, the filter blocks wavelengths outside the range from 500 nm to 540 nm, allowing only fluorescence emitted from fluorescein to reach the detector. The photodetector can be a photodiode, photomultiplier tube, avalanche photodiode, or the like.

In an embodiment, spatio-temporal profilometer 200 is connected to flow controller 260 that provides a flow of fluid 219 into fluid channel 218. In an embodiment, flow controller 260 is a syringe pump that delivers volumetric flow from 100 picoliter per minute (pL/min) to 100 microliters/min. In an embodiment, flow controller 260 is a vessel filled with fluid 219 at a fixed height above the outflow of flow controller 260. Gravity or externally applied pressure can control pressure on fluid 219 and provide a flow rate of fluid 219 as a function of fluidic resistance through fluid channel 218. In an embodiment, external pressure is applied to the vessel to provide a greater pressure drop than achieved by gravity. Other flow controllers can be attached to fluid channel 218 and modified with or without feedback based on analysis of product light 205. Exemplary flow controllers 206 include peristaltic pumps, rotary pumps, piston pumps, diaphragm pumps, and the like.

In an embodiment, fluid channel 218 is orthogonal to tapered optical collimator waveguide 221. In some embodiments, fluid channel 218 in whole or in part is oblique to fluid channel 218 as shown in FIG. 12. collimated light 204 can propagate across multiple fluid channel 218 disposed on substrate 210.

Light source 250 can include a light-emitting diode, laser, and the like that produces collimated light 204 at a selected wavelength. The properties of collimated light 204 and type can be selected based on packaging of substrate 210, level of interaction with fluid 219 and microparticle 225, and transmission of product light 205 by forward light detection waveguide 230.

Collimated light 204 can imprint a contrast to fluid 219 or microparticle 225. In an embodiment, microparticle 225 is a caged fluorophore. In an embodiment, microparticle 225 is fluorescein. Collimated light 204 can be selected based on whether collimated light 204 interacts with fluid 219 or microparticle 225. A wavelength of collimated light 204 and diverging light 202 can be from 240 nm to 1000 nm, specifically from 350 nm to 750 nm, and more specifically 375 nm. In an embodiment, the wavelength of collimated light 204, intermediate light 203 diverging light 202 are the same. The intensity of collimated light 204 can be selected based on optical properties for modifying fluid 219 or microparticle 225, the nature of flow of fluid 219, and selected characteristics of product light 205. Intensity of collimated light 204 can be from 1 nW to 200 mW.

Tapered optical collimator waveguide 221 converts diverging light 202 received from light source 250 to collimated light 204 and communicates collimated light 204 to light-fluid interaction volume 201. Filters or bifurcations can be included along the propagation of diverging light 202 or collimated light 204 to reduce the intensity of light or direct part of the light to a light intensity meter. In an embodiment, tapered optical collimator waveguide 221 is filled with optical material that permits total internal refection of light. In an embodiment, the optical material is a photocurable adhesive that has a higher index of refraction than substrate 210. In an embodiment, optical collimator exit wall 208 can have a curved surface or lens to shape collimated light 204 received in light-fluid interaction volume 201. In an embodiment, collimated light 204 has a substantially uniform intensity across light-fluid interaction volume 201. In an embodiment, tapered optical collimator waveguide 221 has a rectilinear cross-section.

Light-fluid interaction volume 201 is a volume in fluid channel 218 where collimated light 204 interacts with fluid 219 and particularly, microparticle 225. In an embodiment, collimated light 204 modifies microparticle 225. A modification of microparticle 225 can include a chemical modification such as uncaging or caging, fluorescence activation, photobleaching, and the like. In an embodiment, microparticle 225 is a fluorophore or a caged-fluorophore such as fluorescein or caged-fluorescein.

Spatio-temporal profilometer 200 can be made in various ways. It should be appreciated that spatio-temporal profilometer 200 includes a number of optical, electrical, or mechanical components, wherein such components can be interconnected and placed in communication (e.g., optical communication, electrical communication, mechanical communication, fluid communication, and the like) by physical, chemical, optical, or free-space interconnects. The components can be disposed on mounts that can be disposed on a bulkhead for alignment or physical compartmentalization. As a result, spatio-temporal profilometer 200 can be disposed in a terrestrial environment or space environment. Elements of spatio-temporal profilometer 200 can be formed from suitable materials. According to an embodiment, the elements of spatio-temporal profilometer 200 are formed using chemical processing, microfabrication, or 3D printing although the elements of spatio-temporal profilometer 200 can be formed using other methods, such as injection molding or machining a stock material such as block of material that is subjected to removal of material such as by cutting, laser oblation, and the like. Accordingly, spatio-temporal profilometer 200 can be made by additive or subtractive manufacturing. The various layers thus formed can be subjected to joining by bonding to form spatio-temporal profilometer 200.

The process for making spatio-temporal profilometer 200 can include defining fluid channel 218 and waveguides. The process for defining the flow channel can involve subtractive manufacturing (e.g. laser ablation, engraving, cutting, etching, etc.) or additive manufacturing (e.g. 3D printing, controlled deposition, templated substrate growth, and the like) or photolithography to define topographic features that will become or will be used to produce constituent elements of the flow meter. In an embodiment, topographic features were produced on silicon wafers using photolithography. A negative photoresist polymer (e.g., SU8) was used as the photosensitive polymer to produce the topographic patterns on a silicon wafer. In an embodiment, the SU8 features were approximately the same height as the optical fiber diameter. The SU8 features are typically treated with a silane to facilitate removal of substrates after casting. Alternative methods to produce topographic features include milling and embossing of metals or plastics and/or etching materials such as glass and silicon.

In an embodiment, features in substrate 210 are produced by casting and curing a liquid material, such as poly(dimethylsiloxane) (PDMS) against the topographic features. Other exemplary casting materials include epoxy, adhesives or curable polymers or melts. Alternative means of fabricating a substrate in the milli or micro or nanoscale size range include 3D printing, cutting, milling, laser writing, and embossing.

In an embodiment, substrate 210 is bonded to another substrate so as to form a bottom of the channel features and to form open-ended microchannels that include the flow member and light paths. In an embodiment, the substrate is bonded to a flat surface of the same material as the cast substrate so that the index of refraction of the material is the same around the exterior of the light guides. In an embodiment, the substrate and bonded layer were PDMS and the bonding was performed by oxygen plasma treatment of both layers prior to placing them together. In an embodiment, the PDMS layers are bonded together using a layer of liquid PDMS and the device bond following heat treatment to cure the liquid PDMS. Other methods to form the enclosed channels include using an adhesive such as epoxies, double-sided tape, or a mechanical force provided by a device such as a clamp or vacuum pump.

In an embodiment, the light paths (e.g., waveguides) are filled with a suitable material such as an optical liquid or adhesive or matching fluid to produce total-internal reflection and carry light along the waveguide. Alternatively, the light paths can be formed by modifying the optical properties of the substrate, e.g. by chemical, thermal, or optical manipulation, such that these regions become capable of confining and transmitting light as a waveguide. As waveguides, the light paths then function to deliver light to and collect light from material in light-fluid interaction volume 201 of fluid channel 218. In an embodiment, the light paths are filled with PDMS that has a higher crosslinker ratio (e.g. 1:5). In an embodiment, the material filling the light paths was a UV curable optical adhesive (e.g., commercially available as Norland Optical Adhesive 88), which has a higher index of refraction compared to PDMS.

In an embodiment, a process for making spatio-temporal profilometer 200 includes incorporating optical fiber 240 to transmit light from sources and detectors to and from spatio-temporal profilometer 200. In an embodiment, the height of waveguides for light paths was set to match the diameter of bare optical fiber, and the width at the entrance of the light path waveguide where the fiber is inserted is a factor (e.g. 3 times) larger than the diameter of the fiber. In an embodiment, the width of the light path channel tapers down to width of the fiber or includes a partial closing of the channel that is narrower than the fiber (e.g. 110 micrometers) to stop the fiber insertion at a certain point. Following insertion of the fibers into the light path, curing was performed for the coupling fluid with ultraviolet light or heat to lock the fibers in place. Alternatively, waveguides can be solid, and light can be launched into the such by gluing fibers to the ends of light paths or focusing light into light paths using optical elements.

In an embodiment, a process for making spatio-temporal profilometer 200 includes casting hollow air-pockets within PDMS substrate 210 located between tapered optical collimator waveguide 221 and fluid channel 218. The curvature of the interfaces between the PDMS and air pockets formed lenses that narrowed and focused light beams into light-sheet beams.

Spatio-temporal profilometer 200 has numerous advantageous and unexpected benefits and uses. In an embodiment, a process for performing time-resolved spatial profilometry with a uniform light profile includes: receiving diverging light 202 by an optical collimator entry wall 209 of a tapered optical collimator waveguide 221 of a spatio-temporal profilometer 200, the spatio-temporal profilometer 200 including: a substrate 210; the tapered optical collimator waveguide 221 disposed on the substrate 210 and including: the optical collimator entry wall 209; collimating sidewalls 207 disposed obliquely to the optical collimator entry wall 209 and comprising a first collimating sidewall 207 and a second collimating sidewall 207 that obliquely opposes the first collimating sidewall 207; and an optical collimator exit wall 208 obliquely disposed to the collimating sidewall 207 and opposing the optical collimator entry wall 209; a fluid channel 218 in optical communication with the tapered optical collimator waveguide 221 and including: a fluid channel entry 214; fluid channel sidewalls 211 in fluid communication with the fluid channel entry 214 and disposed along a length of the fluid channel 218; and a fluid channel exit 216 that communicates the fluid 219 out of the fluid channel 218; and a light-fluid interaction volume 201 disposed in the fluid channel 218 and provided by an overlap within the fluid channel 218 of the collimated light 204 from the tapered optical collimator waveguide 221 and the fluid 219; and a light-fluid interaction volume boundary 206 that bounds the light-fluid interaction volume 201 at a periphery of the collimated light 204 that propagates in the fluid channel 218; communicating the diverging light 202 from the optical collimator entry wall 209, into an interior of the tapered optical collimator waveguide 221; internally reflecting the diverging light 202 between the first collimating sidewall 207 and the second collimating sidewall 207 inside of the tapered optical collimator waveguide 221 and collimating the diverging light 202 in response to the internal reflections on the collimating sidewalls 207; producing intermediate light 203 from the diverging light 202 due to the internal reflections; receiving, by the optical collimator exit wall 208, the intermediate light 203 from the interior of the tapered optical collimator waveguide 221; communicating the intermediate light 203 as collimated light 204 from the optical collimator exit wall 208, such that the collimated light 204 is collimated and has a uniform light profile; receiving, by the fluid channel entry 214 of the fluid channel 218, a fluid 219 comprising microparticles 225 and communicating the microparticles 225 into an interior of the fluid channel 218; receiving, by the fluid channel entry 214, the collimated light 204 from the tapered optical collimator waveguide 221; subjecting the microparticles 225 to the collimated light 204 in the light-fluid interaction volume 201; producing product light 205 from the collimated light 204 in response to the microparticles 225 interacting with the collimated light 204 in the light-fluid interaction volume 201; communicating the product light 205 out of the fluid channel 218; detecting the product light 205 from the fluid channel 218; and determining a spatial profile and a temporal profile of the microparticles 225 flowing in the light-fluid interaction volume 201 from the product light 205.

In an embodiment, performing time-resolved spatial profilometry includes receiving diverging light 202 by the optical collimator entry wall 209 of a tapered optical collimator waveguide 221; constraining, by the fluid channel sidewalls 211, flow of the fluid 219 to the interior of the fluid channel 218; and communicating, by the fluid channel exit 216, the fluid 219 out of the fluid channel 218.

Accordingly, spatio-temporal profilometer 200 converts diverging light into a uniform or patterned intensity and collimated beam projected within a roughly rectangular cross section of fluid channel 218 and has the unexpected advantage of making measurements of light-matter interactions independent of their position within the flow channel, which permits calculation of optical properties of the fluid, such as photobleaching, absorbance, fluorescence efficiency, optical scatter, size, shape, and refractive index. collimated light 204 From tapered optical collimator waveguide 221 can be used to determine the concentration, position, or abundance of microparticle 225 or flow profile of fluid 219 in fluid channel 218. Beneficially, spatio-temporal profilometer 200 can be used in flow meters, microfluidic spectrometers, cytometers, fluorimeters and the like. Spatio-temporal profilometer 200 can include optical elements such as lenses, reflectors, and filters.

Figure 13:
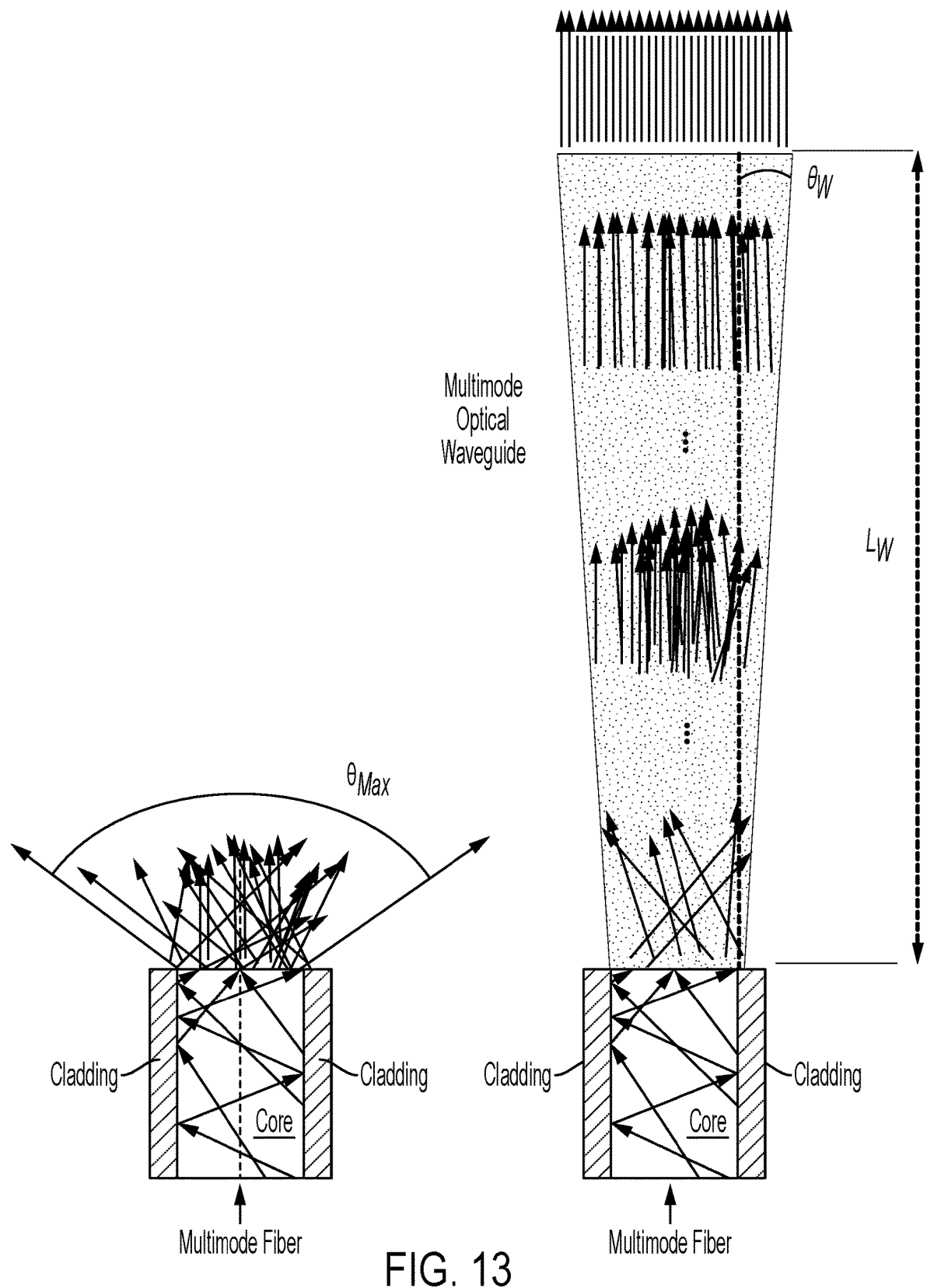
FIG. 13 shows, according to some embodiments, ray tracings of light exiting an optical fiber in free space (top panel) or into a diverging optical waveguide (bottom panel) that both collimates and uniformly distributes light rays exiting the fiber.

In making collimated light 204 with a uniform illumination profile by tapered optical collimator waveguide 221, diverging light 202 can be provided by another waveguide (e.g., an optical fiber) or free-space light source. The input light source does not need to be coherent or collimated, and collimated light 204 is collimated and of uniform intensity in a desired area or volume neglecting absorption. Collimation and uniformity of collimated light 204 is produced by interaction of diverging light 202 into intermediate light 203 as it propagates in tapered optical collimator waveguide 221 and internally reflects from collimating sidewalls 207 of tapered optical collimator waveguide 221 as shown in FIG. 13, wherein a flat-top rectangular light profile for collimated light 204 is made by tapered optical collimator waveguide 221 having collimating sidewalls 207 that diverge at a specific angle. Other geometries and configurations can be used, including have sidewalls 207 that diverge in a parabolic profile or by inducing gradients in refractive index at the edges of waveguide 221.

Optical rays contained in a multimode optical waveguide (MMOW) with a certain numerical aperture (NA) leave the waveguide within the range of angles determined by the differences in refractive indices between the core of the waveguide and the medium into which the light is propagating ($\theta_{Max}$ in FIG. 13). Inserting a selectively designed MMOW into a device propagates and shapes light from an optical fiber to project into fluid channel 218.

Figure 14:
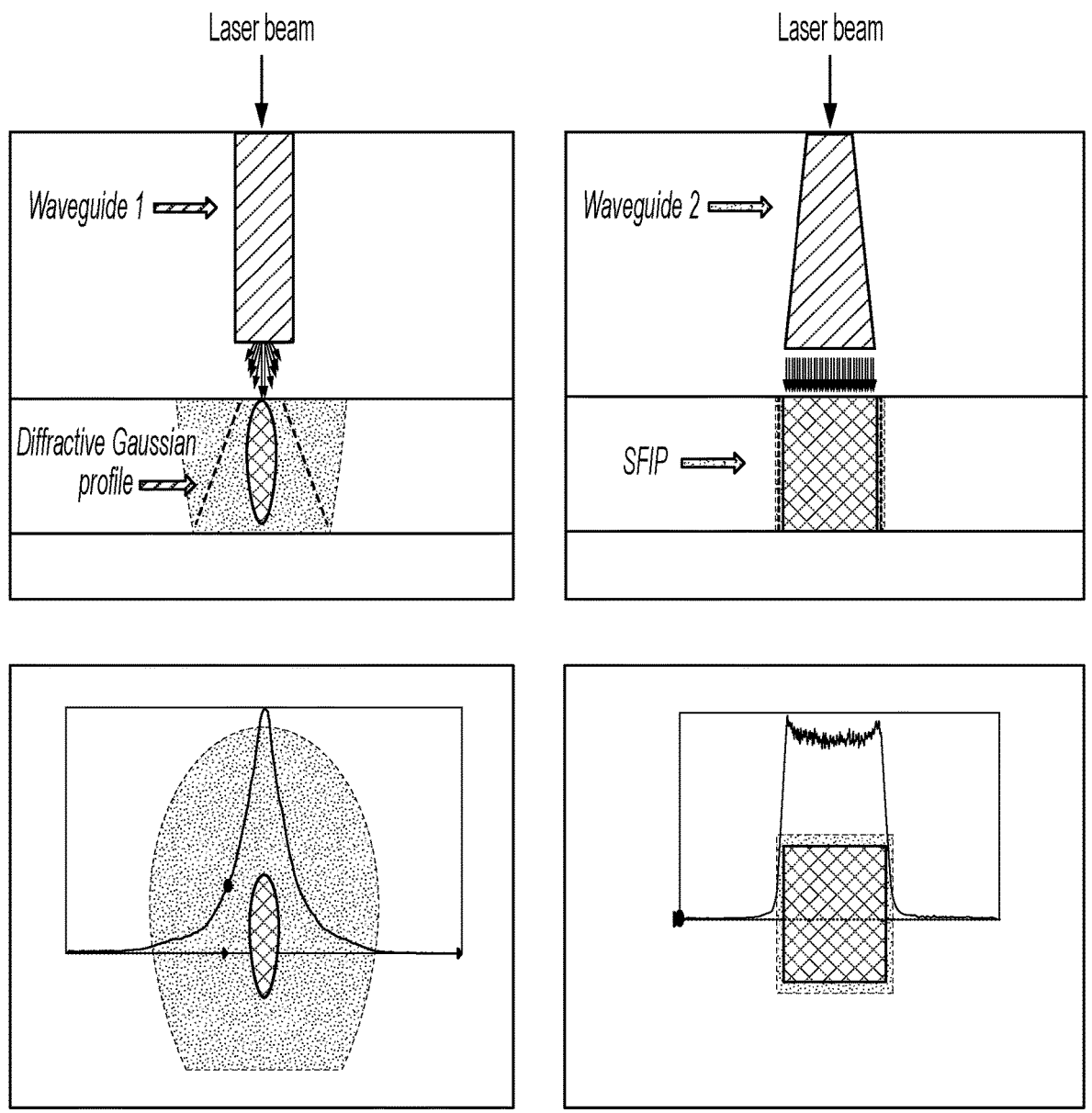
FIG. 14 shows, according to some embodiments, fluorescent images of light exiting waveguides and exciting fluorescent molecules in a flow of fluid through a microfluidic channel having edges indicated with horizontal lines. A location of waveguide structure is also indicated. (Left panel) Straight-walled waveguide showing diverging Gaussian intensity profile. (Right panel) Diverging waveguide showing collimated uniform (flat-top) intensity profile. Bottom traces are an intensity profile horizontally through the center of each beam.
Figure 15:
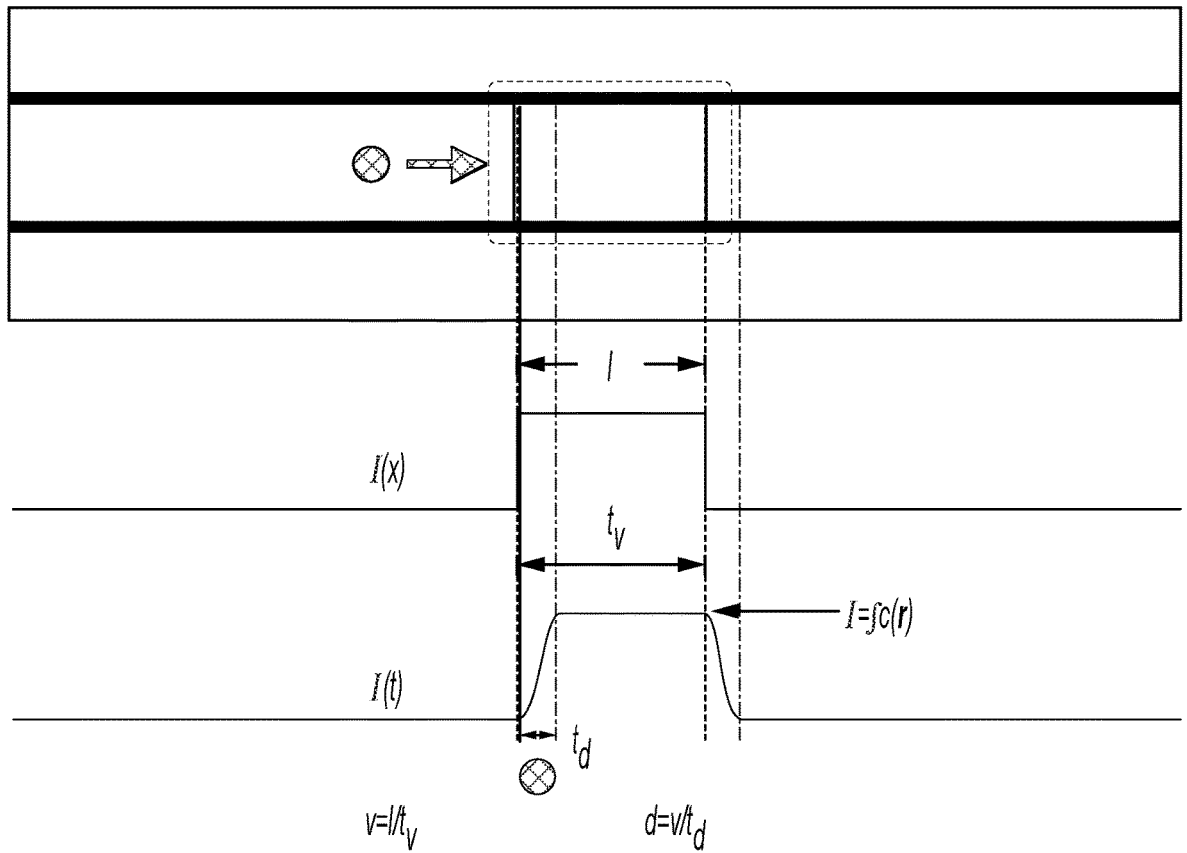
FIG. 15 shows, according to some embodiments, an Image of a flat-top laser profile and how a flat-top laser profile is used simultaneously to determine the velocity (v) and diameter (d) of particles moving through the laser of length (l). I(x) indicates the laser profile (along a horizontal line) when the channel is filled with a fluorescent material. 1(t) is measured fluorescence intensity in time as a fluorescent particle moves through the laser profile. Uniformity of the laser profile in the x-dimension permits continuous determination of the integrated intensity of the whole particle over the width of the laser profile, which greatly enhances the signal-to-noise ratio of the intensity measurement over noise in I(t).
Figure 16:
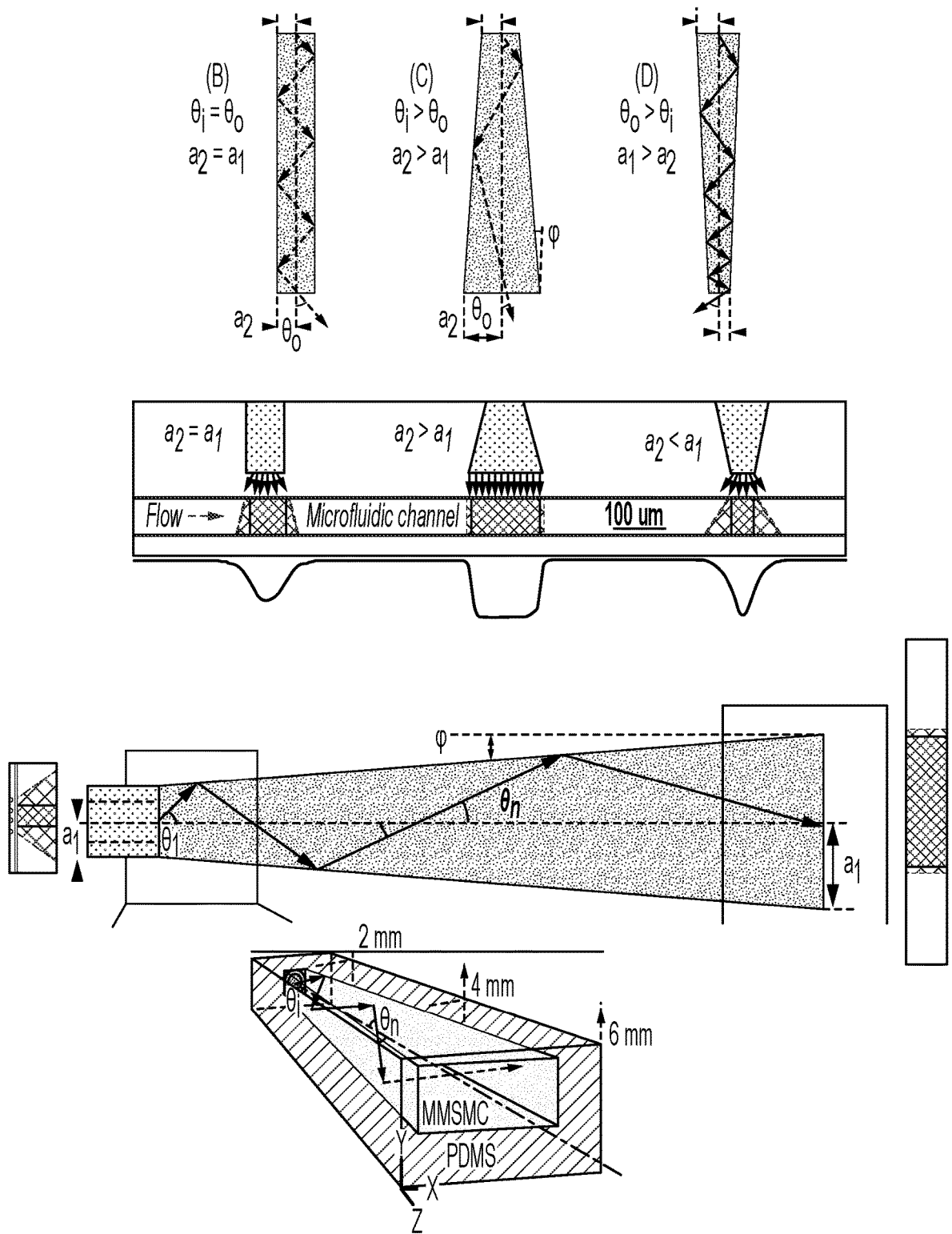
FIG. 16 shows, according to some embodiments, ray manipulation by a tapered waveguide (left). Modifications to projected beam profiles occur by changing the waveguide wall taper angle, wherein three microscope images of different light beams 271 are made by a waveguide channel with no taper (left), a taper linearly diverging towards the fluid channel (middle), and a taper linearly converging towards a fluid channel (right).

With reference to FIG. 14, a straight-walled waveguide propagates light via diffractive Gaussian profile (left panel A). When diverging light 202 is focused into a MMOW with selected properties of various parameters (sidewall shape, refractive index, and length), a well-defined size and shape with uniform intensity of collimated light 204 is made from diverging light 202 as shown in the right panel of FIG. 14.

Figure 17:
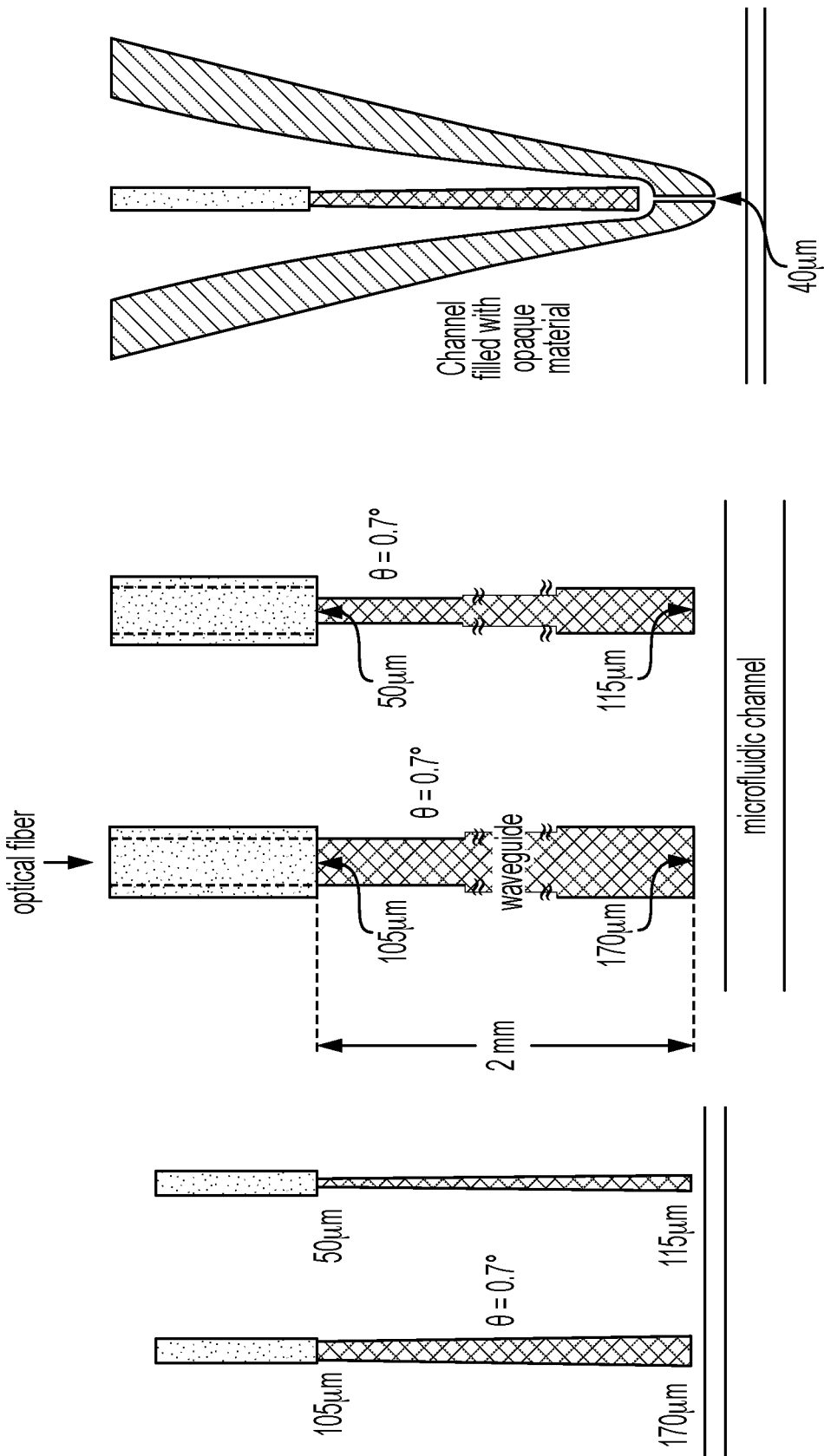
FIG. 17 shows, according to some embodiments, geometric factors for modifying projected beam profiles
Figure 18:
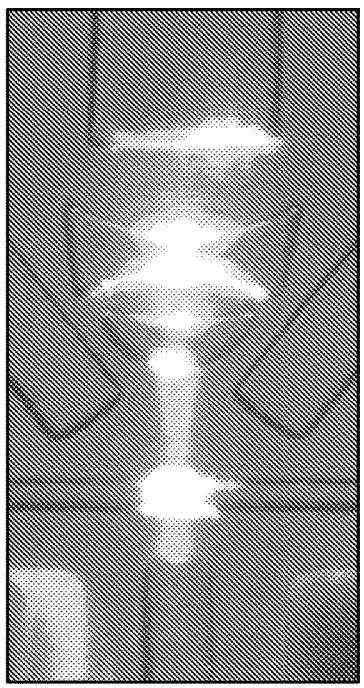
FIG. 18 shows, according to some embodiments, a spatio-temporal profilometer with lens elements that narrow and focus uniform beams into light-sheets with high ray density.
Figure 18:
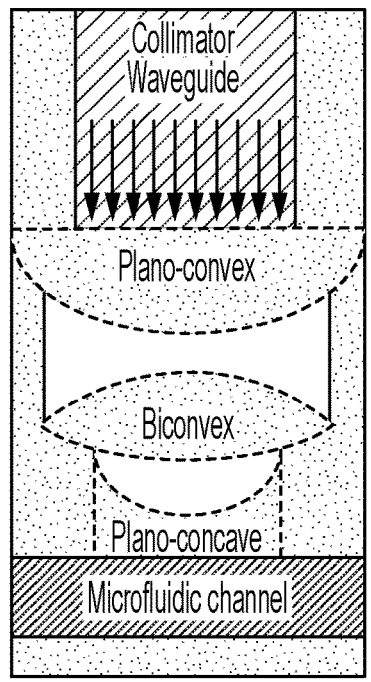
Figure 18:
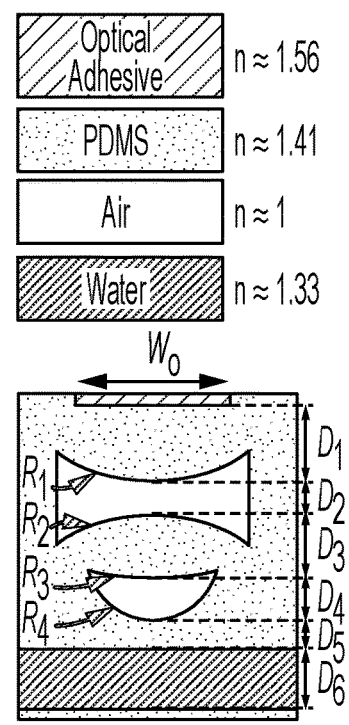
Figure 18:
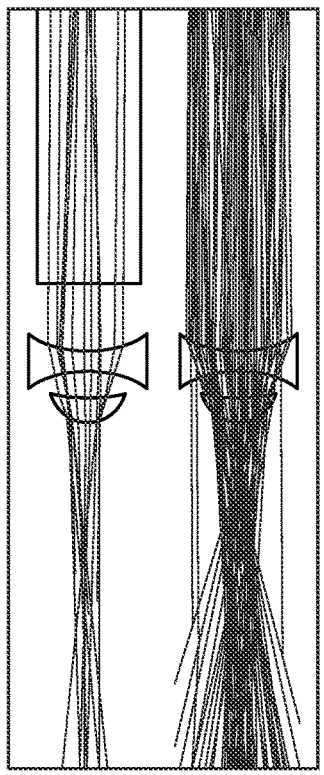
Figure 18:
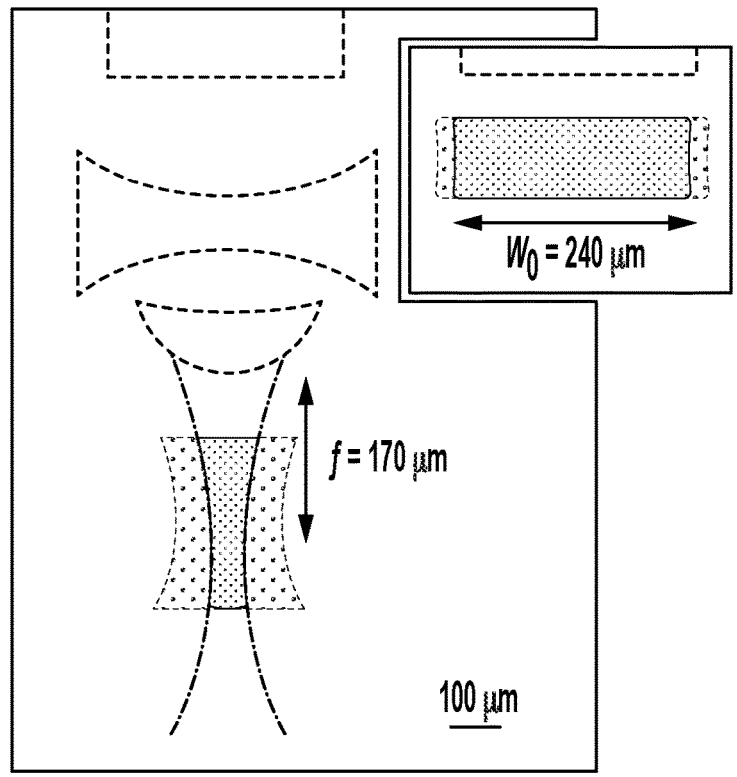
Figure 19:
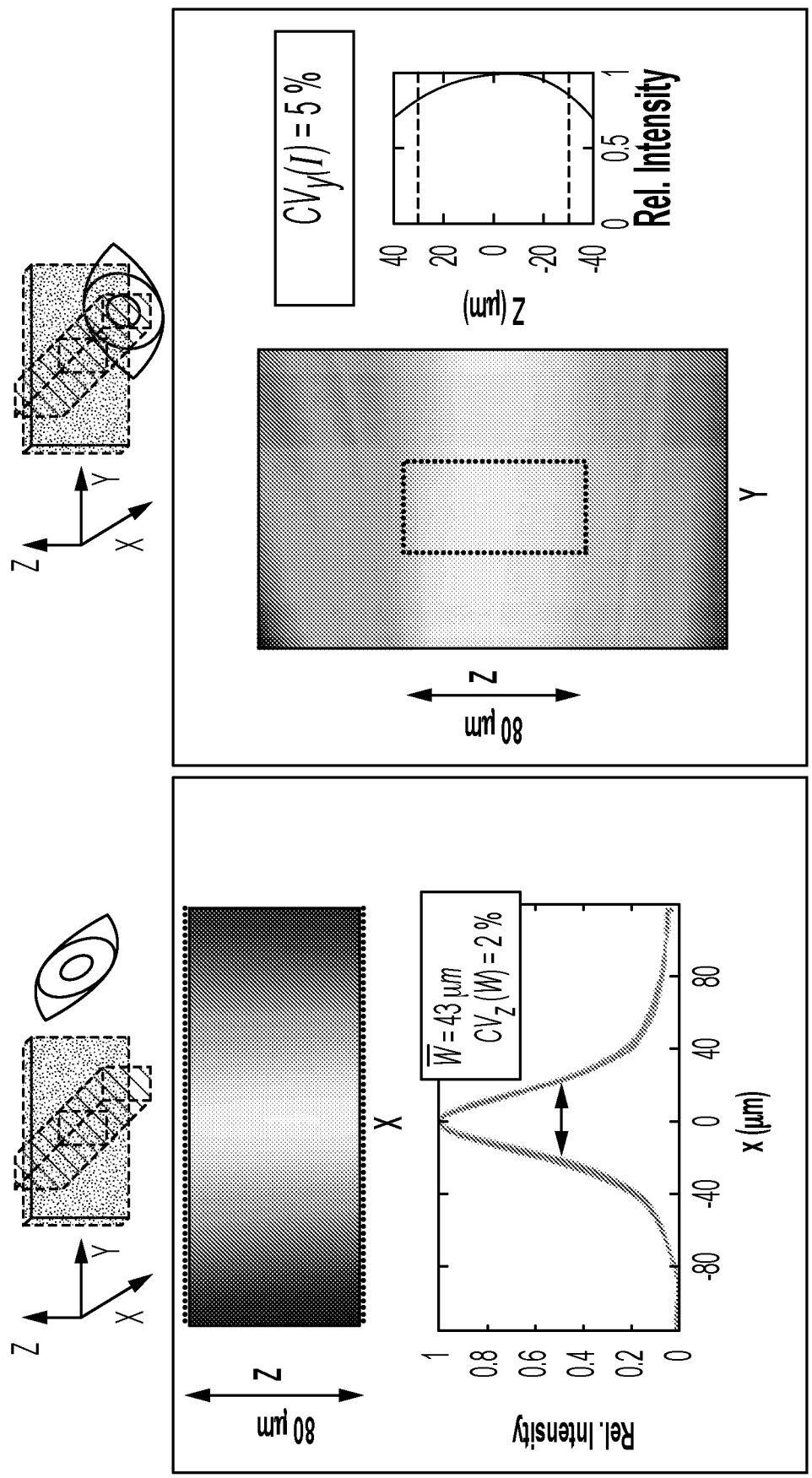
FIG. 19 shows, according to some embodiments, light sheet beam uniformity, particle fluorimetry, uncertainty quantification, and sizing enabled by light-sheet-modified tapered waveguide to a serial cytometer.
Figure 20:
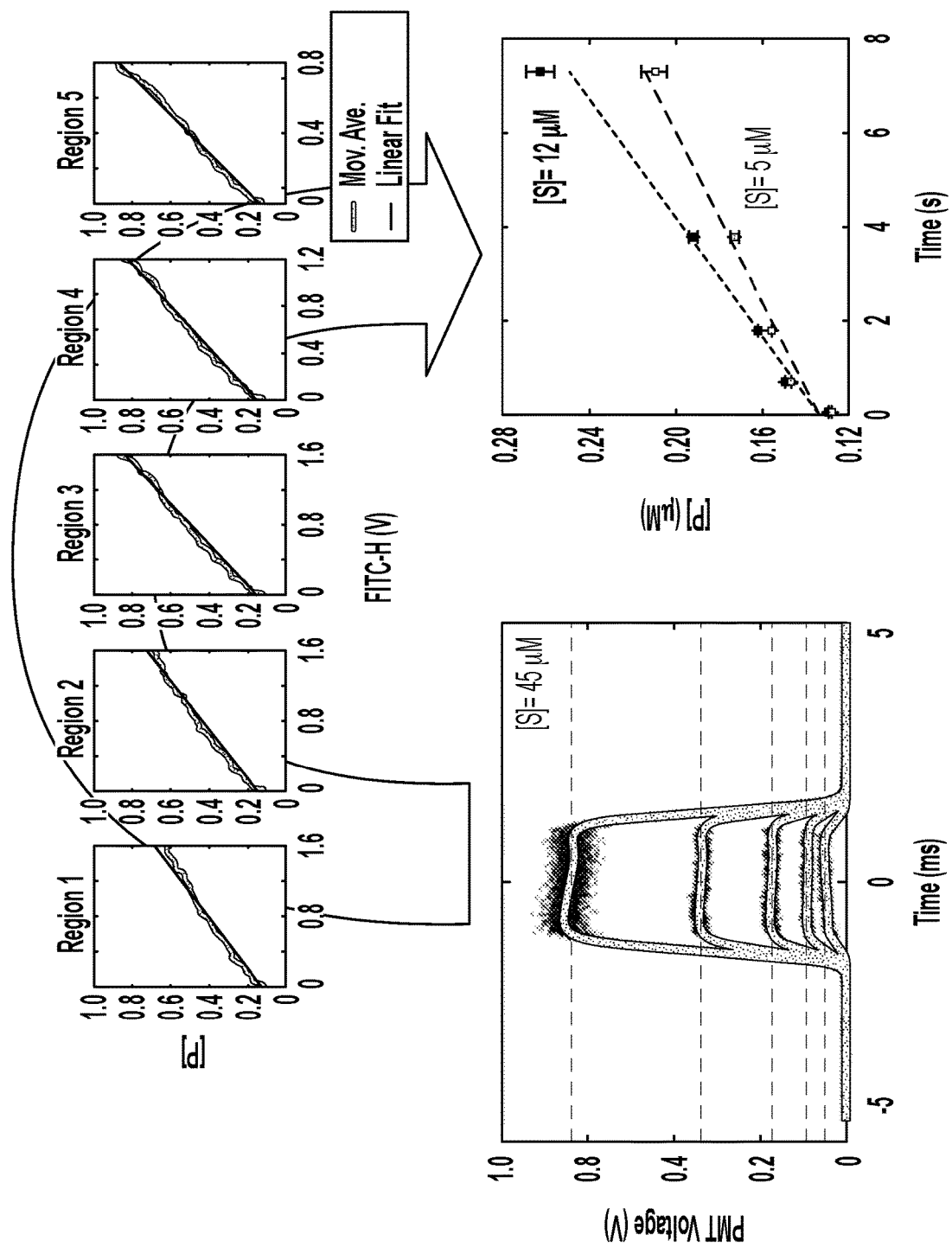
FIG. 20 shows, according to some embodiments, fluorescence calibration for measurement of concentration.
Figure 21:
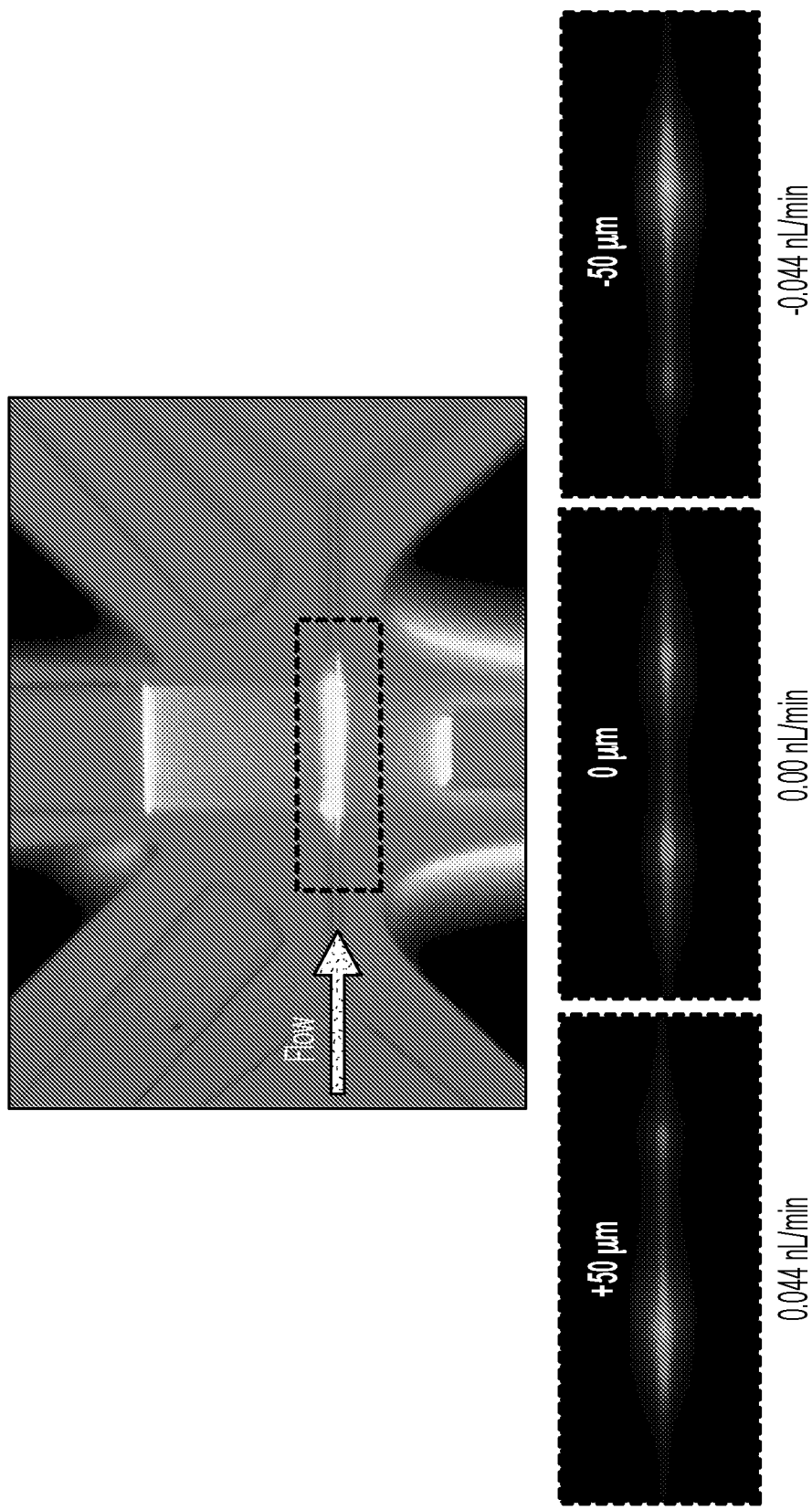
FIG. 21 shows, according to some embodiments, a tapered waveguide that projects a uniform, collimated, wide beam of light to a flow channel, wherein spatial resolution sensitivity to flow in the device was ~50 μL min$^{-1}$.

Diverging light 202 entering tapered optical collimator waveguide 221 cab have orientation in any direction. The rectangular cross-section of tapered optical collimator waveguide 221 determines two orthogonal planes that are collimated and homogenized. Because of the random orientation of diverging light 202 in in tapered optical collimator waveguide 221, having structure (e.g. divergent) sidewalls 207 in one plane can collimate and uniformly distribute collimated light 204 in both planes of tapered optical collimator waveguide 221. It should be appreciated that a pair (e.g., top and bottom) walls of the waveguide can be parallel instead of diverging, while the other pair of walls diverge. Additional features of tapered optical collimator waveguide 221 can be included to effect the intensity profile of collimated light 204. The width of the flat-top rectangular profile can be controlled by changing optical collimator exit wall 208 (e.g., fiber core diameter), by varying the length of tapered optical collimator waveguide 221, or by including light blocking structures, as shown in FIG. 17.

In an embodiment, performing time-resolved spatial profilometry can include: flowing fluid 219 including microparticle 225 through fluid channel 218; communicating fluid 219 with microparticle 225 to light-fluid interaction volume 201; providing light from light source 250; communicating diverging light 202 from light source 250; optionally communicating diverging light 202 in optical fiber 240 to tapered optical collimator waveguide 221; making collimated light 204 from diverging light 202 in tapered optical collimator waveguide 221; communicating collimated light 204 through optical collimator exit wall 208; and communicating collimated light 204 through substrate 210 to light-fluid interaction volume 201 in fluid channel 218; subjecting microparticle 225 to collimated light 204; producing pulses of product light 205 that including light transmission, scattering, absorbance, or fluorescence interactions; communicating product light 205 from light-fluid interaction volume 201 to optical detector 251 via forward light detection waveguide 230 or back light detection waveguide 234; recording signal pulses from product light 205 sensed by optical detector 251; and computing properties of microparticle 225 that include fluorescence intensity, size, or velocity from magnitudes or shapes of signal pulses.

In an embodiment, operating spatio-temporal profilometer 200 for serial optical interrogation of microparticles 225 includes providing spatio-temporal profilometer 200 with a plurality of light-fluid interaction volumes 201 arranged along a length of fluid channel 218 with each light-fluid interaction volume 201 having an input light path, fluorescence/scatter light path, and transmission light path for detection of light; acquiring multiple measurements of microparticles 225 for measurement replication; acquiring multiple measurements for velocimetry determination via a time-of-flight microparticles 225 in a selected light-fluid interaction volume 201; acquiring multiple measurements for detection and separation of microparticles 225 that enter a selected light-fluid interaction volume 201 simultaneously or are aggregated.

In an embodiment, operating spatio-temporal profilometer 200 for projecting collimated light 204 with modified ray density patterns includes subjecting different beams of diverging light 202 to different tapered optical collimator waveguide 221 having different taper angles and lengths, and optical fiber stops; modulating the profiles of collimated light 204 in light-fluid interaction volumes 201; and optionally designing the angles, lengths, and tapers by empirical studies or by computational ray tracing models.

In an embodiment, spatio-temporal profilometer 200 takes light from a source such as a multimode waveguide (MMW) and creates a rectangular light profile across a micron-to-millimeter sized microchannels based on total internal reflection (TIR) of light into a microfluidic waveguide.

Waveguides and microchannels can be made from photolithography to define photoresist structures that are formed in a polymer (silicone poly(dimethylsiloxane) or PDMS) to create microchannels. Such can include a 125 µm diameter MMW with a 105 µm core diameter such that the waveguide is filled with an optical adhesive with refractive index of about 1.56.

FIG. 15 to FIG. 21 show various properties of spatio-temporal profilometer 200.

Figure 22:
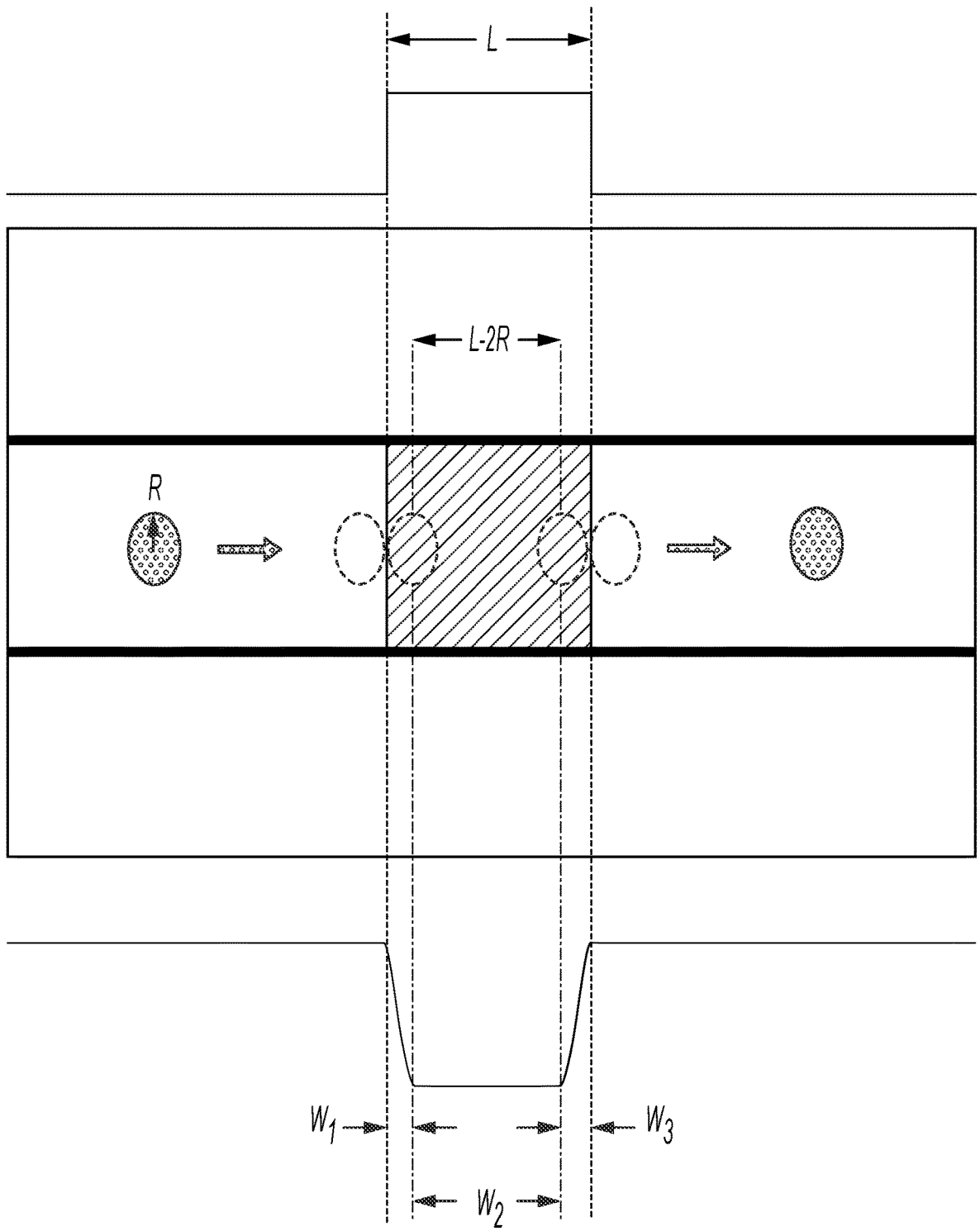
FIG. 22 shows, according to some embodiments, analysis of particles interrogated by a uniform light beam within a microfluidic channel, including interrogating light intensity profile and a resultant pulse signal produced by obscuration of the light beam during the passage of one microsphere.

In an embodiment, a process for measuring the properties of microparticle 225 in spatio-temporal profilometer 200 includes the following. For a step-function patterned or collimated light, absorbance versus time signal has three regions that can include: a monotone decreasing region; a constant region; and a monotone increasing region (FIG. 22). Boundaries between these regions can be found, e.g., by piecewise polynomial regression, constrained optimization, and the like. The radius R and velocity v of microparticle 225 can be determined in relation to the widths $w_1$, $w_2$, and $w_3$ of (temporal) regions (1), (2), and (3) according to the formulas, for example:

$$2R = vw_1$$

$$2R = vw_3$$

$$L - 2R = vw_2$$

$$L = v(w_1 + w_2)$$

$$L = v(w_2 + w_3),$$

wherein L is the length in the flow direction of the collimated step-function light. These equations are solved to find v and R.

Figure 23A:
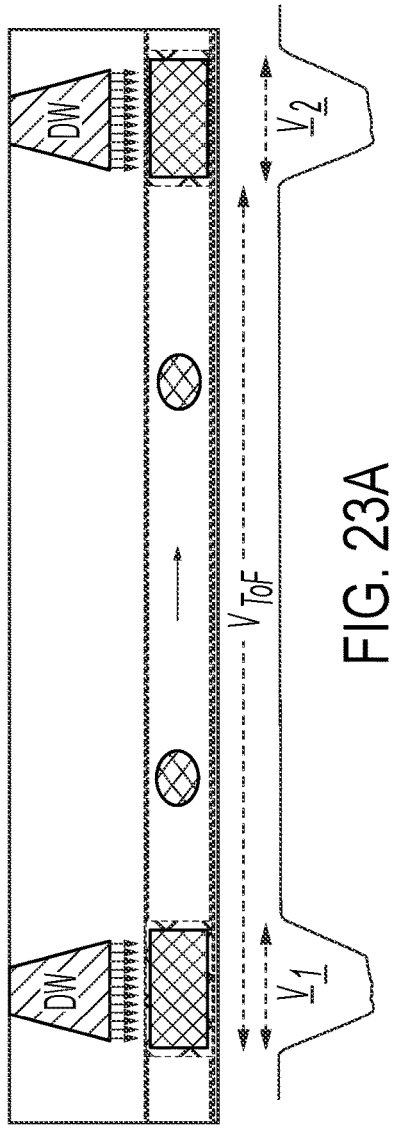
FIG. 23 shows, according to some embodiments, (A) two filtered trapezoidal signals as a microparticle bead travels through two measurement regions excited by collimated, uniform light beams produced by diverging waveguides (DWs). (B) Recorded beads at a region and each bead's measured size and velocity. For comparison, the velocity as determined by region-to-region time-of-flight is indicated.
Figure 23B:
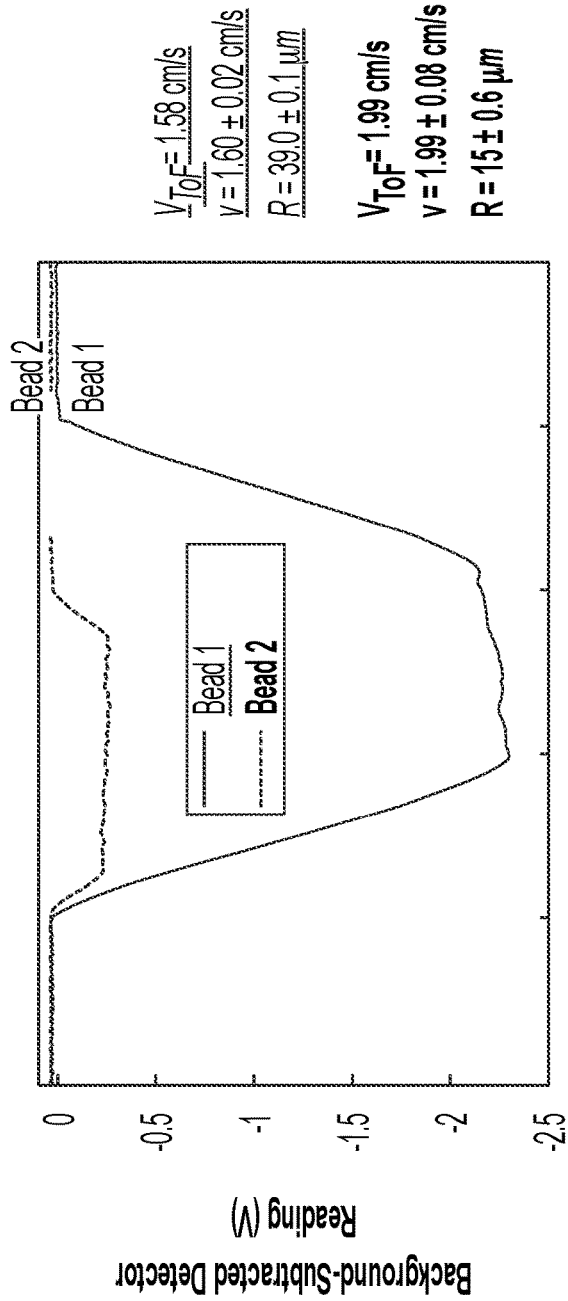

In an embodiment, digital signals processing was used to annotate signal pulses with approximate signal boundaries, background level, integrated area, height, and width. Several approaches were used to estimate the change points $K_1$, $K_2$, $K_3$, and $K_4$ marking, respectively, the signal onset, plateau initiation, end of plateau, and disappearance of signal. For all methods, initial guesses for $K_1$ and $K_4$ were provided by the annotated integration bounds; guesses for $K_2$ and $K_3$ were $$\kappa_2^{guess} = \kappa_1^{guess} + \frac{(\kappa_4^{guess} - \kappa_1^{guess}) - FWHM}{2},$$

$$\kappa_3^{guess} = \kappa_4^{guess} - \frac{(\kappa_4^{guess} - \kappa_1^{guess}) - FWHM}{2},$$

wherein FWHM (full width half max) is the width annotation. The constrained minimization $$\min_{x_1, x_2, x_3, x_4} \sqrt{(y_{fit} - y)^2}, \begin{cases} x_1 < x_2 < x_3 < x_4 \\ x_2 - x_2 = x_4 < x_3 \end{cases}$$

was performed where y is the original data and $y_{fit}$ is the data fitted by a piecewise discontinuous linear fit with segment boundaries at x1, x2, x3, and x4 estimating $K_1$, $K_2$, $K_3$, and $K_4$, respectively. The intersections between the linear fit lines were chosen as $K_1$, $K_2$, $K_3$, and $K_4$. FIG. 23 shows some results.

Spatio-temporal profilometer 200 and processes disclosed herein have numerous beneficial and fills a need for many aspects of optics and photonics applications. For example, beam shaping and collimating a diffractive Gaussian beam into a flat-top profile provides an increase in laser pulse energy without increasing the processed spot area or line width. Such modifications permit dosage delivery of light into, an optofluidic flow measurement system or cytometer. Such provides calculation or compensation of measurements dependent on aggregate signal integration from the laser spot. In addition, making a well-defined and uniform laser profile with a well-defined border between illuminated and non-illuminated zones provides advantages for cytometry that include measurement of the size and velocity of objects in flow, wherein, with reference to FIG. 15, velocity is determined deduced as time between entrance to decay of signal and width being the time from entrance to peak of signal.

The articles and processes herein are illustrated further by the following Example, which is non-limiting.

EXAMPLE

Uniform beam shaping using all-polymer integrated waveguides for optofluidic particle analyzers Optical measurements are widely useful for analyzing microparticles such as cells, microplastics, mineral aerosols in clinical, environmental, and geological fields. Optofluidic instruments, such as flow cytometers, velocimeters, or fluid spectrometers, comprise a major category of optical devices that rely on shining beams of light to sense and/or effect particles within fluids. For maximum performance, the microfluidics at the heart of such instruments require carefully designed beam interfaces to precisely transmit light to and from analysis regions. However, precise micro control of beam shape and uniformity is a technical challenge and practical options available for instruments are limited. Despite advances in advanced micro-optics, traditional, bulky, and alignment-prone lenses are still common choices for beam shaping. Furthermore, interfaces to microfluidics lack versatility for beam shaping, with a majority using single-mode fiber optics that impose a Gaussian-shaped profile to transmitted beams. Limitations in crafting appropriate sensing interfaces can be a reason that microfluidic chips have not achieved parity with electronic chips in terms of ubiquity or commercial success, despite the large promise of MEMs devices.

A highly desirable—but challenging to realize—beam shape for optofluidics particle analyzers is a uniform rectangular prism, or "cube of light" (CoL). Optically, an idealized CoL can be described as a collimated light field with 1) rectangular boundaries, 2) excellent uniformity in all dimensions, and 3) low dispersion side lobes. CoLs promise high coupling efficiency with optofluidics, since the rectilinear shape of a CoL matches the rectilinear shape of many microfluidic channels. The uniformity and collimation of a CoL would simplify measurements by eliminating angular and spatial factors from measurements of particles passing the beam. CoL could provide tight spatial control over measurements because their low dispersion allows the formation of a sharp boundary between the illuminated and non-illuminated region of microfluidics.

Several approaches exist that make real-world approximations for CoLs, but substantial tradeoffs exist between beam uniformity, geometry, and ease of coupling to microfluidics. In the near-field, multimode optical waveguides (MMOWs) with low numerical aperture can appear as a quasi-flat-top spot, but this mode quickly dissipates away from the fiber, making it impractical for uniform excitation of a broad region of interest in a microfluidic channel. Recent work has enabled shaping outputs of MMOWs in the far-field, but relies on complex, adaptive shaping of the input field wavefront using spatial light modulators or binary optical elements. These involve many prisms and lens elements, which cannot fit on-chip, and can introduce speckle patterns that substantially reduce the beam uniformity, sharpness, and rectangularity. Chip-scale beam shaping using transformation optics with solid dielectric materials or liquid waveguides is a promising new research area. However, work remains to be done to fully resolve issues such as instability in the cross-section profile of the beam. Previously, we demonstrated an alignment-free method to interface fiber optics with planar waveguides for facile coupling to microfluidic flowmeters and flow cytometers. This method used micromolding to create 3D waveguides, which marked a substantial simplification over past methods requiring multiple lithography, oxidation, and chemical or plasma etching steps. However, these waveguides produced either dispersed beam profiles or pseudo-Gaussian profiles with low transmission efficiency. Overall, new strategies are needed to create chip-scale, uniform CoLs using integrated optics.

We overcame complex beam shaping processes by designing a delivery waveguide that produces a desirable rectangular beam profile without lenses. A novel single-layer, planar waveguide with 2D-taper-based geometry is proposed for efficiently collimating spatially uniform beams originating from fiber optics. Using analytical models, numerical simulation, and experimental testing, waveguide geometries for facile, chip-scale microfluidic integration are characterized. Lastly, the diverging waveguide was integrated into a microfluidic device to create a microparticle analysis instrument. The rectangular light profile enabled automated digital processing of the instrument's optical signals and a new metrology technique is demonstrated for measuring absolute size and velocity of microparticles.

Design Approach

Figure 24A:
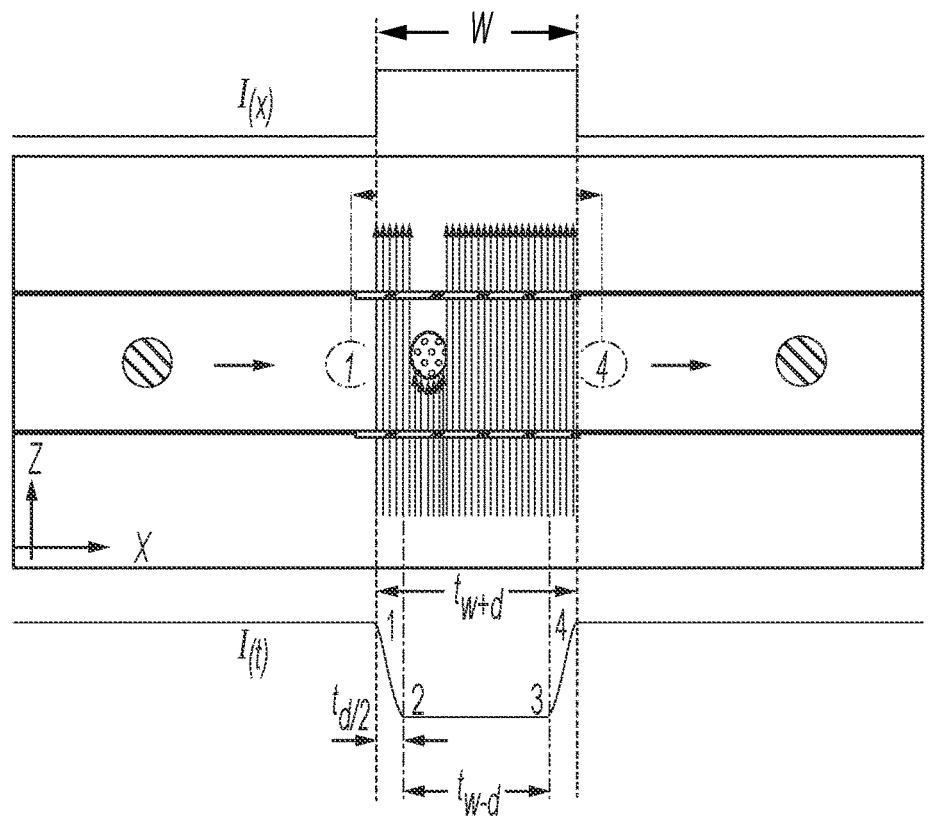
FIG. 24 shows, according to some embodiments, uniform collimated beams for microparticle analysis in optofluidics: (A) 3D/2D for particle sizing and velocimetry with an idealized cube of light(CoL) excitation beam. (B) A micromolded diverging waveguide for CoL beamshaping.
Figure 24B:
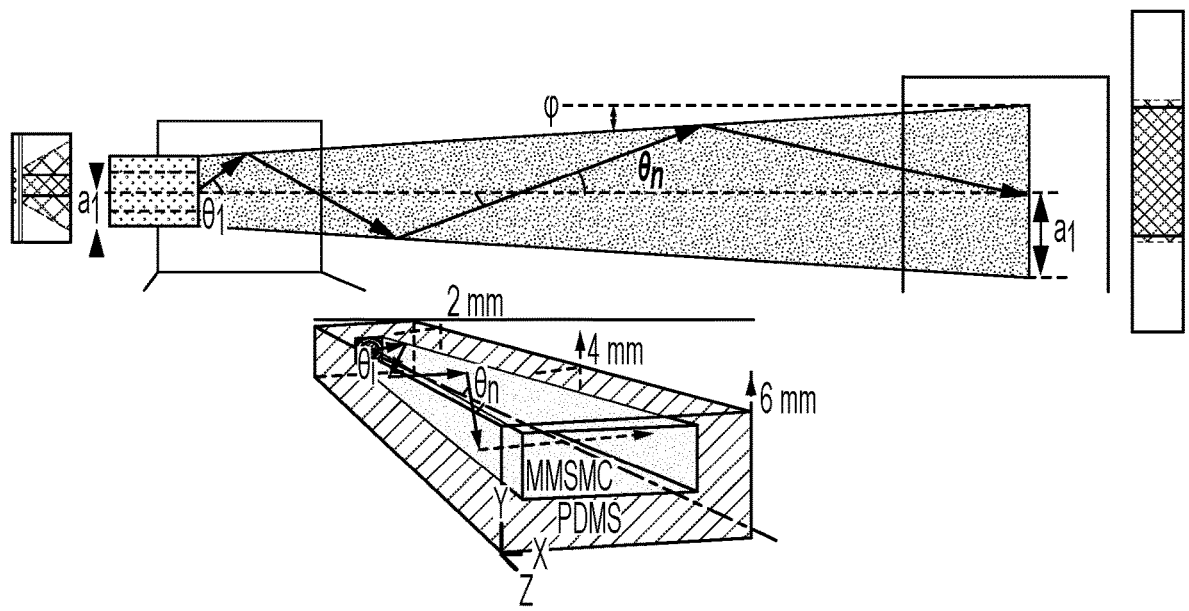

The optical interrogation of particles in flow analyzers is an inherently complex measurement system involving the interplay of fluidic, optical, and kinematic phenomena. Yet, we identified an idealized light obscuration scenario (FIG. 24A) that offers a straightforward mechanism for measuring particle size and velocity. A sphere passing perpendicularly to a perfectly collimated, uniform, and sharp-edged beam would obscure the light with a distinct "pulse-shaped" temporal profile. The duration of the pulse plateau relates to the particle velocity; the rise and fall time of the pulse relates to the particle diameter. Real-world fiber optics for light delivery, however, are unideal for this purpose because they disperse rays and output non-uniform (i.e., Gaussian) beam profiles. Here, a tapered waveguide redirects rays emanating from multimode fiber optics. It may be possible to use a tapered waveguide as a microscale approximation of a traditional parabolic mirror and project collimated beams from a disperse light source (FIG. 24B).

Theoretical Principles of Collimation by a Diverging Waveguide

From the ray optics point of view, a planar guided ray exiting a fiber optic will propagate through a butt-coupled straight-walled waveguide through total internal reflection with a constant reflection angle. In contrast, rays propagated in waveguides constructed with angled sidewalls undergo variable reflection angles. Given a diverging waveguide geometry ($a_1 < a_2$, where $a_1$ and $a_2$ are the widths of the waveguide entrance and exit apertures, respectively), guided rays proceed down the waveguide with ever-decreasing reflection angles (FIG. 24B). The successive reflections in a diverging waveguide cause the ray's propagation angle to progressively align with the axis of the waveguide. The propagation angle $\theta_m$ of rays prior to the $m^{th}$ successive internal reflection, can be modeled (see Supplemental for derivation) as $$\theta_m = \theta_1 - 2(m-1)\varphi \qquad (1)$$

$$m_{coll} = \begin{cases} \left\lfloor \frac{1}{2}(|\theta_1/\varphi + 1|) \right\rfloor, & |\theta_1| \geq \varphi \\ 0, & |\theta_1| < \varphi \end{cases} \qquad (2)$$

defining $\theta_1$ as the initial positive angle of the ray, $\varphi$ as the sidewall angle of a waveguide of length L, and $m_{coll}$ is the maximum possible number of reflections the ray can undergo before becoming effectively collimated. This model assumes that the waveguide walls are perfectly smooth and that incoming rays were angled below the critical angle of the waveguide. The scenario of waveguides with a converging taper, that is, $a_2 < a_1$, was not considered since it would act to increase the ray angles, which would be detrimental in applications requiring collimated light.

According to equation (1), the rate of change of ray angle $\theta$ proceeds at a constant velocity $-2\varphi$ rad per reflection. Intuitively, as reflecting rays lose inclination angle, more travel distance is needed to reach subsequent reflections. The behavior of inter-reflection distances $L_m$ can be modeled by the recursive equation $$L_m = a_1 \left( \frac{\tan\theta_m + \tan\varphi \tan\theta_m \sum_{j=1}^{m-1} \frac{L_j}{a_1}}{\tan\theta_m - \tan\varphi} \right) \left( \frac{1}{\tan\theta_m} + \frac{1}{\tan(\theta_{m+1})} \right). \qquad (3)$$

Equation (3) describes the span of the $m^{th}$ reflection of a ray for the specific scenario where the ray initially enters the waveguide positioned at its centerline and with a positive angle of inclination. When ray angles approach the sidewall angle, they cannot reflect again within the waveguide and become effectively collimated. This asymptotic phenomenon is reproduced in the model, since mathematically the limit of $L_m$ approaches infinity as $\theta_m$ approaches cp. Complete model equations and derivations that consider arbitrary ray entrance angles and entrance positions are presented in the Supplemental.

Figure 31:
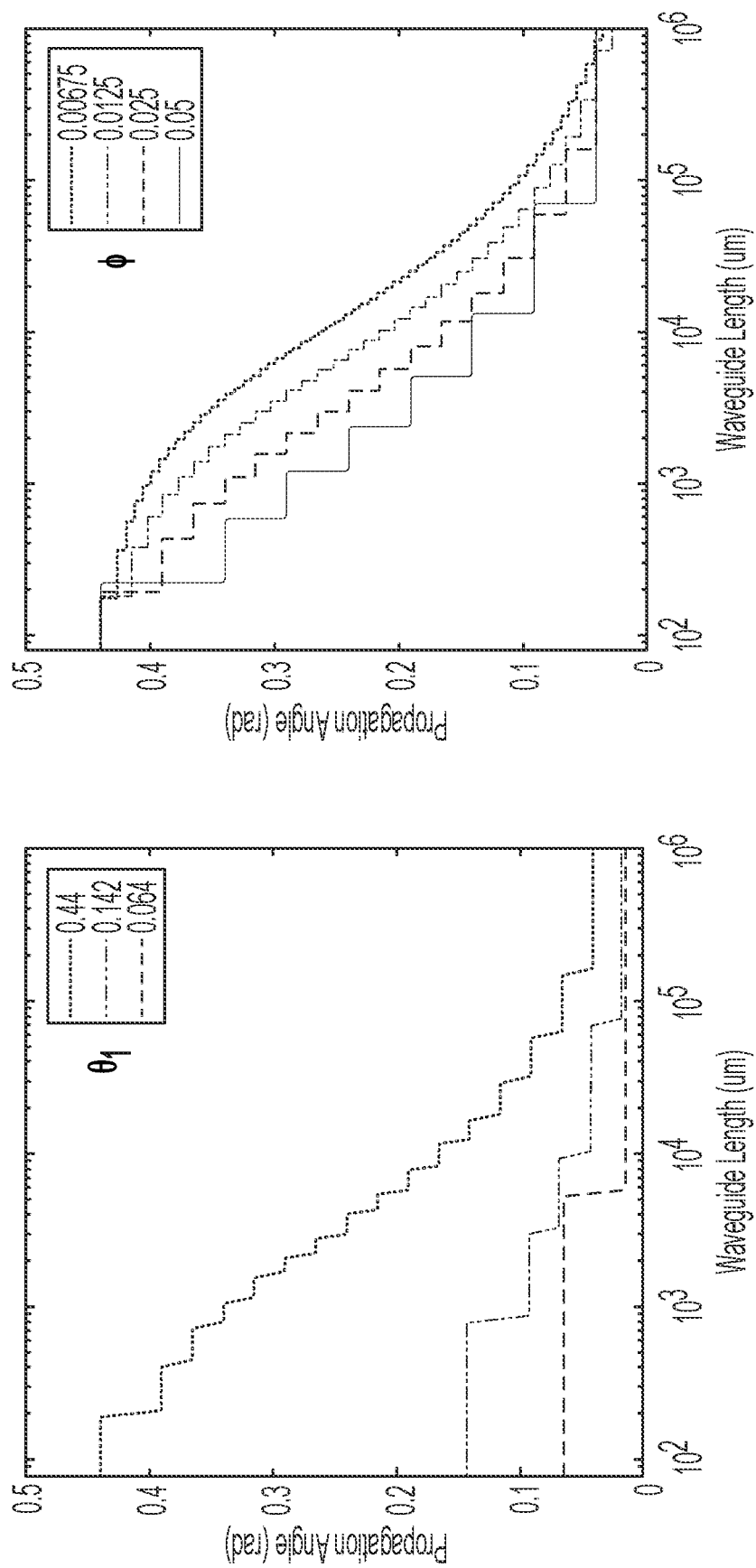
FIG. 31 shows, according to some embodiments, single-ray simulation results with plots of the relationship between propagation angle, waveguide length, entrance angle, and taper angle.

An initial observation from equation (3) is that, due to diminishing returns, complete collimation of a single ray can require meter-long distances (FIG. 31). Yet, substantial reductions in ray angle can be seen over only millimeters of slightly tapered waveguides. For example, rays entering a slightly diverging (25 mrad) waveguide at typical critical angles (440 mrad) would reflect 8 times and exit the waveguide at 215 mrad, approximately half their initial angle. Steeper incoming rays received the most reflective corrections, and steeper waveguide tapers were more effective at collimating over shorter distances. The results on single rays were a preliminary validation of the 2D model.

Uniform Beam Shaping: Simulation & Validation

Figure 25A:
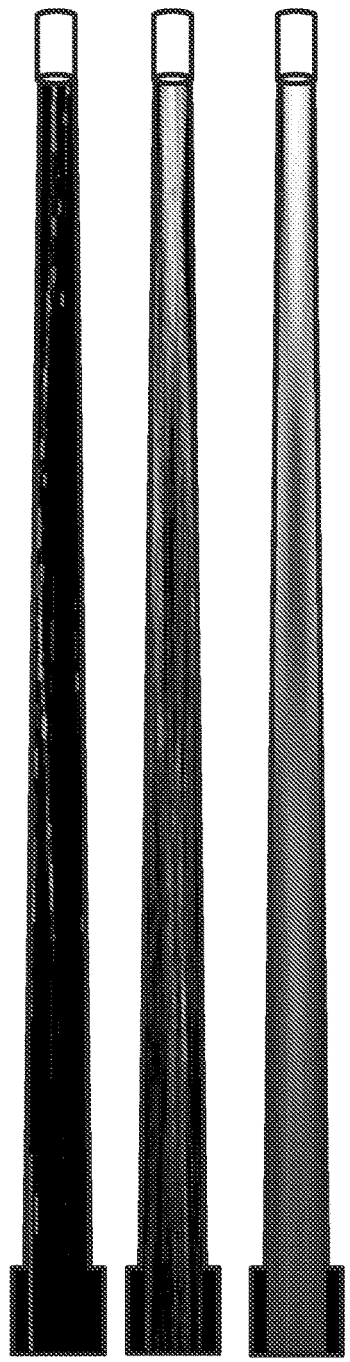
FIG. 25 shows, according to some embodiments, characterization of ray densities within taper waveguides and emitted light beams. (A) 2D heatmaps from a representative tracing simulation converging with increasing total ray count of $10^1$ rays, $10^3$ rays, and $10^5$ rays, from left to right. (B) Oscillating patterns of light density, visualized by a simulated 2D ray heatmap (i) and fluorescence microscopy image of a rhodamine-B-doped tapered waveguide (ii). Red, black, and blue arrows mark points with high, flat, and low ray density along the waveguide axis. Both images are normalized by flat-field corrections. (C) Variation of spatial profiles of emitted beams depending on waveguide length. (1) Left: cartoon schematic illustrating fiber over-insertion method to vary effective waveguide lengths. (2) Right: comparison of microscopy images of a fluorescently labeled microdevice, 2D ray heatmaps, and 1D beam profiles. (φ=0.011 rad, NA=0.115, L=5 mm).
Figure 25B:
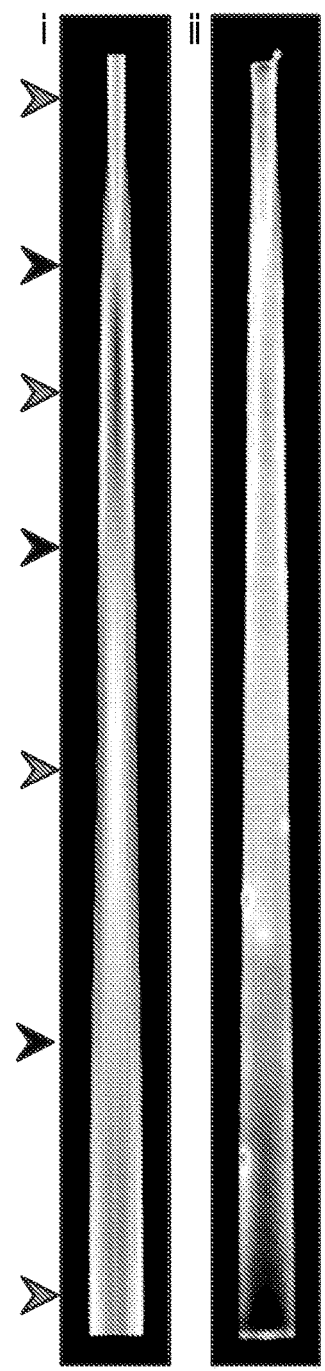
Figure 25C:
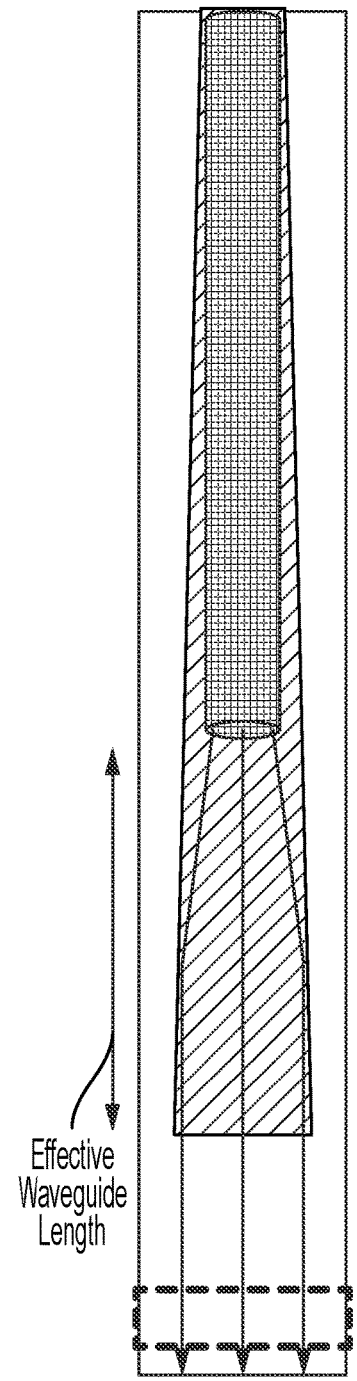
Figures 1, 25C:
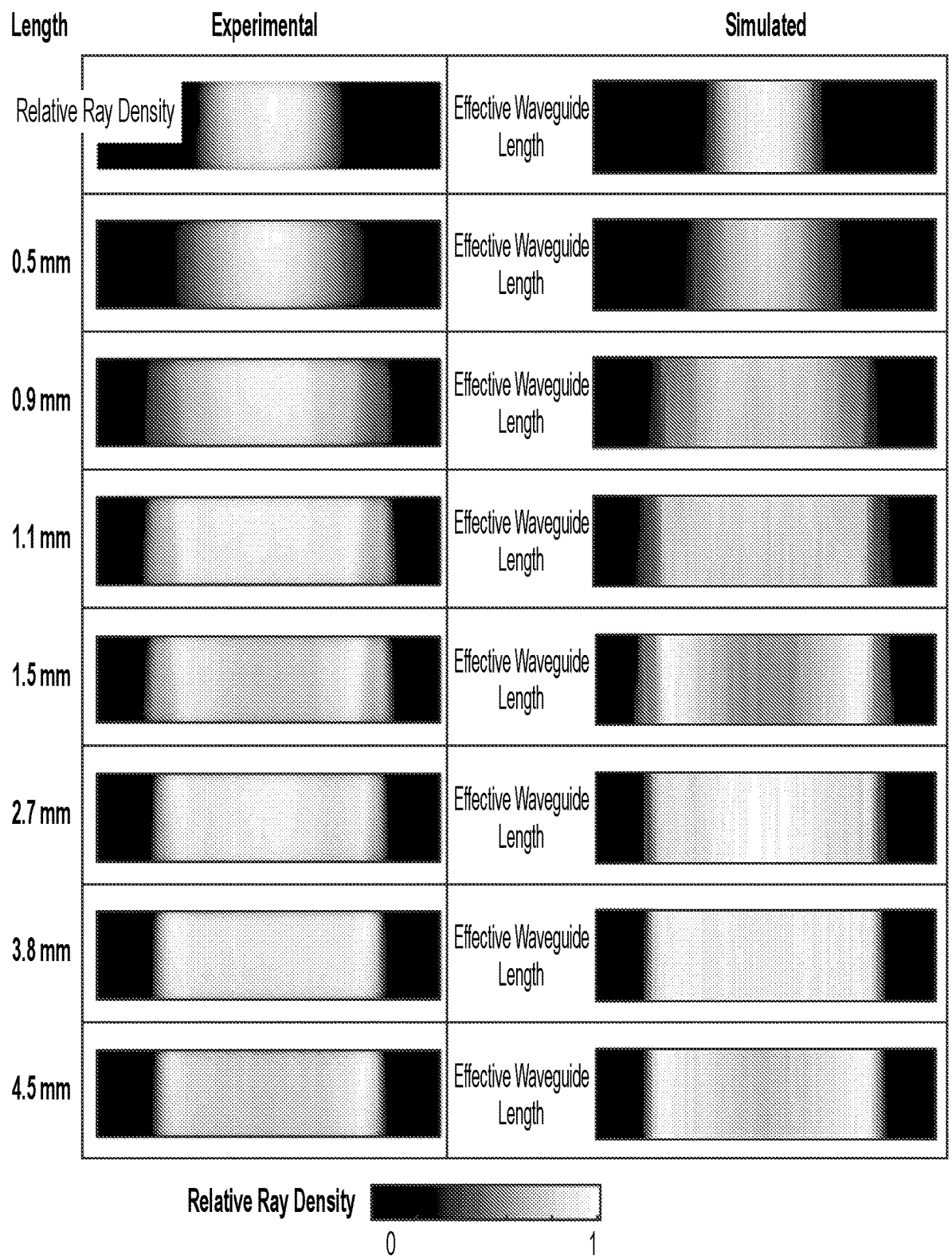
Figures 2, 25C:
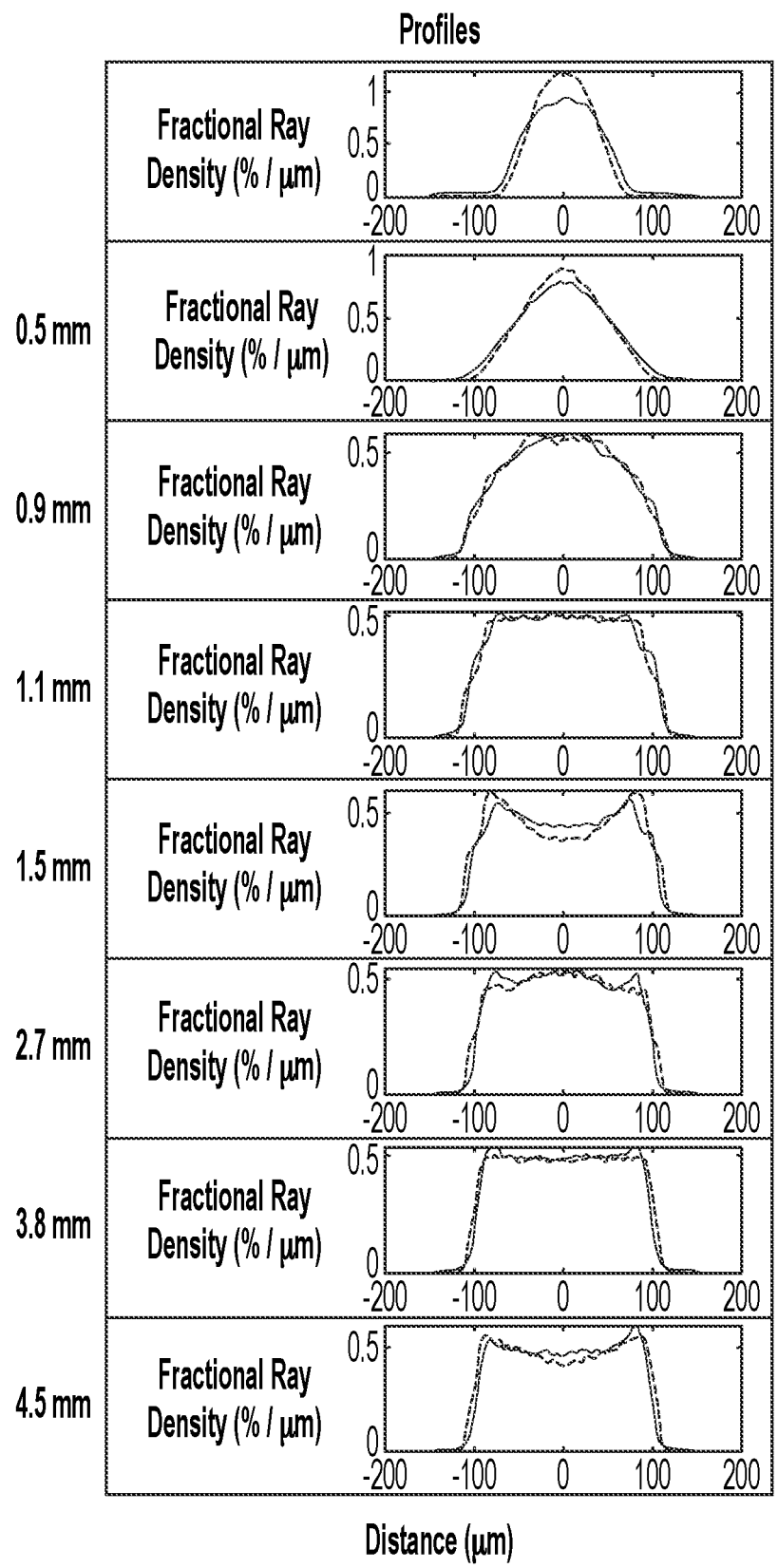

Hypothetical beam properties were explored using ray-tracing simulations of the diverging waveguide model. Beams were represented as ensembles of $10^5$ single rays exiting the waveguide, allowing them to be characterized via Monte Carlo simulations (FIG. 25A). Periodic inhomogeneities in ray densities were observed in all simulations with straight or angled waveguide tapers (FIG. 25A-C). Upon closer inspection, it was observed that rays initially near the waveguide wall reflect much earlier than centrally positioned rays. This causes a depletion in rays near the wall and concentration at the center. This imbalance is reversed further down the waveguide, ultimately resulting in an oscillatory pattern. Interestingly, these inhomogeneities became less frequent for tapered waveguides, evidenced both by simulations and experimental light field mapping (FIG. 25C). Hypothetically, by maintaining uniform ray densities over prolonged distances, tapered waveguides offer an opportunity to tailor the geometries to emit more uniform beams (FIG. 25D).

Figures 26A, 26B, 26C:
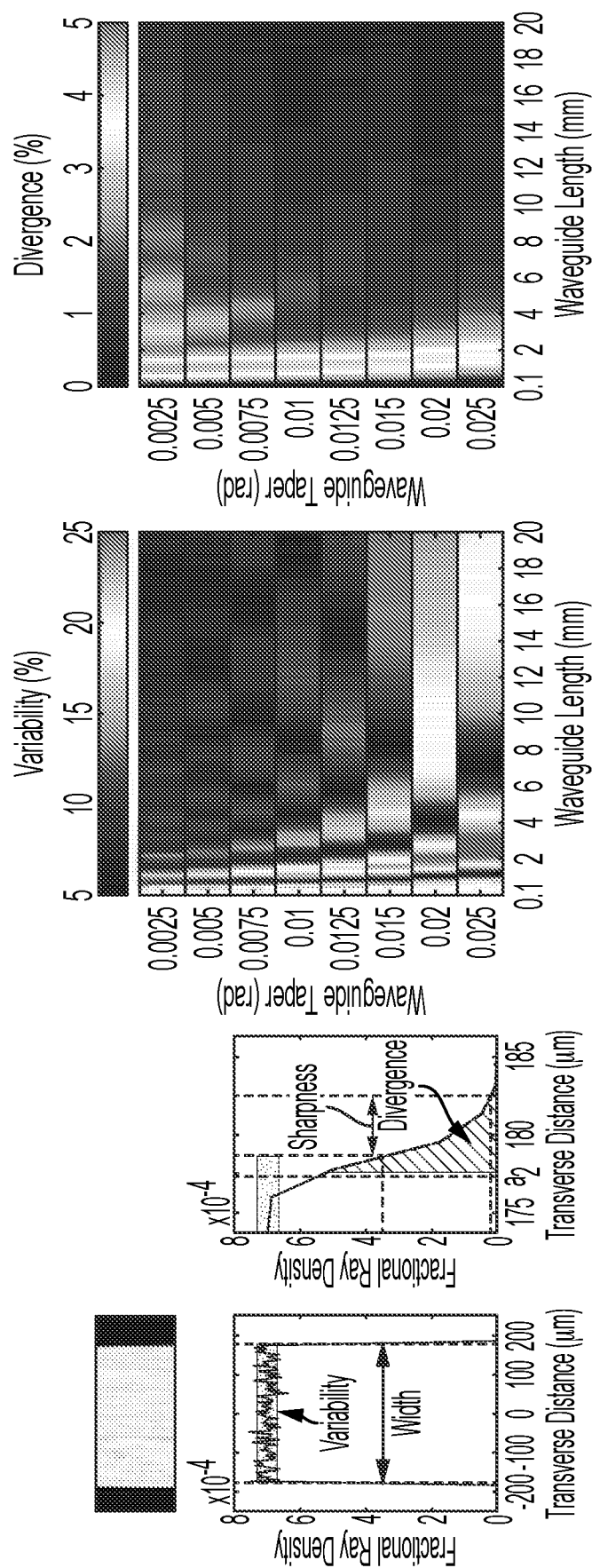
FIG. 26 shows, according to some embodiments, quantitative characterization of simulated beams exiting diverging tapered waveguides. (A) Simulated beam (L=8.4 mm, φ=15 mrad), projected profile, and strategy for measuring waveguide performance metrics. (B), (C), (D), (E), and (F) Heatmaps of five waveguide performance metrics screened over waveguide taper (2.5 mrad resolution) and length (100 μm resolution). Each heatmap pixel represents one beam simulated as $10^5$ rays.
Figures 26D, 26E, 26F:
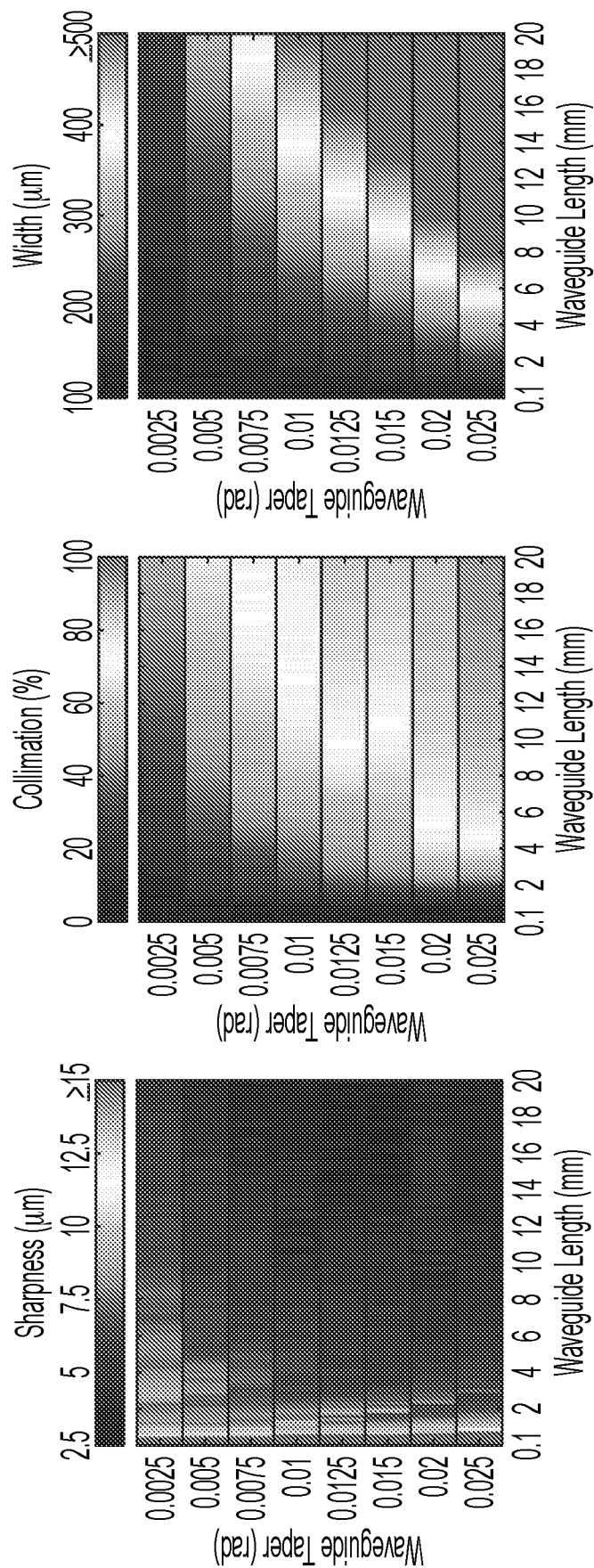

To characterize the effects of geometric factors on beamshaping, five properties of simulated beams were quantified: variability, divergence, sharpness, collimation, and width (FIG. 26A). The frequency and magnitude of beam variations decreased for longer waveguides, suggesting damped oscillatory behavior (FIG. 26B). Greater taper angles increased the oscillation magnitude. The simulated beams with the least divergence were observed at greater waveguide lengths and taper angles (FIG. 26C). With at least 1 mm of waveguide length, simulated beams had sharp edges with <8 μm rise/fall distances (FIG. 26D). As expected, the beams became wider and more collimated in longer and more tapered waveguides (FIG. 26E-F). To validate these findings, 3D COMSOL raytracing simulations and optical experiments were performed. The number of reflections, distances to reflections, and mixing phenomenon were qualitatively in agreement between the 3D COMSOL and 2D analytical simulations. Overall, the simulated beam behavior was surprisingly complex given the simple geometry of the diverging waveguide model.

Figure 27:
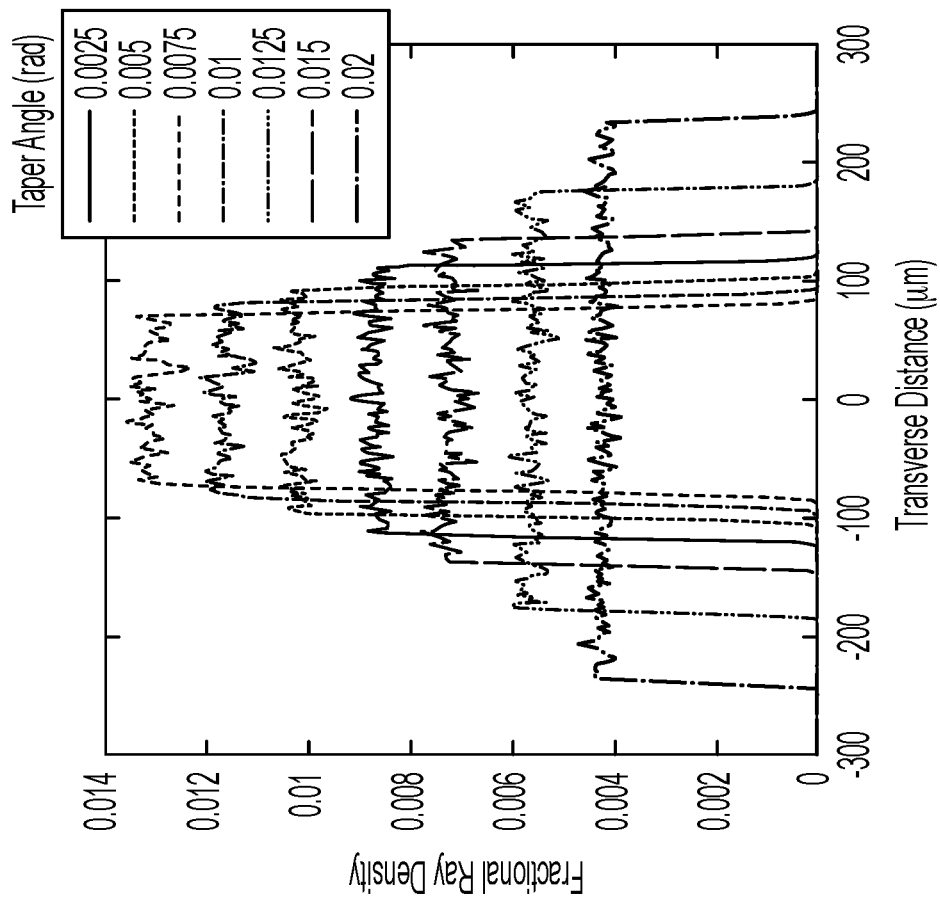
FIG. 27 shows, according to some embodiments, formation of high-quality CoL despite uncertainty in in silico predictions for simulated 2D ray heatmaps and 1D profiles for a selection of CoL beams of different widths.
Figure 27:
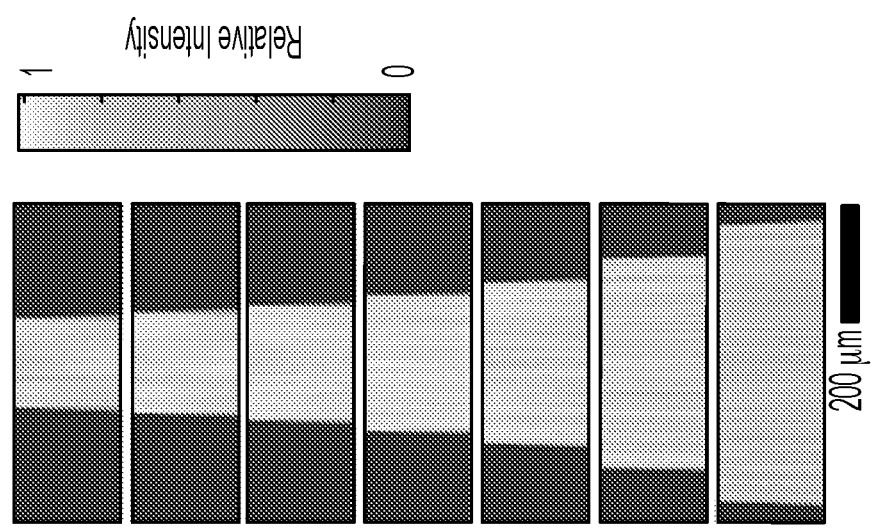
Figure 28A:
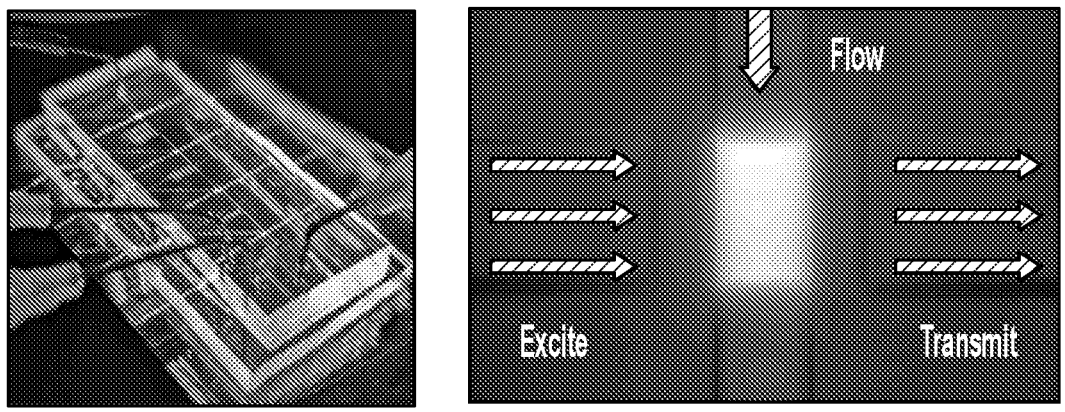
FIG. 28 shows, according to some embodiments, particle velocimetry and size analysis facilitated by CoLs. (A) Photograph of an optofluidic microdevice with integrated tapered waveguides. Inset below: Annotated fluorescence microscopy image of optical interrogation regions with labeled liquid flowing past the CoL beam. (B) Analysis of transmission signals produced as a flowing particle occludes the CoL beam. (C) Calibration results.
Figure 28B:
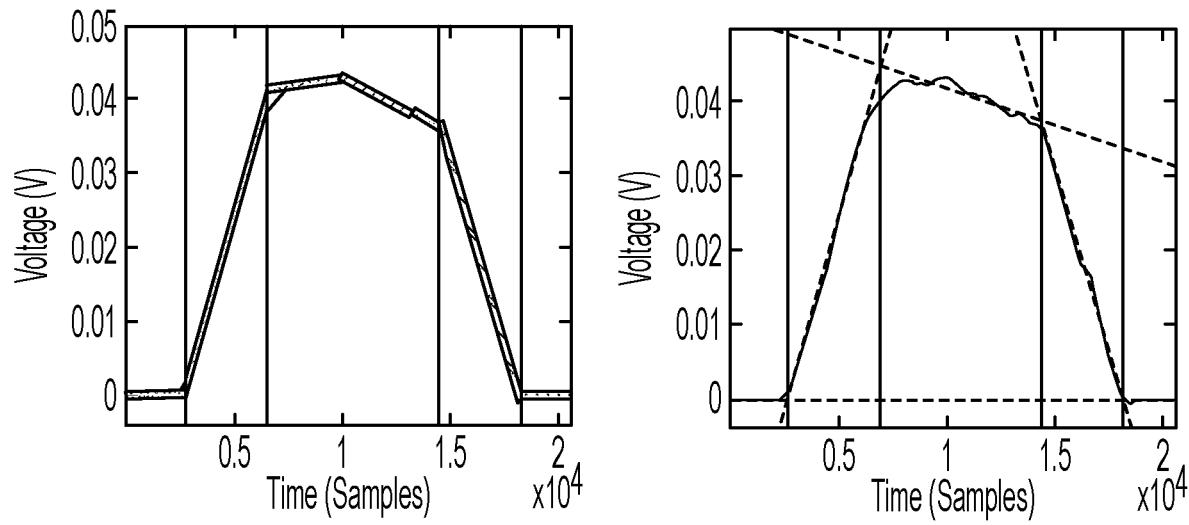
Figure 28C:
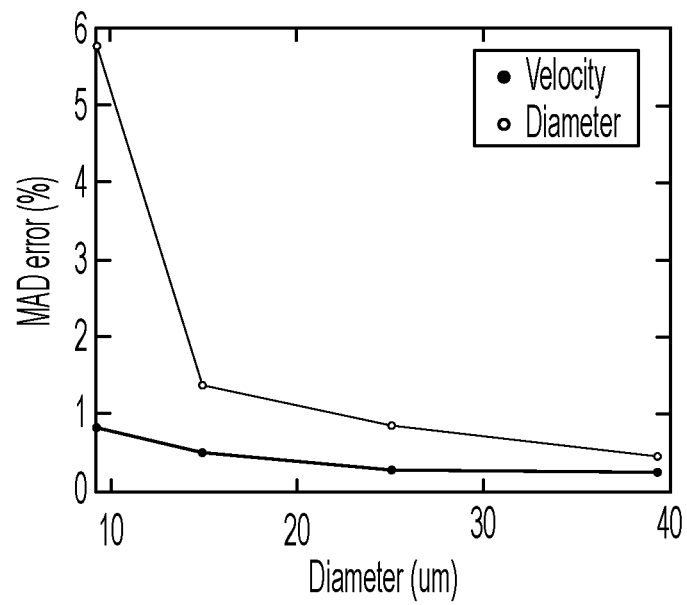
Figure 32:
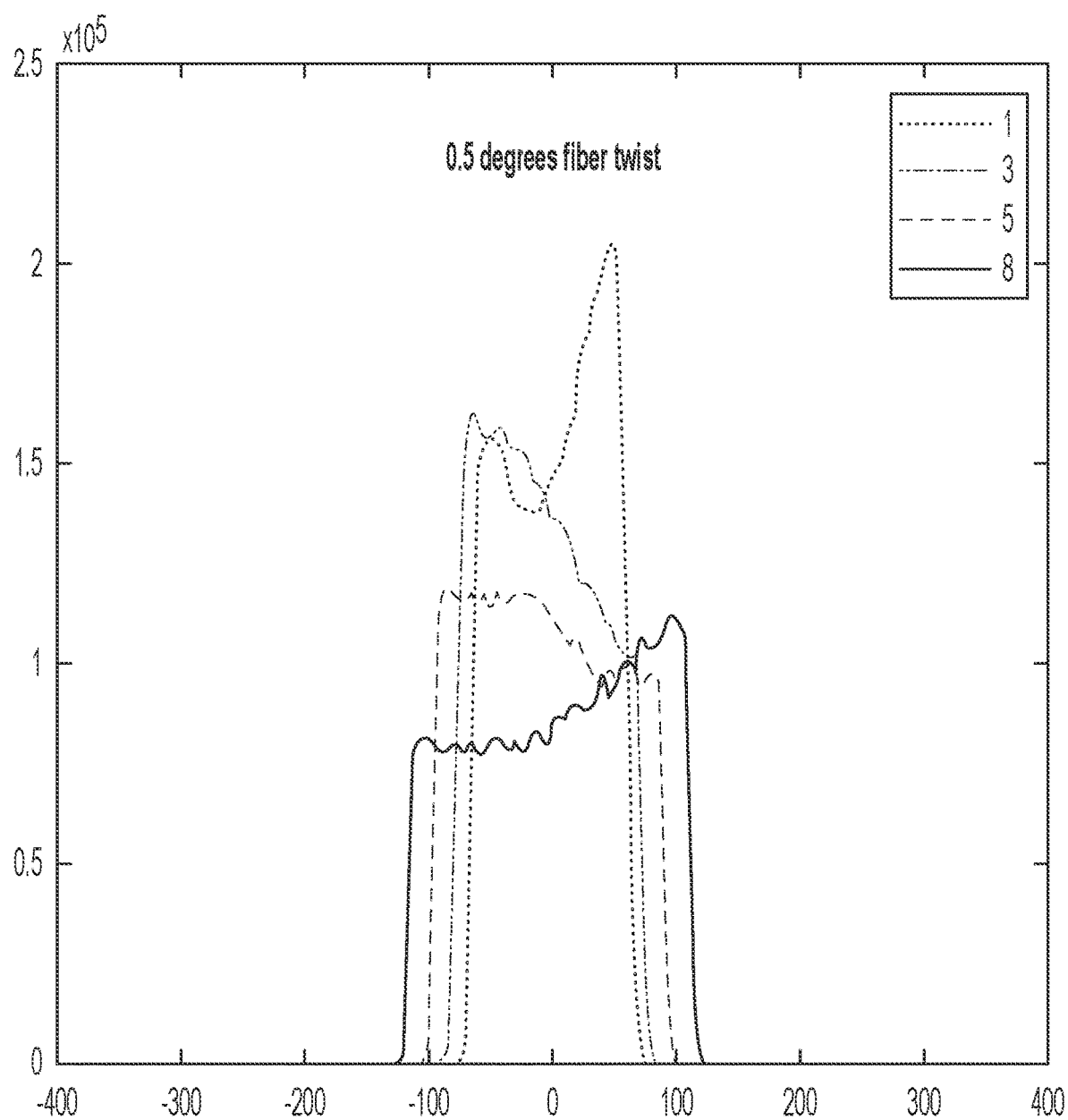
FIG. 32 shows, according to some embodiments, simulated beam profiles emitted from tapered waveguides of different lengths with a 0.5 degree bias to the alignment axis of the fiber.

Real-world beam profiles were characterized and compared to simulations to address the predictive power of the simulations. An uncertainty quantification (FIG. 27A) of one representative uniform beam was simulated with various uncertainties in geometries, including a profile variability with divergence, sharpness, collimation, and width with a mean metric value and standard error of the metric. These uncertainties indicate theoretical limits to prediction accuracy. Experimental measurements from real-world beams emitted by various different waveguides and microscopically profiled using fluorescent tracer dyes were generally consistent with these theoretical limits (FIG. 27B). Initially, some experimental beam profiles were observed with minor asymmetry; similar asymmetries were recovered in simulated profiles with minor misalignments (shifts/skews) in the fiber positioning (FIG. 32). Thus, fiber alignment features were added to waveguide designs to reduce the likelihood of imperfect alignments. These results indicate the predictive power of the model and ability to generate real-world CoLs with different defined properties.

Simplified Beam Geometry Enables Optimized Particle Size Analysis

Figure 29:
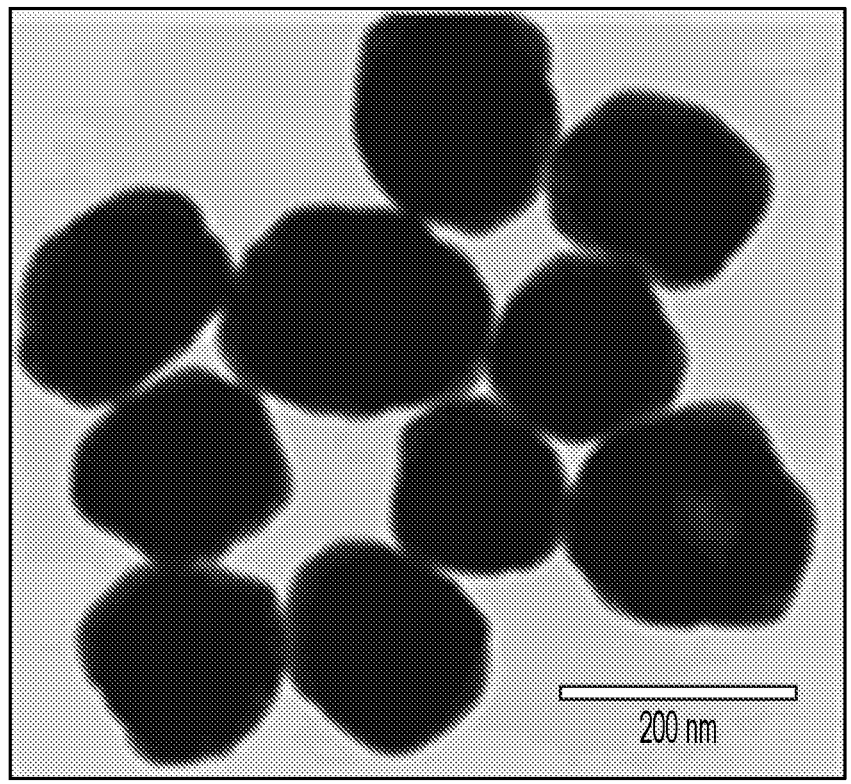
FIG. 29 shows, according to some embodiments, particle velocimetry and size analysis of heterogenous mixed samples, particularly, brightfield microscopy images of microparticle beads.
Figure 29:
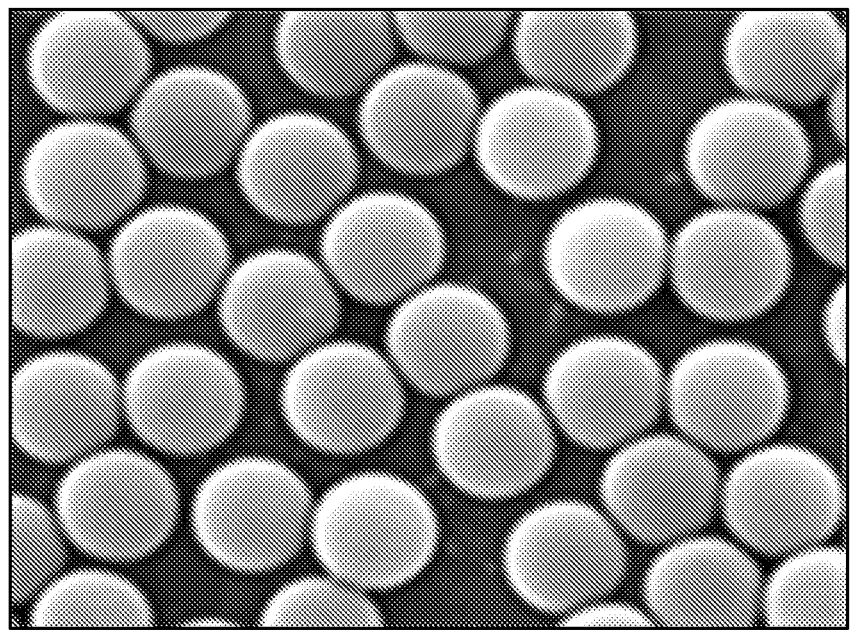

The utility of CoLs for optofluidic measurements was tested by incorporating tapered waveguides into an optofluidic particle size analyzer (FIG. 29A). Two types of CoLs were selected: a "high precision" CoL with an exceptionally sharp, collimated, and wide beam and "high throughput" CoL with a narrower beam. The device included a straight flow cell that was illuminated with a series of eight perpendicular beams emitted by MMSMCs. Microspheres flowed through the microchannel, passing the excitation beam and obscuring the light being transmitted through the channel. The time course of light transmission, measured by silicon photodiodes, manifested as trapezoidal pulse shapes with rounded corners. These shapes were within a shape produced by convolution of a moving circle with the laser profile. The pulse shapes were charactered as consisting of three pronouncedly linear phases: a rise, plateau, and fall phase with change points $k_1$, $k_2$, $k_3$, and $k_4$ marking, respectively, the signal onset, plateau initiation, end of plateau, and disappearance of signal (FIG. 29B). For an ideal CoL laser profile of width w as in FIG. 24, particle velocity v and diameter D can be calculated as $$v = \frac{w}{k_3 - k_1} = \frac{w}{k_4 - k_2} \quad (4)$$

$$D = v(k_2 - k_1) = v(k_4 - k_3) \quad (5)$$

To accommodate the noise and uncertainty in real-world systems, a linear model modifying equations (4-5) was proposed:

$$\alpha_1 \kappa_1 + \alpha_2 \kappa_2 + \alpha_3 \kappa_3 + \alpha_4 \kappa_4 = \vec{A}\vec{K} = \frac{w}{v} \quad (6)$$

$$\beta_1 \kappa_1 + \beta_2 \kappa_2 + \beta_3 \kappa_3 + \beta_4 \kappa_4 = \vec{B}\vec{K} = \frac{D}{v} \quad (7)$$

where the $\alpha$ and $\beta$ are eight constants determined by empirical calibration and the K are four estimates of the true change points k. We note that "change points" refers to instants of time at which some property of a signal changes abruptly. Changepoint detection is an open problem in signals processing, and the optimality of a suitable method (inflection points, kneepoints, statistical thresholding, and the like) is situation dependent. Thus, calibrations of equations (6-7) will likely depend on the method chosen to determine K.

The metrology method was calibrated for accuracy in determining the diameter and velocity of reference polystyrene microspheres. Particle sizes were obtained from a linear calibration curve of obscuration magnitude to manufacturer's specified sizes. Time-averaged particle velocities were obtained from their time-of-flight between consecutive interrogation beams.

This metrology approach was applied to a mixed microparticles sample. The sample included polystyrene, silica, polymethacrylate, and melamine resin microparticles with nominal sizes within the 8 microns to 30 microns range. These analytes have diverse, unspecified, and potentially inhomogeneous optical properties (absorbance, index of refraction) or shape (in the case of the silica particles) and would be challenging to assess using scatter- or absorbance-methods.

Simulation

All 2D ray simulations were calculated in MATLAB using equations (s1-s6). Monte Carlo simulations of beams were performed by modeling between $10^4$ and $10^5$ individual rays in the waveguide with randomly sampled initial positions and angles. Assuming the rays entering the waveguide are guided rays at the near field of a step index multimode fiber, the ray angles and positions be uniformly distributed in 3D space. The uniform position distribution in 3D can be projected across the waveguide cross-section to arrive at the 1D distribution model $$pdf(x) = \frac{2}{\pi r^2} \sqrt{r^2 - x^2}, -r < x < r \quad (8)$$

where r is the radius of the circular cross-section of the fiber optic and x is the transverse distance across the fiber optic along the plane of the coupled waveguide. Beams produced by the waveguide were modeled over a 200 μm span beyond the top of the waveguide, where microfluidic channels would be situated. Constraints to the waveguide geometric parameters were added based on real-world fabrication limitations. To fabricate the waveguides using our previously developed lithographic approaches, the waveguide depth, length, and breadth would be limited to ≈100 μm, ≤2 cm, and ≤500 μm. The 100 μm depth allows butt-coupling of a typical 105 μm diameter 0.1 NA fiber directly to the waveguide channel in a single-layer device. The 2 cm length matches the maximum device footprints that are practical for standard wafer processing. Lastly, the breadth limit of 500 μm maintains structurally sound channel aspect ratios below 5:1.

Beam width was measured by the full width half max (FWHM). Beam divergence was quantified by the fraction of total ray density falling within the exit aperture of the diverging waveguide. Beam rise time was calculated as the distance taken for the beam profile to rise from 2% to 50% of the beam intensity. Beam variability was quantified by the coefficient of variation of the beam profile between the FWHM crossing points. To reduce the effect of ray shot noise on estimates of beam variability, the profile was first smoothed by a central moving average filter with width equal to 4% the signal FWHM. Beam collimations was calculated as the proportion of actual ray reflections to the maximum possible ray reflections $m_{coll}$ according to equation (2).

3D simulations were performed by COMSOL Multiphysics following the assumptions from the 2D model.

Microfabrication

The 2D-taper-based MMSMC and the microfluidic channels were formed as a single layer using photolithography and soft lithography as reported previously. Templates were created from SU-8 2100 negative photoresist that was spin-coated on silicon wafers and exposed using a 395 nm laser writer (MLA 150, Heidelberg Instruments). After development and thermal curing at 200° C., the templates were functionalized by vapor deposition with trichloro (1H,1H, 2H,2H perfluorooctyl) silane. Devices were cast in poly (dimethylsiloxane) (PDMS, Sylgard 184, refractive index»1.42) by pouring PDMS over the master wafer and curing for 3 hours at 70° C. Fluidic inlets and outlet vias were formed by punching 0.75 mm diameter bores through the mold. A flat PDMS substrate was bonded to the mold to seal the waveguides and microfluidic channel. Bonding was performed by mating both surfaces either after 30 s oxygen plasma treatment (Plasma Preen, Plasmatic Systems Inc.) or alternatively after contact stamping both surfaces with PDMS crosslinker. The waveguide channels were filled with optical adhesive (refractive index of 1.56 when cured) and degassed. Stripped and cleaved multimode optical fibers (105 μm core diameter and 125 μm cladding diameter) with 0.1 or 0.22 numerical aperture were inserted into the waveguides prior to photopolymerization curing with UV light, first for 1 h under a UV lamp (100 W longwave 365 nm), and next for 4 min of UV light directed through the waveguide (375 nm diode laser at 30 mW nominal power).

Optofluidic Instrumentation

The optofluidic chip for microparticle analysis consisted of a straight flow channel (square cross-section, 100 μm×100 μm) flanked both on the left and on the right with a series of 8 diverging waveguides spaced apart along the flow direction. Each set of 8 waveguides consisted of a duplicated set of 4 different waveguides geometries. Waveguides on one side were designated for excitation and were coupled to blue lasers (488 nm diode laser, 200 mW nominal power, 0.5% stability over 8 h, 0.2% RMS noise) using either 1:1 or 1:4 splitter patch cables (patch cable specs). The opposing waveguides were designated for transmission detection and were coupled to silicon photomultipliers (±2% uniformity, ±0.5% linearity, 100 kHz bandwidth). Fluidic lines were connected to syringe pumps (30 μm min−1 minimum pulse-free actuation speed) via either fluorinatedethylene-propylene or flexible polymer tubing.

Digital Signal Processing

Raw signals from photodetectors were digitized to a workstation computer by a streaming data acquisition card (8 analog inputs, 16-bit resolution, sampling rate $2\times10^6$ s$^{-1}$). Automated MATLAB software was used to: 1) filter windows containing peaks from the background of the signal stream in real-time, 2) annotate peaks with approximate signal boundaries, background level, integrated area, height, and width, 3) match signals corresponding to each microparticle, and 4) log compressed files with copies of this data. Next, the peak metrics of background level, integrated area, height, and width were refined using a new strategy. The signal boundary points were iteratively expanded to the first and last samples at which the smoothed peak (centered moving average, window size of 4% peak duration) exceeded the background level. After each expansion the mean background level was re-evaluated, and the expansion continued until the relative decreases in mean background level fell below a tolerance of 1%. Finally, the integrated area, height, and width annotations were recalculated using the refined signal boundaries and background level.

Several approaches were used to estimate the change points $K_1$, $K_2$, $K_3$, and $K_4$ marking, respectively, the signal onset, plateau initiation, end of plateau, and disappearance of signal. For all methods, initial guesses for $K_1$ and $K_4$ were the refined signal boundaries described above; guesses for $K_2$ and $K_3$ were $$\kappa_2^{guess} = \kappa_1^{guess} + \frac{(\kappa_4^{guess} - \kappa_1^{guess}) - FWHM}{2} \qquad (8)$$

$$\kappa_3^{guess} = \kappa_4^{guess} - \frac{(\kappa_4^{guess} - \kappa_1^{guess}) - FWHM}{2} \qquad (9)$$

where FWHM (full width half max) is the width annotation described above. The tested methods were the Kneedle algorithm, free-knot spline approximation, L-method knee-points, statistical changepoints, and a custom fit. The custom fit was a constrained minimization $$\min_{x_1, x_2, x_3, x_4} \sqrt{(y_{fit} - y)^2}, \begin{cases} x_1 < x_2 < x_3 < x_4 \\ x_2 - x_2 = x_4 < x_3 \end{cases} \qquad (10)$$

where y is the original data and $y_{fit}$ is the data fitted by a piecewise discontinuous linear fit with segment boundaries at $x_1$, $x_2$, $x_3$, and $x_4$. The intersections between the linear fit lines were chosen as $K_1$, $K_2$, $K_3$, and $K_4$. Regardless of changepoint detection method, equations (6-7) were used to calculate particle size and velocity.

For validation purposes, a previously reported technique using spectral analysis was applied to measure relative particle size and velocity. Briefly, the spectral method seeks to reverse the effects of particle size and velocity on the shape of the signal. The result of the method is a mapping of signals onto a reference curve and per-particle estimates of relative size and velocity.

Geometric Optics Derivation

Figure 30A:
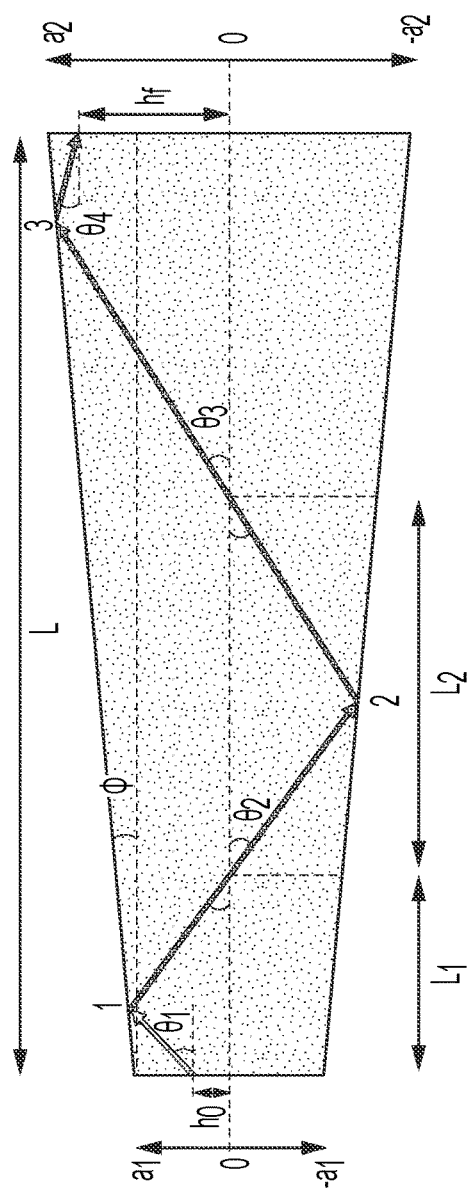
FIG. 30 shows, according to some embodiments, geometric optics model for propagating rays in a diverging waveguide. (A) Schematic and coordinate system for modeling sequential reflections of a ray (solid black arrow) traveling through a diverging waveguide (grey trapezoid) via total internal reflection. (B) Detailed cutaway schematics for an initial reflection (left of axis break) as well as for an arbitrary m-th reflection (right of axis break). Only the top half of the waveguide is shown.

FIG. 30 shows a geometric optics model for propagating rays in a diverging waveguide. Given the geometry of a total internal reflected ray propagating through a tapered waveguide in FIG. 30, trigonometric relationships can be derived to describe the propagation angle $\theta_m$ of rays entering the waveguide at initial angle $\theta_1$ prior to the $m^{th}$ successive internal reflection. The waveguide geometry is described by a total length L, entrance aperture half-width $a_1$, and exit aperture half-width $a_2$. The waveguide wall taper angle $\varphi$ is thus $$\varphi = \arctan\left(\frac{a_2 - a_1}{L}\right) \tag{s1a}$$

Observing the two right triangles with acute angles $\theta_1$ and $\beta_1$, and $\theta_2$ and $\beta_1$, respectively, $$\beta_1 = \left(\frac{\pi}{2} - \theta_1\right) + \varphi \tag{s1b}$$

$$\theta_2 = \frac{\pi}{2} - (\beta_1 + \varphi) = \theta_1 - 2\varphi. \tag{s1c}$$

Extending this to arbitrary numbers of reflections, $$\beta_m = \left(\frac{\pi}{2} - \theta_m\right) + \varphi \tag{s1d}$$

$$\boxed{\theta_m = \theta_1 - 2(m-1)\varphi} \tag{s1}$$

where $m_{coll}$ is the maximum possible number of reflections the ray can undergo before becoming "effectively collimated." Effective collimation is defined when $$\varphi \geq \theta_{m_{coll}+1} \geq -\varphi \tag{s2a}$$

$$\varphi \geq |\theta_1| - 2m_{coll}\varphi \geq -\varphi \tag{s2b}$$

Thus, $$\boxed{m_{coll} = \begin{cases} \left\lfloor \frac{1}{2}(|\theta_1|/\varphi + 1) \right\rfloor, & |\theta_1| \geq \varphi \\ 0, & |\theta_1| < \varphi \end{cases}} \tag{s2}$$

Figure 30B:
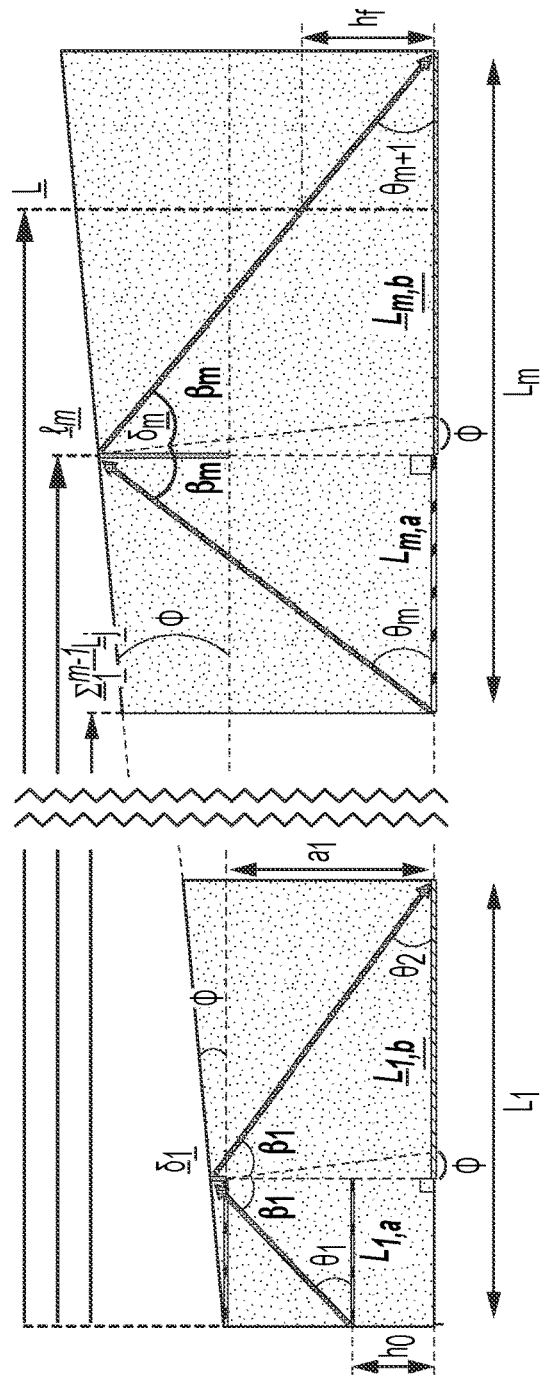

Next, the reflection distances $L_m$ of complete internal reflections are modeled. "Complete internal reflections," as illustrated in FIG. 30B, are defined as rays that travel to the waveguide wall, reflect, and finally cross the waveguide centerline. For the first reflection, the distance $L_1$ required for the ray at initial position $h_0$ to reflect against the wall and return to the waveguide axis is the sum of the distances $L_{1,a}$ and $L_{1,b}$ including, respectively, the first and second leg of the reflection path. Trigonometrically:

$$\tan\varphi = \frac{\delta_1}{L_{1,a}} \tag{s3a}$$

$$\tan\theta_1 = \frac{a_1 - h_0 + \delta_1}{L_{1,a}} \tag{s3b}$$

where $\delta_1$ is the extension of the waveguide width at the point of reflection. Solving for $\delta_1$:

$$\delta_1 = (a_1 - h_0)\frac{\tan\varphi}{\tan\theta_1 - \tan\varphi} \tag{s3c}$$

Trigonometrically:

$$L_{1,a} = \frac{(a_1 - h_0 + \delta_1)}{\tan\theta_1} \tag{s3d}$$

$$L_{1,b} = \frac{(a_1 + \delta_1)}{\tan\theta_2} \tag{s3e}$$

Thus, after expanding and rearranging, $$L_{1,a} + L_{1,b} = L_1 = (a_1 - h_0)\left(\frac{\tan\theta_1}{\tan\theta_1 - \tan\varphi}\right) \left(\frac{1}{\tan\theta_1} + \left(\frac{\tan\varphi + \left(\frac{a_1}{a_1 - h_0}\right)(\tan\theta_1 - \tan\varphi)}{\tan\theta_1}\right)\frac{1}{\tan\theta_2}\right) \tag{3f}$$

Similarly, for an arbitrary number of reflections after the first, i.e., for m>1, $$\tan\varphi = \frac{\delta_m}{L_{m,a} + \sum_{j=1}^{m-1} L_j} \tag{s3g}$$

$$\tan\theta_m = \frac{\delta_m + a_1}{L_{m,a}} \tag{s3h}$$

$$\delta_m = \left(a_1 + \tan\theta_m \sum_{j=1}^{m-1} L_j\right)\frac{\tan\varphi}{\tan\theta_m - \tan\varphi} \tag{s3i}$$

$$L_{m,a} = \frac{a_1 + \delta_m}{\tan\theta_m} \tag{s3j}$$

$$L_{m,b} = \frac{a_1 + \delta_m}{\tan\theta_{m+1}} \tag{s3k}$$

$$L_{m,a} + L_{m,b} = \tag{s3l}$$

$$L_m = a_1\left(\frac{\tan\theta_m + \tan\varphi\tan\theta_m\sum_{j=1}^{m-1}\frac{L_j}{a_1}}{\tan\theta_m - \tan\varphi}\right)\left(\frac{1}{\tan\theta_m} + \frac{1}{\tan(\theta_{m+1})}\right)$$

Accordingly, $$L_m = \begin{cases} (a_1 - h_0)\left(\dfrac{\tan\theta_1}{\tan\theta_1 - \tan\varphi}\right) & m = 1 \\ \left(\dfrac{1}{\tan\theta_1} + \dfrac{\tan\varphi + \left(\dfrac{a_1}{a_1 - h_0}\right)(\tan\theta_1 - \tan\varphi)}{\tan\theta_1}\right)\dfrac{1}{\tan\theta_2}, \\ a_1\left(\dfrac{\tan\theta_m + \tan\varphi\tan\theta_m \sum_{j=1}^{m-1}\dfrac{L_j}{a_1}}{\tan\theta_m - \tan\varphi}\right)\left(\dfrac{1}{\tan\theta_m} + \dfrac{1}{\tan(\theta_{m+1})}\right), & m > 1 \end{cases} \quad (s3)$$

Equation (s3) assumes a positive entrance angles, $\theta_1 > 0$. By symmetry, however, the reflection distances for negatively angled rays $L_{\overline{m}}$ can be expressed as $$L_{\overline{m}} = L_m(-\theta_1, -h_0) \tag{s4}$$

It is useful to also define the total distance $\ell_m$ at which a given reflection point occurs $$\ell_m = L_{m,a} + \Sigma_{j=1}^{m-1} L_j \tag{s5a}$$

The exit position of the rays $h_f$ with M complete internal reflections achieved prior to reaching the exit aperture is given by $$h_f = (-1)^M \times \begin{cases} h_0 + L\tan\theta_1, & M = 0 \\ \left(L - \sum_{j=1}^{M} L_j\right)\tan\theta_{M+1}, & \ell_{M+1} > L \\ a_1 + \delta_{M+1} - (L - \ell_{M+1})\tan\theta_{M+2}, & \ell_{M+1} < L \end{cases} \quad (s5)$$

Equation (s5) includes three cases. The first case accounts for rays that have not reflected in the waveguide. The second case accounts for rays having a final segment (i.e., after the last complete internal reflection) that does not intersect the wall before reaching the end of the waveguide. The third case accounts for rays whose final segment have a partial reflection (rays reach another reflection point $\ell_{M+1}$ but cannot complete the second reflection leg before reaching the end of the waveguide; see Figure S1A with M=2). The multiplicative pre-factor recognizes that ray positions will be on opposite sides of the waveguide with each reflection. Again, although equation (s5) assumes positive entrance angles, $\theta_1 > 0$, by symmetry arguments, the exit position of the rays $h_{\overline{f}}$ with $e1 < 0$ is $$h_{\overline{f}} = -h_f(-\theta_1, -h_0) \tag{s6}$$

The above model assumes that the angle $\theta_1$ of rays entering the waveguide do not surpass the waveguide effective critical angle $\theta_{c\text{-}eff}$:

$$\theta_{c\text{-}eff} = \theta_c + \varphi \cong (1 - (n_{bulk}/n_{waveguide})^2)^{1/2} + \varphi \tag{s7}$$

The entrance angles can be limited below $\theta_{c\text{-}eff}$ by prefiltering the ray with a fiber optic of sufficiently low numerical aperture.

The processes described herein may be embodied in, and fully automated via, software code modules executed by a computing system that includes one or more general purpose computers or processors. The code modules may be stored in any type of non-transitory computer-readable medium or other computer storage device. Some or all the methods may alternatively be embodied in specialized computer hardware. In addition, the components referred to herein may be implemented in hardware, software, firmware, or a combination thereof.

Many other variations than those described herein will be apparent from this disclosure. For example, depending on the embodiment, certain acts, events, or functions of any of the algorithms described herein can be performed in a different sequence, can be added, merged, or left out altogether (e.g., not all described acts or events are necessary for the practice of the algorithms). Moreover, in certain embodiments, acts or events can be performed concurrently, e.g., through multi-threaded processing, interrupt processing, or multiple processors or processor cores or on other parallel architectures, rather than sequentially. In addition, different tasks or processes can be performed by different machines and/or computing systems that can function together.

Any logical blocks, modules, and algorithm elements described or used in connection with the embodiments disclosed herein can be implemented as electronic hardware, computer software, or combinations of both. To clearly illustrate this interchangeability of hardware and software, various illustrative components, blocks, modules, and elements have been described above generally in terms of their functionality. Whether such functionality is implemented as hardware or software depends upon the particular application and design constraints imposed on the overall system. The described functionality can be implemented in varying ways for each particular application, but such implementation decisions should not be interpreted as causing a departure from the scope of the disclosure.

The various illustrative logical blocks and modules described or used in connection with the embodiments disclosed herein can be implemented or performed by a machine, such as a processing unit or processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A processor can be a microprocessor, but in the alternative, the processor can be a controller, microcontroller, or state machine, combinations of the same, or the like. A processor can include electrical circuitry configured to process computer-executable instructions. In another embodiment, a processor includes an FPGA or other programmable device that performs logic operations without processing computer-executable instructions. A processor can also be implemented as a combination of computing devices, e.g., a combination of a DSP and a microprocessor, a plurality of microprocessors, one or more microprocessors in conjunction with a DSP core, or any other such configuration. Although described herein primarily with respect to digital technology, a processor may also include primarily analog components. For example, some or all of the signal processing algorithms described herein may be implemented in analog circuitry or mixed analog and digital circuitry. A computing environment can include any type of computer system, including, but not limited to, a computer system based on a microprocessor, a mainframe computer, a digital signal processor, a portable computing device, a device controller, or a computational engine within an appliance, to name a few.

The elements of a method, process, or algorithm described in connection with the embodiments disclosed herein can be embodied directly in hardware, in a software module stored in one or more memory devices and executed by one or more processors, or in a combination of the two. A software module can reside in RAM memory, flash memory, ROM memory, EPROM memory, EEPROM memory, registers, hard disk, a removable disk, a CD-ROM, or any other form of non-transitory computer-readable storage medium, media, or physical computer storage known in the art. An example storage medium can be coupled to the processor such that the processor can read information from, and write information to, the storage medium. In the alternative, the storage medium can be integral to the processor. The storage medium can be volatile or nonvolatile.

While one or more embodiments have been shown and described, modifications and substitutions may be made thereto without departing from the spirit and scope of the invention. Accordingly, it is to be understood that the present invention has been described by way of illustrations and not limitation. Embodiments herein can be used independently or can be combined.

All ranges disclosed herein are inclusive of the endpoints, and the endpoints are independently combinable with each other. The ranges are continuous and thus contain every value and subset thereof in the range. Unless otherwise stated or contextually inapplicable, all percentages, when expressing a quantity, are weight percentages. The suffix (s) as used herein is intended to include both the singular and the plural of the term that it modifies, thereby including at least one of that term (e.g., the colorant(s) includes at least one colorants). Option, optional, or optionally means that the subsequently described event or circumstance can or cannot occur, and that the description includes instances where the event occurs and instances where it does not. As used herein, combination is inclusive of blends, mixtures, alloys, reaction products, collection of elements, and the like.

As used herein, a combination thereof refers to a combination comprising at least one of the named constituents, components, compounds, or elements, optionally together with one or more of the same class of constituents, components, compounds, or elements.

All references are incorporated herein by reference.

The use of the terms "a," "an," and "the" and similar referents in the context of describing the invention (especially in the context of the following claims) are to be construed to cover both the singular and the plural, unless otherwise indicated herein or clearly contradicted by context. It can further be noted that the terms first, second, primary, secondary, and the like herein do not denote any order, quantity, or importance, but rather are used to distinguish one element from another. It will also be understood that, although the terms first, second, etc. are, in some instances, used herein to describe various elements, these elements should not be limited by these terms. For example, a first current could be termed a second current, and, similarly, a second current could be termed a first current, without departing from the scope of the various described embodiments. The first current and the second current are both currents, but they are not the same condition unless explicitly stated as such.

The modifier about used in connection with a quantity is inclusive of the stated value and has the meaning dictated by the context (e.g., it includes the degree of error associated with measurement of the particular quantity). The conjunction or is used to link objects of a list or alternatives and is not disjunctive; rather the elements can be used separately or can be combined together under appropriate circumstances.

What is claimed is:

1. A spatio-temporal profilometer for performing time-resolved spatial profilometry with a uniform light profile, the spatio-temporal profilometer comprising:
    a substrate;
    a tapered optical collimator waveguide disposed on the substrate and that receives diverging light, internally reflects the diverging light by internal reflections on collimating sidewalls of tapered optical collimator waveguide, collimates the diverging light in response to the internal reflections on collimating sidewall, produces intermediate light from the diverging light due to the internal reflections, produces collimated light from the intermediate light that is communicated from the tapered optical collimator waveguide, such that the tapered optical collimator waveguide comprises:
    an optical collimator entry wall that receives diverging light and communicates diverging light into an interior of the tapered optical collimator waveguide;
    the collimating sidewalls disposed obliquely to the optical collimator entry wall and comprising a first collimating sidewall and a second collimating sidewall that obliquely opposes the first collimating sidewall, such that the first collimating sidewall and the second collimating sidewall internally reflect the diverging light inside of the tapered optical collimator waveguide and convert the diverging light to the intermediate light; and
    an optical collimator exit wall obliquely disposed to the collimating sidewall and opposing the optical collimator entry wall and that receives the intermediate light from the interior of the tapered optical collimator waveguide. and communicates the intermediate light as collimated light, such that the collimated light is collimated and has a uniform light profile;
    a fluid channel in optical communication with the tapered optical collimator waveguide and comprising: a fluid channel entry that receives a fluid comprising microparticles and communicates the microparticles into an interior of the fluid channel; fluid channel sidewalls disposed along a length of the fluid channel and that constrain flow of the fluid to the interior of the fluid channel; and a fluid channel exit that communicates the fluid out of the fluid channel; and a light-fluid interaction volume disposed in the fluid channel and provided by an overlap within the fluid channel of the collimated light from the tapered optical collimator waveguide and the fluid; and
    a light-fluid interaction volume boundary that bounds the light-fluid interaction volume at a periphery of the collimated light that propagates in the fluid channel, such that the fluid channel receives the fluid with the microparticles and the collimated light in the light-fluid interaction volume, produces product light from the collimated light in response to the microparticles interacting with the collimated light in the light-fluid interaction volume, and communicates the product light out of the fluid channel;
    a back light detection waveguide disposed on the substrate in optical communication with the fluid channel and that receives the product light that propagates in a forward direction from the fluid channel with respect to the collimated light; and
    light blocking member disposed on the substrate in optical communication with the tapered optical collimator waveguide and optically interposed between the back light detection waveguide and the tapered optical collimator waveguide and that blocks the light from being communicated between the tapered optical collimator waveguide and the back light detection waveguide.

2. The spatio-temporal profilometer of claim 1, further comprising an optical fiber disposed in the back light detection waveguide and that receives the product light and communicates the product light to an optical detector.

3. The spatio-temporal profilometer of claim 1, further comprising a light source disposed on the substrate in optical communication with the tapered optical collimator waveguide and that produces the diverging light and communicates the diverging light to the tapered optical collimator waveguide.

4. The spatio-temporal profilometer of claim 1, further comprising a flow controller in fluid communication with the fluid channel and that provides the fluid to the fluid channel.

5. The spatio-temporal profilometer of claim 1, further comprising an optical detector in optical communication with the forward light detection waveguide and that receives the product light from the forward light detection waveguide.

6. The spatio-temporal profilometer of claim 1, further comprising an out-of-plane light collector in optical communication with the forward light detection waveguide and that receives the product light from the fluid channel.

7. The spatio-temporal profilometer of claim 1, further comprising a lens disposed between the optical collimator exit wall of the tapered optical collimator waveguide and the fluid channel and that receives the collimated light from the tapered optical collimator waveguide and communicates the collimated light to the fluid channel.

8. The spatio-temporal profilometer of claim 1, wherein flow controller in fluid communication with the fluid channel and that provides the fluid to the fluid channel.

9. The spatio-temporal profilometer of claim 1, wherein a cross-sectional shape of the tapered optical collimator waveguide is rectilinear.

10. The spatio-temporal profilometer of claim 1, wherein a cross-sectional shape of the fluid channel is rectilinear.

11. The spatio-temporal profilometer of claim 1, wherein the substrate comprises a cured polymer.

12. The spatio-temporal profilometer of claim 1, wherein flow of fluid in fluid channel is parallel or orthogonal to propagation of collimated light.

* * * * *